United States Patent
Liu et al.

(10) Patent No.: US 11,800,148 B2
(45) Date of Patent: Oct. 24, 2023

(54) UTILIZATION OF REFINED MOTION VECTOR

(71) Applicants: Beijing Bytedance Network Technology Co., Ltd., Beijing (CN); Bytedance Inc., Los Angeles, CA (US)

(72) Inventors: Hongbin Liu, Beijing (CN); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/225,470

(22) Filed: Apr. 8, 2021

(65) Prior Publication Data
US 2021/0227246 A1 Jul. 22, 2021

Related U.S. Application Data

(63) Continuation of application No. PCT/IB2019/058996, filed on Oct. 22, 2019.

(30) Foreign Application Priority Data

Oct. 22, 2018 (WO) .............. PCT/CN2018/111181

(51) Int. Cl.
*H04N 19/105* (2014.01)
*H04N 19/577* (2014.01)
(Continued)

(52) U.S. Cl.
CPC ......... *H04N 19/577* (2014.11); *H04N 19/105* (2014.11); *H04N 19/117* (2014.11);
(Continued)

(58) Field of Classification Search
CPC .. H04N 19/577; H04N 19/105; H04N 19/117; H04N 19/119; H04N 19/132;
(Continued)

(56) References Cited

U.S. PATENT DOCUMENTS 6,480,615 B1 11/2002 Sun et al.
7,627,037 B2 12/2009 Li et al.
(Continued)

FOREIGN PATENT DOCUMENTS

CN 101877785 A 11/2010
CN 101911706 A 12/2010
(Continued)

OTHER PUBLICATIONS

Final Office Action from U.S. Appl. No. 17/154,485 dated Jul. 27, 2021.
(Continued)

*Primary Examiner* — Nguyen T Truong
(74) *Attorney, Agent, or Firm* — Perkins Coie LLP

(57) ABSTRACT

A method for video processing includes: refining motion vectors of a video block by using a motion refinement process; performing a prediction sample refinement for part of components of the video block using refined motion vectors of the video block; and performing a video processing on the video block based on the refined prediction sample.

19 Claims, 32 Drawing Sheets

(51) Int. Cl.
  *H04N 19/119*  (2014.01)
  *H04N 19/176*  (2014.01)
  *H04N 19/186*  (2014.01)
  *H04N 19/593*  (2014.01)
  *H04N 19/117*  (2014.01)
  *H04N 19/513*  (2014.01)
  *H04N 19/132*  (2014.01)

(52) U.S. Cl.
  CPC ......... *H04N 19/119* (2014.11); *H04N 19/132* (2014.11); *H04N 19/176* (2014.11); *H04N 19/186* (2014.11); *H04N 19/513* (2014.11); *H04N 19/593* (2014.11)

(58) Field of Classification Search
  CPC .. H04N 19/176; H04N 19/186; H04N 19/513; H04N 19/593
  USPC ...................................... 375/240.12
  See application file for complete search history.

(56) References Cited

U.S. PATENT DOCUMENTS

| | | | |
|---|---|---|---|
| 9,247,246 B2 | 1/2016 | Lu et al. | |
| 9,294,777 B2 | 3/2016 | Wang | |
| 9,374,578 B1 | 6/2016 | Mukherjee et al. | |
| 9,445,103 B2 | 9/2016 | Xu et al. | |
| 9,509,995 B2 | 11/2016 | Xu et al. | |
| 9,521,425 B2 | 12/2016 | Chen et al. | |
| 9,554,150 B2 | 1/2017 | Zhang et al. | |
| 9,641,852 B2 | 5/2017 | Lu et al. | |
| 9,654,792 B2 | 5/2017 | Chiu et al. | |
| 9,667,996 B2 | 5/2017 | Chen et al. | |
| 9,762,927 B2 | 9/2017 | Chen et al. | |
| 10,009,615 B2 | 6/2018 | Gisquet et al. | |
| 10,268,901 B2 | 4/2019 | Garud et al. | |
| 10,341,677 B2 | 7/2019 | Sung et al. | |
| 10,477,237 B2 * | 11/2019 | Liu .................. | H04N 19/186 |
| 10,523,964 B2 | 12/2019 | Chuang et al. | |
| 10,645,382 B2 | 5/2020 | Zhang et al. | |
| 10,687,069 B2 | 6/2020 | Li et al. | |
| 10,701,366 B2 | 6/2020 | Chen et al. | |
| 10,757,420 B2 | 8/2020 | Zhang et al. | |
| 10,764,592 B2 | 9/2020 | Zhang et al. | |
| 10,778,997 B2 | 9/2020 | Zhang et al. | |
| 10,779,002 B2 | 9/2020 | Chen et al. | |
| 10,785,494 B2 | 9/2020 | Chien et al. | |
| 10,805,650 B2 | 10/2020 | Wang et al. | |
| 10,855,992 B2 | 12/2020 | Ye | |
| 10,887,597 B2 | 1/2021 | Liu et al. | |
| 10,893,267 B2 | 1/2021 | Jang et al. | |
| 10,904,565 B2 | 1/2021 | Chuang et al. | |
| 10,939,130 B2 | 3/2021 | Xiu et al. | |
| 10,986,360 B2 | 4/2021 | Thirumalai et al. | |
| 11,057,642 B2 | 7/2021 | Zhang et al. | |
| 11,166,037 B2 | 11/2021 | Chiang et al. | |
| 11,277,624 B2 | 3/2022 | Zhang et al. | |
| 11,284,088 B2 | 3/2022 | Zhang et al. | |
| 11,509,923 B1 | 11/2022 | Zhang et al. | |
| 11,509,927 B2 | 11/2022 | Liu et al. | |
| 11,509,929 B2 | 11/2022 | Liu et al. | |
| 11,516,480 B2 | 11/2022 | Zhang et al. | |
| 11,553,201 B2 | 1/2023 | Liu et al. | |
| 11,558,634 B2 | 1/2023 | Liu et al. | |
| 11,632,566 B2 | 4/2023 | Liu et al. | |
| 11,641,467 B2 | 5/2023 | Liu et al. | |
| 2007/0188607 A1 | 8/2007 | Jia et al. | |
| 2008/0063075 A1 | 3/2008 | Kondo et al. | |
| 2009/0304087 A1 | 12/2009 | Shibahara et al. | |
| 2011/0090969 A1 | 4/2011 | Sung et al. | |
| 2011/0176611 A1 | 7/2011 | Huang et al. | |
| 2012/0163711 A1 | 6/2012 | Nagone | |
| 2012/0230405 A1 | 9/2012 | An et al. | |
| 2012/0257678 A1 | 10/2012 | Zhou et al. | |
| 2013/0051467 A1 | 2/2013 | Zhou et al. | |
| 2013/0089145 A1 | 4/2013 | Guo et al. | |
| 2013/0136179 A1 | 5/2013 | Lim et al. | |
| 2013/0156096 A1 | 6/2013 | Yang | |
| 2013/0202037 A1 | 8/2013 | Wang et al. | |
| 2013/0272415 A1 | 10/2013 | Zhou | |
| 2013/0279596 A1 | 10/2013 | Gisquet et al. | |
| 2013/0287097 A1 | 10/2013 | Song et al. | |
| 2014/0002594 A1 | 1/2014 | Chan et al. | |
| 2014/0003512 A1 | 1/2014 | Sato | |
| 2014/0072041 A1 | 3/2014 | Seregin et al. | |
| 2014/0177706 A1 | 6/2014 | Fernandes et al. | |
| 2014/0226721 A1 | 8/2014 | Joshi et al. | |
| 2014/0286408 A1 | 9/2014 | Zhang et al. | |
| 2014/0294078 A1 | 10/2014 | Seregin et al. | |
| 2015/0043634 A1 | 2/2015 | Lin et al. | |
| 2015/0063440 A1 | 3/2015 | Pang et al. | |
| 2015/0181216 A1 | 6/2015 | Zhang et al. | |
| 2015/0195527 A1 | 7/2015 | Zhou et al. | |
| 2015/0229926 A1 | 8/2015 | Puri | |
| 2015/0229955 A1 | 8/2015 | Seregin et al. | |
| 2015/0264396 A1 | 9/2015 | Zhang et al. | |
| 2015/0264406 A1 | 9/2015 | Kim et al. | |
| 2015/0365649 A1 | 12/2015 | Chen et al. | |
| 2015/0373358 A1 | 12/2015 | Pang et al. | |
| 2016/0219278 A1 | 7/2016 | Chen et al. | |
| 2016/0227214 A1 | 8/2016 | Rapaka et al. | |
| 2016/0249056 A1 | 8/2016 | Tsukuba et al. | |
| 2016/0286229 A1 | 9/2016 | Li et al. | |
| 2016/0286232 A1 | 9/2016 | Li et al. | |
| 2016/0345011 A1 | 11/2016 | Naing et al. | |
| 2016/0360205 A1 | 12/2016 | Chang et al. | |
| 2017/0034526 A1 | 2/2017 | Rapaka et al. | |
| 2017/0094305 A1 | 3/2017 | Li et al. | |
| 2017/0332095 A1 | 11/2017 | Zou et al. | |
| 2017/0332099 A1 | 11/2017 | Lee et al. | |
| 2017/0339405 A1 | 11/2017 | Wang et al. | |
| 2018/0014028 A1 | 1/2018 | Liu et al. | |
| 2018/0098097 A1 | 4/2018 | Huang et al. | |
| 2018/0109806 A1 | 4/2018 | Zhou et al. | |
| 2018/0176587 A1 | 6/2018 | Panusopone et al. | |
| 2018/0176596 A1 | 6/2018 | Jeong et al. | |
| 2018/0192072 A1 | 7/2018 | Chen et al. | |
| 2018/0199057 A1 | 7/2018 | Chuang et al. | |
| 2018/0241998 A1 | 8/2018 | Chen et al. | |
| 2018/0249156 A1 | 8/2018 | Heo et al. | |
| 2018/0262773 A1 | 9/2018 | Chuang et al. | |
| 2018/0278942 A1 | 9/2018 | Zhang et al. | |
| 2018/0278949 A1 | 9/2018 | Karczewicz et al. | |
| 2018/0278950 A1 | 9/2018 | Chen et al. | |
| 2018/0288410 A1 | 10/2018 | Park et al. | |
| 2018/0295385 A1 | 10/2018 | Alshin et al. | |
| 2018/0309983 A1 | 10/2018 | Heo et al. | |
| 2018/0310017 A1 | 10/2018 | Chen et al. | |
| 2018/0324417 A1 | 11/2018 | Karczewicz et al. | |
| 2018/0352223 A1 | 12/2018 | Chen et al. | |
| 2018/0376148 A1 | 12/2018 | Zhang et al. | |
| 2018/0376149 A1 | 12/2018 | Zhang et al. | |
| 2018/0376166 A1 | 12/2018 | Chuang et al. | |
| 2019/0045184 A1 | 2/2019 | Zhang et al. | |
| 2019/0045215 A1 | 2/2019 | Chen et al. | |
| 2019/0191180 A1 | 6/2019 | An et al. | |
| 2019/0222848 A1 | 7/2019 | Chen et al. | |
| 2019/0238883 A1 | 8/2019 | Chen et al. | |
| 2019/0306502 A1 | 10/2019 | Gadde et al. | |
| 2019/0320197 A1 | 10/2019 | Chen et al. | |
| 2019/0320199 A1 | 10/2019 | Chen et al. | |
| 2019/0387234 A1 | 12/2019 | Wang et al. | |
| 2020/0021833 A1 | 1/2020 | Xu et al. | |
| 2020/0029091 A1 | 1/2020 | Chien et al. | |
| 2020/0051288 A1 | 2/2020 | Lim et al. | |
| 2020/0053386 A1 | 2/2020 | Abe et al. | |
| 2020/0068218 A1 | 2/2020 | Chen et al. | |
| 2020/0077086 A1 | 3/2020 | Lee | |
| 2020/0092545 A1 | 3/2020 | Xu et al. | |
| 2020/0128258 A1 * | 4/2020 | Chen .................. | H04N 19/533 |
| 2020/0137416 A1 | 4/2020 | Esenlik et al. | |
| 2020/0137422 A1 | 4/2020 | Misra et al. | |
| 2020/0177878 A1 | 6/2020 | Choi et al. | |
| 2020/0213590 A1 | 7/2020 | Kim et al. | |

(56) References Cited

U.S. PATENT DOCUMENTS

| | | |
|---|---|---|
| 2020/0221110 A1 | 7/2020 | Chien et al. |
| 2020/0252605 A1 | 8/2020 | Xu et al. |
| 2020/0260070 A1 | 8/2020 | Yoo et al. |
| 2020/0277878 A1 | 9/2020 | Avis et al. |
| 2020/0296414 A1 | 9/2020 | Park et al. |
| 2020/0314432 A1 | 10/2020 | Wang et al. |
| 2020/0344475 A1 | 10/2020 | Zhu et al. |
| 2020/0366902 A1 | 11/2020 | Jeong et al. |
| 2020/0382795 A1 | 12/2020 | Zhang et al. |
| 2020/0382807 A1 | 12/2020 | Liu et al. |
| 2020/0396453 A1 | 12/2020 | Zhang et al. |
| 2020/0413069 A1 | 12/2020 | Lim et al. |
| 2020/0413082 A1 | 12/2020 | Li et al. |
| 2021/0029362 A1 | 1/2021 | Liu et al. |
| 2021/0029370 A1 | 1/2021 | Li et al. |
| 2021/0037256 A1 | 2/2021 | Zhang et al. |
| 2021/0051339 A1 | 2/2021 | Liu et al. |
| 2021/0076063 A1 | 3/2021 | Liu et al. |
| 2021/0092435 A1 | 3/2021 | Liu et al. |
| 2021/0105485 A1 | 4/2021 | Zhang et al. |
| 2021/0144366 A1 | 5/2021 | Zhang et al. |
| 2021/0144388 A1 | 5/2021 | Zhang et al. |
| 2021/0144392 A1 | 5/2021 | Zhang et al. |
| 2021/0144400 A1 | 5/2021 | Liu et al. |
| 2021/0160527 A1 | 5/2021 | Chuang et al. |
| 2021/0168357 A1 | 6/2021 | Toma et al. |
| 2021/0211716 A1 | 7/2021 | Zhang et al. |
| 2021/0227245 A1 | 7/2021 | Liu et al. |
| 2021/0227250 A1 | 7/2021 | Liu et al. |
| 2021/0235083 A1 | 7/2021 | Liu et al. |
| 2021/0266530 A1 | 8/2021 | Liu et al. |
| 2021/0266585 A1 | 8/2021 | Liu et al. |
| 2021/0274205 A1 | 9/2021 | Park et al. |
| 2021/0274213 A1 | 9/2021 | Xiu et al. |
| 2021/0281865 A1 | 9/2021 | Liu et al. |
| 2021/0297688 A1 | 9/2021 | Xu et al. |
| 2021/0314586 A1 | 10/2021 | Li et al. |
| 2021/0329257 A1 | 10/2021 | Sathuraman et al. |
| 2021/0344952 A1 | 11/2021 | Xiu et al. |
| 2021/0368172 A1 | 11/2021 | Lim et al. |
| 2021/0377553 A1 | 12/2021 | Galpin et al. |
| 2021/0385481 A1 | 12/2021 | Liu et al. |
| 2021/0392371 A1 | 12/2021 | Lee et al. |
| 2022/0014761 A1 | 1/2022 | Zhang et al. |
| 2022/0078431 A1 | 3/2022 | Chujoh et al. |
| 2022/0086481 A1 | 3/2022 | Liu et al. |
| 2022/0368916 A1 | 11/2022 | Zhang et al. |

FOREIGN PATENT DOCUMENTS

| | | |
|---|---|---|
| CN | 102037732 A | 4/2011 |
| CN | 102934444 A | 2/2013 |
| CN | 103155563 A | 6/2013 |
| CN | 103202016 A | 7/2013 |
| CN | 103765897 A | 4/2014 |
| CN | 104702957 A | 6/2015 |
| CN | 105103556 A | 11/2015 |
| CN | 105163116 A | 12/2015 |
| CN | 105723454 A | 6/2016 |
| CN | 105959698 A | 9/2016 |
| CN | 107005713 A | 8/2017 |
| CN | 107360419 A | 11/2017 |
| CN | 107852499 A | 3/2018 |
| CN | 107925775 A | 4/2018 |
| CN | 107995489 A | 5/2018 |
| CN | 108028931 A | 5/2018 |
| CN | 108352074 A | 7/2018 |
| CN | 108353166 A | 7/2018 |
| CN | 108541375 A | 9/2018 |
| CN | 108702515 A | 10/2018 |
| CN | 108781294 A | 11/2018 |
| CN | 109191514 A | 1/2019 |
| CN | 110267045 A | 9/2019 |
| CN | 111010569 A | 4/2020 |
| EP | 2800368 A1 | 11/2014 |
| EP | 3301918 A1 | 4/2018 |
| EP | 3367681 A1 | 8/2018 |
| EP | 3383045 A1 | 10/2018 |
| EP | 3657794 A1 | 5/2020 |
| EP | 3849184 A1 | 7/2021 |
| JP | 2012191298 A | 10/2012 |
| JP | 2013240046 A | 11/2013 |
| JP | 2015510357 A | 4/2015 |
| KR | 100203281 B1 | 6/1999 |
| WO | 2005022919 A1 | 3/2005 |
| WO | 2008048489 A2 | 4/2008 |
| WO | 2013111596 A1 | 8/2013 |
| WO | 2015062002 A1 | 5/2015 |
| WO | 2015180014 A1 | 12/2015 |
| WO | 2015192353 A1 | 12/2015 |
| WO | 2016078511 A1 | 5/2016 |
| WO | 2016160609 A1 | 10/2016 |
| WO | 2017133661 A1 | 8/2017 |
| WO | 2017138393 A1 | 8/2017 |
| WO | 2017156669 A1 | 9/2017 |
| WO | 2017197146 A1 | 11/2017 |
| WO | 2018028559 A1 | 2/2018 |
| WO | 2018033661 A1 | 2/2018 |
| WO | 2018048265 A1 | 3/2018 |
| WO | 2018062892 A1 | 4/2018 |
| WO | 2018067823 A1 | 4/2018 |
| WO | 2018092869 A1 | 5/2018 |
| WO | 2018113658 A1 | 6/2018 |
| WO | 2018119233 A1 | 6/2018 |
| WO | 2018121506 A1 | 7/2018 |
| WO | 2018128417 A1 | 7/2018 |
| WO | 2018129172 A1 | 7/2018 |
| WO | 2018156628 A1 | 8/2018 |
| WO | 2018166357 A1 | 9/2018 |
| WO | 2018171796 A1 | 9/2018 |
| WO | 2018210315 A1 | 11/2018 |
| WO | 2020167097 A1 | 8/2020 |
| WO | 2020186119 A1 | 9/2020 |
| WO | 2020190896 A1 | 9/2020 |
| WO | 2021058033 A1 | 4/2021 |

OTHER PUBLICATIONS

Akula et al. "Description of SDR, HDR and 360 degree Video Coding Technology Proposal Considering Mobile Application Scenario by Samsung, Huawei, GoPro, and HiSilicon," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J0024, 2018.

Blaser et al. "Geometry-based Partitioning for Predictive Video Coding with Transform Adaptation," 2018, IEEE.

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE9.5.2: BIO with Simplified Gradient Calculation, Adaptive BIO Granularity, and Applying BIO to Chroma Components," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0255, 2018.

Chen et al. "CE9-Related: Simplified DMVR with Reduced Internal Memory," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0098, 2018.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

Chuang et al. "EE2-Related: A Simplified Gradient Filter for Bi-Directional Optical Flow (BIO)," Joint Video Exploration Team

(56) References Cited

OTHER PUBLICATIONS (JVET) of ITU-T SG 16 WP 3 and ISO/IEC JTC 1/SC 29/WG 11, 7th Meeting, Torino, IT, Jul. 13-21, 2017, document G0083, 2017.
Esenlik et al. "Description of Core Experiment 9 (CE9): Decoder Side Motion Vector Derivation," Joint Video Exploration Team (JVET) of ITU-T SG 16 WP 3 and ISO/IEC JTC 1/SC 29/WG 11, 10th Meeting, San Diego, US, Apr. 10-20, 2018, document JVET-J1029, 2018.
Esenlik et al. "CE9: DMVR with Bilateral Matching (Test2.9)," Joint Video Experts Team (JVET) of ITU-T SG 16 WP 3 and ISO/IEC JTC 1/SC 29/WG 11, 11th Meeting, Ljubljana, SI, 10-18, Jul. 2018, document JVET-K0217, 2018.
Esenlik et al. "CE9: Report on the Results of Tests CE9.2.15 and CE9.2.16," Joint Video Experts Team (JVET) of ITU-T SG 16 WP 3 and ISO/IEC JTC 1/SC 29/WG 11, 12th Meeting, Macao, CN, Oct. 3-12, 2018, docu,emt JVET-L0163, 2018.
"JEM-7.0 httpsjvet.hhi.fraunhofer.desvnsvn_HMJEMSoftwaretags HM-16.6-JEM-7.0. (onlywebsite)".
https://vcgit.hhi.fraunhofer.de/jvet/VVCSoftware_VTM/tags/VTM-2.1.
"ITU-T H.265 ""High efficiency video coding"" Series H: Audiovisual and Multimedia SystemsInfrastructure of audiovisual services—Coding of movingvideo,TelecommunicationStandardization Sectorof ITU, Available at address: https://www.itu.int/rec/T-REC-H.265 (Nov. 2019)."
"Information Technology—High Efficiency Coding and Media Delivery in Heterogeneous Environments—Part 2: High Efficiency Video Coding" Apr. 20, 2018, ISO/DIS 23008, 4th Edition.
Jeong et al. "CE4 Ulitmate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.
Kamp et al. "Decoder Side Motion Vector Derivation for Inter Frame Video Coding," 2008, IEEE, RWTH Aachen University, Germany.
Kamp et al. "Fast Decoder Side Motion Vector Derivation for Inter Frame Video Coding," 2009, RWTH Aachen University, Germany.
Klomp et al. "Decoder-Side Block Motion Estimation for H.264 / MPEG-4 AVC Based Video Coding," 2009, IEEE, Hannover, Germany, pp. 1641-1644.
Li et al. "CE4-Related: Affine Merge Mode with Prediction Offsets," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0320, 2018.
Liu et al. "CE9-Related: Motion Vector Refinement in Bi-Directional Optical Flow," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0333, 2018.
Murakami et al., "Advanced B Skip Mode with Decoder-side Motion Estimation," Hitachi, 2012, 37th VCEG Meeting at Yokohama, VCEG-AK12.
Rosewarne et al. "High Efficiency Video Coding (HEVC) Test Model 16 (HM 16) Improved Encoder Description Update 7," Joint Collaborative Team on Video Coding (JCT-VC) ITU-T SG 16 WP3 and ISO/IEC JTC1/SC29/WG11, 25th Meeting, Chengdu, CN, Oct. 14-21, 2019, document JCTVC-Y1002, 2016.
Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 11-18, 2018, document No. JVET-K0248, 2018.
Ueda et al. "TE1.a: Implementation Report of Refinement Motion Compensation Using DMVD on TMuC," Joint Collaborative Team on Video Coding (JCT-VC) of ITU-T SG16 WP3 and ISO/IEC JTC1/SC29/WG11, 3rd Meeting, Guangzhou, CN Oct. 7-15, 2010, document JCTVC-C138, 2010.
Winken et al. "CE10:Multi-Hypothesis Inter Prediction (Tests 1.5-1.8)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0269, 2018.

Xiu et al. "CE9-Related: Complexity Reduction and Bit-Width Control for Bi-Directional Optical Flow (BIO)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0256, 2018.
Zhang et al. "CE4-Related: Interweaved Prediction for Affine Motion Compensation," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0102, 2018.
International Search Report and Written Opinion from International Patent Application No. PCT/CN2019/119634 dated Feb. 26, 2020 (11 pages).
International Search Report and Written Opinion from International Patent Application No. PCT/IB2019/058994 dated Jan. 2, 2020 (16 pages).
International Search Report and Written Opinion from International Patent Application No. PCT/IB2019/058995 dated Jan. 17, 2020 (16 pages).
International Search Report and Written Opinion from International Patent Application No. PCT/IB2019/058996 dated Jan. 2, 2020 (15 pages).
International Search Report and Written Opinion from International Patent Application No. PCT/IB2019/058997 dated Jan. 16, 2020 (18 pages).
Non-Final Office Action from U.S. Appl. No. 17/154,485 dated Mar. 23, 2021.
Non-Final Office Action from U.S. Appl. No. 17/317,522 dated Mar. 1, 2022.
Alshin et al. "Bi-Directional Optical Flow for Improving Motion Compensation," Dec. 8-10, 2010, 28th Picture Coding Symposium, PCS2010, Nagoya, Japan, pp. 422-425.
Alshin et al. "AHG6: On BIO Memory Bandwidth," Joint Video Exploration Team (JVET) of ITU-T SG 16 WP 3 and ISO/IEC JTC 1/SC 29/WG 11, 4th Meeting, Chengdu, CN, Oct. 15-21, 2016, document JVET-D0042, 2016.
Bross et al. "Versatile Video Coding (Draft 4)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M1001, 2019.
Bross et al. "Versatile Video Coding (Draft 5)," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N1001, 2019.
Hsu et al. "Description of Core Experiment 10: Combined and Multi-Hypothesis Prediciton," Joint Video Experts Team (JVET) of ITU-T SG 16 WP 3 and ISO/IEC JTC 1/SC 29/WG 11, 10th Meeting, San Diego, US, Apr. 10-20, 2018, document JVET-J1030, 2018.
ITU-T H.265 ""High efficiency video coding"" Series H: Audiovisual and Multimedia SystemsInfrastructure of audiovisual services—Coding of movingvideo,TelecommunicationStandardization Sectorof ITU, (Feb. 2018).
Lai et al. "CE9-Related: BIO Simplification," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0099, 2018.
Liu et al. "CE9-Related: Simplification of Decoder Side Motion Vector Derivation," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0105, 2018.
Luo et al. "CE9.2.7: Complexity Reduction on Decoder-Side Motion Vector Refinement (DMVR)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0196, 2018.
Xiu et al. "CE9.5.3: Bi-Directional Optical Flow (BIO) Simplification," Joint Video Experts Team (JVET) of ITU-T SG 16 WP 3 and ISO/IEC JTC 1/SC 29/WG 11, 11th, Meeting, Ljubljana, SI, Jul. 10-18, 2018, document JVET-K0344, 2018.
Partial Supplementary European Search Report from European Patent Application No. 19887639.3 dated Oct. 27, 2021.

(56) References Cited

OTHER PUBLICATIONS

International Search Report and Written Opinion from International Patent Application No. PCT/CN2019/119742 dated Feb. 19, 2020 (12 pages).
International Search Report and Written Opinion from International Patent Application No. PCT/CN2019/119756 dated Feb. 7, 2020 (10 pages).
International Search Report and Written Opinion from International Patent Application No. PCT/CN2019/119763 dated Feb. 26, 2020 (12 pages).
International Search Report and Written Opinion from International Patent Application No. PCT/CN2020/082937 dated Jun. 30, 2020 (10 pages).
International Search Report and Written Opinion from International Patent Application No. PCT/CN2020/088927 dated Aug. 12, 2020 (9 pages).
Non-Final Office Action from U.S. Appl. No. 17/244,633 dated Jan. 6, 2022.
Notice of Allowance from U.S. Appl. No. 17/405,179 dated Jan. 12, 2022.
Non-Final Office Action from U.S. Appl. No. 17/225,504 dated Jan. 19, 2022.
Chujoh et al. "CE9-related: An Early Termination of DMVR," Joint Video Experts Team (JVET of ITU-T SG 16 WP 3 and ISO/IEC JTC 1/SC 29/WG 11 12th Meeting: Macao, CN, Oct. 3-12, 2018. document JVET-L0367, 2018.
Esenlik et al. "Simplified DMVR for Inclusion in VVC," Joint Video Experts Team (JVET) of ITU-T SG 16 WP 3 an ISO/IEC JTC 1/SC 29/WG 1 12th Meeting: Macao, CN, Oct. 3-12, 2018, document JVET-L0670, 2018.
Non-Final Office Action from U.S. Appl. No. 17/230,004 dated Jun. 14, 2022.
Non-Final Office Action from U.S. Appl. No. 17/244,633 dated Apr. 29, 2022.
Bross et al. "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, document JVET-P2001, 2019. (cited in EP20782973.0 EESR mailed Mar. 7, 2022).
Esenlik et al. "BoG Report on PROF/BDOF Harmonization Contributions (CE4&CE9 related)," Joint Video Experts Team (JVET) of ITU-T SG 16 WP 3 and ISO/IEC JTC 1/SC 29/WG 11 15th Meeting: Gothenburg, SE, Jul. 3-12, 2019, document JVET-01133, 2019. (cited in EP20782973.0 EESR mailed Mar. 7, 2022).
Liu et al. "Non-CE9: Unified Gradient Calculations in BDOF," Joint Video Experts Team (JVET)of ITU-T SG 16 WP 3 an ISO/IEC JTC 1/SC 29/WG 11 15th Meeting: Gothenburg, SE, Jul. 3-12, 2019, document JVET-00570, 2019. (cited in EP20782973.0 EESR mailed Mar. 7, 2022).
Park et al. "Non-CE9 : Mismatch Between Text Specification and Reference Software on BDOF and DMVR," Joint Video Experts Team (JVET)of ITU-T SG 16 WP 3 and ISO/IEC JTC 1/SC 29/WG 11 14th Meeting: Geneva, CH, Mar. 19-27, 2019, document JVET-N0444, 2019. (cited in EP20782973.0 EESR mailed Mar. 7, 2022).
Sethuraman et al. "Non-CE9: Methods for BDOF Complexity Reduction," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0517, 2019. (cited in EP20782973.0 EESR mailed Mar. 7, 2022).
Toma et al. "Description of SDR Video Coding Technology Proposal by Panasonic," Joint Video Experts Team (JVET) of ITU-T SG 16 WP 3 and ISO/IEC JTC 1/SC 29/WG 11 10th Meeting, San Diego, US, Apr. 10-20, 2018, document JVET-J0020, 2018. (cited in EP19887639.3 EESR mailed Mar. 15, 2022).
Xiu et al. "CE10-Related: Simplification on Combined Inter and Intra Prediction (CIIP)," Joint Video Experts Team (JVET)of ITU-T SG 16 WP 3 and ISO/IEC JTC 1/SC 29/WG 11 14th Meeting: Geneva, CH, Mar. 19-27, 2019, document JVET-N0327, 2019. (cited in JP2021-525770 OA mailed May 10, 2022).
Extended European Search Report from European Patent Application No. 20782973.0 dated Mar. 7, 2022.
Extended European Search Report from European Patent Application No. 19887639.3 dated Mar. 15, 2022.
Luo et al. "CE2-Related: Prediciton Refinement with Optical Flow for Affine Mode," Joint Video Experts Team (JVET) of ITU-T SG 16 WP 3 and ISO/IEC JTC 1/SC 29/WG 11 14th Meeting, Geneva, CH, Mar. 19-27, 2019, document JVET-N0236, 2019.
Non-Final Office Action from U.S. Appl. No. 17/317,522 dated Sep. 6, 2022.
Albrecht et al. "Description of SDR, HDR, and 360 Degree Video Coding Technology Proposal by Fraunhofer HHI," Joint Video Experts Team (JVET0 of ITU-T SG 16 WP 3 and ISO/IEC JTC 1/SC 29/WG 11, 10th Meeting, San Diego, US, Apr. 10-20, 2018, document JVET-J0014, 2018.
Alshin et al. "EE3: Bi-Directional Optical Flow w/o Block Extension," Joint Video Exploration Team (JVET) of ITU-T SG 16 WP 3 and ISO/IEC JTC 1/SC 29/WG 11, 5th Meeting, Geneva, CH, Jan. 12-20, 2020, document JVET-E0028, 2017.
Alshina et al. "Bi-Directional Optical Flow," Joint Collaborative Team on Video Coding (JCTVC) of ITU-T SG 16 WP 3 and ISO/IEC JTC1/SC 29/WG 11 3rd Meeting, Guangzhou, CN Oct. 7-15, 2010, document JCTVC-C204, 2010.
Bross et al. "CE3: Multiple Reference Line Intra Prediction (Test1.1.1, 1.1.2, 1.1.3 and 1.1.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0283, 2018.
Bross et al. "Versatile Video Coding (Draft 3)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L1001, 2018.
Cha et al. "Improved Combined Inter-Intra Prediction Using Spatial-Variant Weighted Coefficient," IEEE, School of Electric and Computer Engineering, Hong Kong University of Science and Technology, 2011.
Chen et al. "A Pre-Filtering Approach to Exploit Decoupled Prediction and Transform Block Structures in Video Coding," IEEE, Department of Electrical and Computer Engineering, Santa Barbara, CA, 2014.
Chen et al. "Generalized Bi-Prediction for Inter Coding," Joint Video Exploration Team (JVET) of ITU-T SG 16 WP 3 and ISO/IEC JTC 1/SC 29/WG 11, 3rd Meeting, Geneva, CH, May 26-Jun. 1, 2016, document JVET-C0047, 2016.
Chen et al. "CE4: Affine Merge Enhancement (Test 2.10)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0186, 2018.
Chen et al. "AHG5: Reducing VVC Worst-Case Memory Bandwidth by Restricting Bi-Directional 4x4 Inter CUs/Sub-blocks," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0104, 2018.
Chen et al. "CE4: Cross-Model Inheritance for Affine Candidate Derivation (Test 4.1.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0363, 2018.
Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.
Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-0368, 2018.
Chen et al. "CE4-Related: Reducing Worst Case Memory Bandwidth in Inter Prediction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0371, 2018.
Chen et al. "CE2.5.1: Simplification of SBTMVP," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0165, 2019.

(56) References Cited

OTHER PUBLICATIONS

Chen et al. "Algorithm Description for Versatile Video Coding and Test Model 4 (VTM 4)" Joint Video Experts Team JVET) of ITU-T SG 16 WP 3 and ISO/IEC JTC 1/SC 29/WG 11, 13th Meeting: Marrakech, MA, Jan. 9-18, 2019, document JVET-M1002, 2019.
Chiang et al. "CE10.1: Combined and Multi-Hypothesis Prediction," Joint Video Experts Team (JVET) of ITU-T SG 16 WP 3 and ISO/IEC JTC 1/SC 29/WG 11 11th Meeting: Ljubljana, SI, Jul. 10-18, 2018, document JVET-K0257, 2018.
Chien et al. "CE2-related: Worst-case Memory Bandwidth Reduction for VVC," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0400, 2019.
Deng et al. "CE4-1.14 Related: Block Size Limitation of Enabling TPM and GEO," Joint Video Experts Team (JVET) of ITU-T SG 16 WP 3 and ISO/IEC JTC 1/SC 29/WG 11, 16th Meeting, Geneva, CH, Oct. 1-11, 2019, document JVET-P0663, 2019.
Gao et al. "CE4-Related: Sub-block MV Clipping in Affine Prediction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0317, 2018.
Gao et al. "CE4-Related: Sub-block MV Clipping in Planar Motion Vector Prediction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0319, 2018.
He et al. "CE4-Related: Encoder Speed-Up and Bug Fix for Generalized Bi-Prediction in BMS-2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0296, 2018.
Hsu et al. "Description of Core Experiment 10: Combined and Multi-Hypotheisis Prediction," Joint Video Experts Team (JVET) of ITU-T SG 16 WP 3 and ISO/IEC JTC 1/SC 29/WG 11, 12th Meeting, Macao, CN Oct. 3-12, 2018. document JVET-L1030, 2018.
Jin et al. "Combined Inter-Intra Prediction for High Definition Video Coding," Picture Coding Symposium, Nov. 2007.
Kakino et al. "6.1 The Role of Deblocking Filters: Deblocking Filter to Remove One Block Distortion," H.264 /AVC Text Book Three Editions, 2013.
Lee et al. "CE4: Simplified Affine MVP List Construction (Test 4.1.4)," Joint Video Experts Team (JVET) of ITU-T SG 16 WP 3 and ISO/IEC JTC 1/SC 29/WG 11, 12th Meeting, Macau, CN, Oct. 8-12, 2018, document JVET-L0141, 2018.
Li et al. "AHG5: Reduction of Worst Case Memory Bandwidth," Joint Video Exploration Team (JVET) of ITU-T SG 16 WP 3 and ISO/IEC JTC 1/SC 29/WG 11, 12th Meeting: Macao, CN, Oct. 3-12, 2018, document JVET-L0122, 2018.
Liao et al. "CE10: Triangular Prediction Unit Mode (CE10.3.1 and CE10.3.2)," Joint Video Exploration Team (JVET) of ITU-T SG 16 WP 3 and ISO/IEC JTC 1/SC 29/WG 11 11th Meeting, Ljubljana, SI, Jul. 10-18, 2018 document JVET-K0144, 2018.
Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.
Lin et al. "CE4.2.3: Affine Merge Mode," Joint Video Experts Team (JVET) of ITU-T SG 16 WP 3 and ISO/IEC JTC 1/SC 29/WG 11, 12th Meeting, Macao, CN Oct. 3-12, 2018, document JVET-L0088, 2018.
Liu et al. "CE2-Related: Disabling Bi-Prediction or Inter-Prediction for Small Blocks," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0266, 2018.
Murakami et al. ""High Efficiency Video Coding,"" HEVC / H.265, 2013. pp. 85-88, 125-13 High-efficiency image symbolization technologyPage: 85-88; 109-116, 125-136.
Pham Van et al. "CE4-Related: Affine Restrictions for the Worst-Case Bandwidth Reduction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0396, 2018.
Pham Van et al. "Non-CE3: Removal of Chroma 2xN Blocks in CIIP Mode," Joint Video Experts Team (JVET) of ITU-T SG 16 WP 3 and ISO/IEC JTC 1/SC 29/WG 11 16th Meeting, Geneva, CH Oct. 1-11, 2019, document JVET-P0596, 2019.
Racape et al. "CE3-Related: Wide-Angle Intra Prediction for Non-Square Blocks," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0500, 2018.
Sethuraman, Sriram. "CE9: Results of DMVR Related Tests CE9.2.1 and CE9.2.2," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0147, 2019.
Su et al. "CE4-Related: Generalized Bi-Prediction Improvements," Joint Video Experts Team (JVET) of ITU-T SG 16 WP 3 and ISO/IEC JTC 1/SC 29/WG 11, 12th Meeting, Macao, CN, 3-12, Oct. 2018, document JVET-L0197, 2018.
Su et al. "CE4-Related: Generalized Bi-Prediction Improvements Combined from JVET-L0197 and JVET-L0296," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0646, 2018.
Sullivan et al. "Overview of the High Efficiency Video Coding (HEVC) Standard," IEEE Transactions on Circuits and Systems for Video Technology, Dec. 2012, 22(12):1649-1668.
Winken et al. "CE10: Multi-Hypothesis Inter Prediction (Tests 1.2.a-1.2.c)." Joint Video Experts Team (JVET) of ITU-T SG 16 WP 3 and ISO/IEC JTC 1/SC 29/WG 11 12th Meeting: Macao, CN, Oct. 3-12, 2018, document JVET-L0148, 2018.
Xu et al. "CE10-Related: Inter Prediction Sample Filtering," Joint Video Experts Team (JVET) of ITU-T SG 16 WP 3 and ISO/IEC JTC 1/SC 29/WG 11, 12th Meeting, Macao, CN Oct. 3-12, 2018, document JVET-L0375, 2018.
Yang et al. "CE4-Related: Control Point MV Offset for Affine Merge Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0389, 2018.
Zhang et al. "CE4-Related: History-based Motion Vector Prediction," Joint Video Experts Team (JVET) of ITU-T SG 16 WP 3 and ISO/IEC JTC 1/SC 29/WG 11 11th Meeting, Ljubljana, SI, Jul. 10-18, 2018, document JVET-K0104, 2018.
Zhang et al. "CE4.5.2: Motion Compensated Boundary Pixel Padding," Joint Video Exploration Team (JVET) of ITU-T SG 16 WP 3 and ISO/IEC JTC 1/SC 29/WG 11, 11th Meeting, Ljubljana, SI, Jul. 10-18, 2018, document JVET-K0363, 2018.
Zhou et al. "AHG7: A Combined Study on JCTVC-10216 and JCTVC-10107," Joint Collaborative Team on Video Coding (JCT-VC) of ITU-T SG16 WP3 and ISO/IEC JTC1/SC29/WG 11 9th Meeting, Geneva, Switzerland, Apr. 27-May 7, 2012, document JCTVC I0425, 2012.
English translation of WO2020167097A1.
H.265/HEVC, https://www.itu.int/rec/T-REC-H.265.(only website).
VTM-2.0.1;http:vcgit.hhi.fraunhofer.de/jvet/VVCSoftware_VTM/tags/VTM-2.0.1.
Extended European Search Report from European Application No. 19883887.2 dated Aug. 20, 2021.
Partial Supplementary European Search Report from European Application No. 19885858.1 dated Oct. 28, 2021.
Extended European Search Report from European Application No. 19885858.1 dated Feb. 16, 2022.
Extended European Search Report from European Application No. 20766860.9 dated Feb. 16, 2022.
Extended European Search Report from European Application No. 20766773.4 dated Feb. 25, 2022.
Extended European Search Report from European Application No. 19883617.3 dated Apr. 11, 2022.
International Search Report and Written Opinion from International Patent Application No. PCT/CN2019/117508 dated Feb. 1, 2020 (9 pages).

(56) References Cited

OTHER PUBLICATIONS

International Search Report and Written Opinion from International Patent Application No. PCT/CN2019/117512 dated Jan. 31, 2020 (9 pages).
International Search Report and Written Opinion from International Patent Application No. PCT/CN2019/117519 dated Feb. 18, 2020 (12 pages).
International Search Report and Written Opinion from International Patent Application No. PCT/CN2019/117523 dated Feb. 18, 2020 (10 pages).
International Search Report and Written Opinion from International Patent Application No. PCT/CN2019/117528 dated Jan. 31, 2020 (9 pages).
International Search Report and Written Opinion from International Patent Application No. PCT/CN2019/117580 dated Jan. 23, 2020 (10 pages).
International Search Report and Written Opinion from International Patent Application No. PCT/CN2019/118779 dated Feb. 7, 2020 (9 pages).
International Search Report and Written Opinion from International Patent Application No. PCT/CN2019/118788 dated Jan. 23, 2020 (8 pages).
International Search Report and Written Opinion from International Patent Application No. PCT/CN2020/078107 dated Jun. 4, 2020 (10 pages).
International Search Report and Written Opinion from International Patent Application No. PCT/CN2020/078108 dated May 29, 2020 (12 pages).
International Search Report and Written Opinion from International Patent Application No. PCT/CN2020/080824 dated Jun. 30, 2020 (10 pages).
Final Office Action from U.S. Appl. No. 17/317,522 dated Apr. 12, 2023.
Non-Final Office Action from U.S. Appl. No. 17/534,968 dated Apr. 26, 2023.
Final Office Action from U.S. Appl. No. 17/154,639 dated Sep. 22, 2021.
Non-Final Office Action from U.S. Appl. No. 17/356,321 dated Jun. 7, 2022.
Final Office Action from U.S. Appl. No. 17/356,321 dated Oct. 5, 2022.
Final Office Action from U.S. Appl. No. 17/483,570 dated May 15, 2023.

\* cited by examiner

| Original Merge candidate list | | |
|---|---|---|
| Merge_idx | L0 | L1 |
| 0 | mvL0_A,ref0 | - |
| 1 | - | mvL1_B,ref0 |
| 2 | | |
| 3 | | |
| 4 | | |

| Merge candidate list after adding combined candidates | | |
|---|---|---|
| Merge_idx | L0 | L1 |
| 0 | mvL0_A,ref0 | combine |
| 1 | | mvL1_B,ref0 |
| 2 | mvL0_A,ref0 | mvL1_B,ref0 |
| 3 | | |
| 4 | | |

FIG. 7

UTILIZATION OF REFINED MOTION VECTOR

CROSS-REFERENCE TO RELATED APPLICATIONS

This application is a continuation of International Application No. PCT/IB2019/058996, filed on Oct. 22, 2019, which claims the priority to and benefits of International Patent Application No. PCT/CN2018/111181, filed on Oct. 22, 2018. All of the aforementioned patent applications are hereby incorporated by reference in their entireties.

TECHNICAL FIELD

This patent document relates to video coding techniques, devices and systems.

BACKGROUND

Motion compensation (MC) is a technique in video processing to predict a frame in a video, given the previous and/or future frames by accounting for motion of the camera and/or objects in the video. Motion compensation can be used in the encoding/decoding of video data for video compression.

SUMMARY

This document discloses methods, systems, and devices related to the use of motion compensation in video coding and decoding.

In one example aspect, a method for video processing is disclosed. The method comprises: refining motion vectors of a video block by using a motion refinement process; performing a motion compensation for at least one component of the video block using refined motion vectors of the video block; and performing a video processing on the video block based on the motion compensation.

In another example aspect, another video processing method is disclosed. The method comprises: refining motion vectors of a video block by using a motion refinement process; performing a prediction sample refinement for part of components of the video block using refined motion vectors of the video block; and performing a video processing on the video block based on the refined prediction sample.

In yet another representative aspect, the various techniques described herein may be embodied as a computer program product stored on a non-transitory computer readable media. The computer program product includes program code for carrying out the methods described herein.

In yet another representative aspect, a video decoder apparatus may implement a method as described herein.

In yet another representative aspect, a video processing apparatus comprising a processor configured to implement the method as described herein.

The details of one or more implementations are set forth in the accompanying attachments, the drawings, and the description below. Other features will be apparent from the description and drawings, and from the claims.

BRIEF DESCRIPTION OF THE DRAWINGS

FIG. 7 shows an example of combined bi-predictive merge candidate

DETAILED DESCRIPTION

Figure 1:
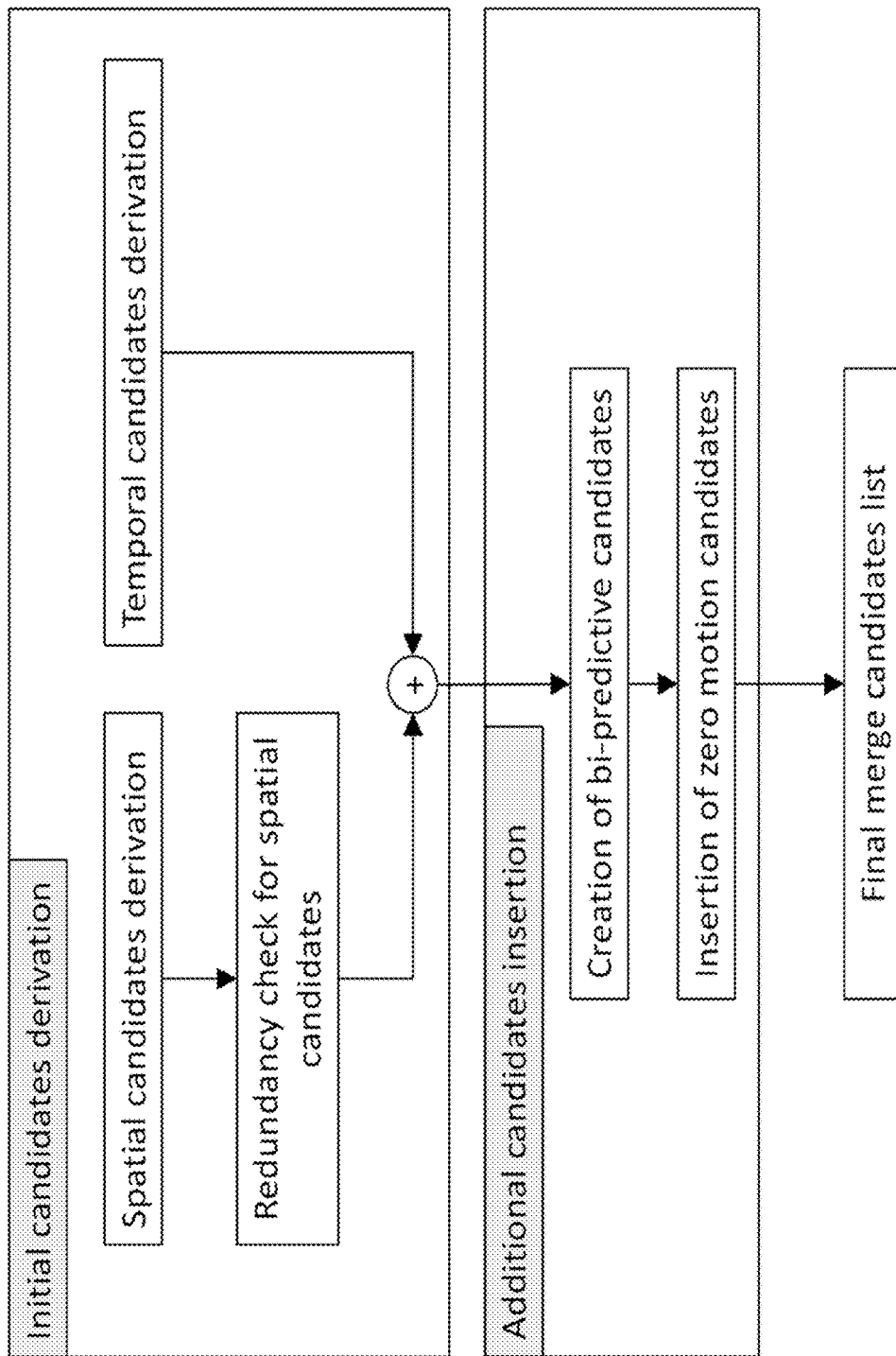
FIG. 1 shows an example of a derivation process for merge candidates list construction.

The present document provides several techniques that can be embodied into digital video encoders and decoders. Section headings are used in the present document for clarity of understanding and do not limit scope of the techniques and embodiments disclosed in each section only to that section.

1. Summary

The present document is related to video coding technologies. Specifically, it is related to motion compensation in video coding. The disclosed techniques may be applied to the existing video coding standard like HEVC, or the standard (Versatile Video Coding) to be finalized. It may be also applicable to future video coding standards or video codec.

In the present document, the term "video processing" may refer to video encoding, video decoding, video compression or video decompression. For example, video compression algorithms may be applied during conversion from pixel representation of a video to a corresponding bitstream representation or vice versa.

2. Introduction

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Inter Prediction in HEVC/H.265

Each inter-predicted PU has motion parameters for one or two reference picture lists. Motion parameters include a motion vector and a reference picture index. Usage of one of the two reference picture lists may also be signalled using inter_pred_idc. Motion vectors may be explicitly coded as deltas relative to predictors.

When a CU is coded with skip mode, one PU is associated with the CU, and there are no significant residual coefficients, no coded motion vector delta or reference picture index. A merge mode is specified whereby the motion parameters for the current PU are obtained from neighbouring PUs, including spatial and temporal candidates. The merge mode can be applied to any inter-predicted PU, not only for skip mode. The alternative to merge mode is the explicit transmission of motion parameters, where motion vector (to be more precise, motion vector difference compared to a motion vector predictor), corresponding reference picture index for each reference picture list and reference picture list usage are signalled explicitly per each PU. Such a mode is named Advanced motion vector prediction (AMVP) in this disclosure.

When signalling indicates that one of the two reference picture lists is to be used, the PU is produced from one block of samples. This is referred to as 'uni-prediction'. Uni-prediction is available both for P-slices and B-slices.

When signalling indicates that both of the reference picture lists are to be used, the PU is produced from two blocks of samples. This is referred to as 'bi-prediction'. Bi-prediction is available for B-slices only.

The following text provides the details on the inter prediction modes specified in HEVC. The description will start with the merge mode.

2.1.1 Merge Mode 2.1.1.1 Derivation of Candidates for Merge Mode

When a PU is predicted using merge mode, an index pointing to an entry in the merge candidates list is parsed from the bitstream and used to retrieve the motion information. The construction of this list is specified in the HEVC standard and can be summarized according to the following sequence of steps:

Step 1: Initial candidates derivation
 Step 1.1: Spatial candidates derivation
 Step 1.2: Redundancy check for spatial candidates
 Step 1.3: Temporal candidates derivation
Step 2: Additional candidates insertion
 Step 2.1: Creation of bi-predictive candidates
 Step 2.2: Insertion of zero motion candidates These steps are also schematically depicted in FIG. 1. For spatial merge candidate derivation, a maximum of four merge candidates are selected among candidates that are located in five different positions. For temporal merge candidate derivation, a maximum of one merge candidate is selected among two candidates. Since constant number of candidates for each PU is assumed at decoder, additional candidates are generated when the number of candidates obtained from step 1 does not reach the maximum number of merge candidate (MaxNumMergeCand) which is signalled in slice header. Since the number of candidates is constant, index of best merge candidate is encoded using truncated unary binarization (TU). If the size of CU is equal to 8, all the PUs of the current CU share a single merge candidate list, which is identical to the merge candidate list of the 2N×2N prediction unit.

In the following, the operations associated with the aforementioned steps are detailed.

2.1.1.2 Spatial Candidates Derivation

Figure 2:
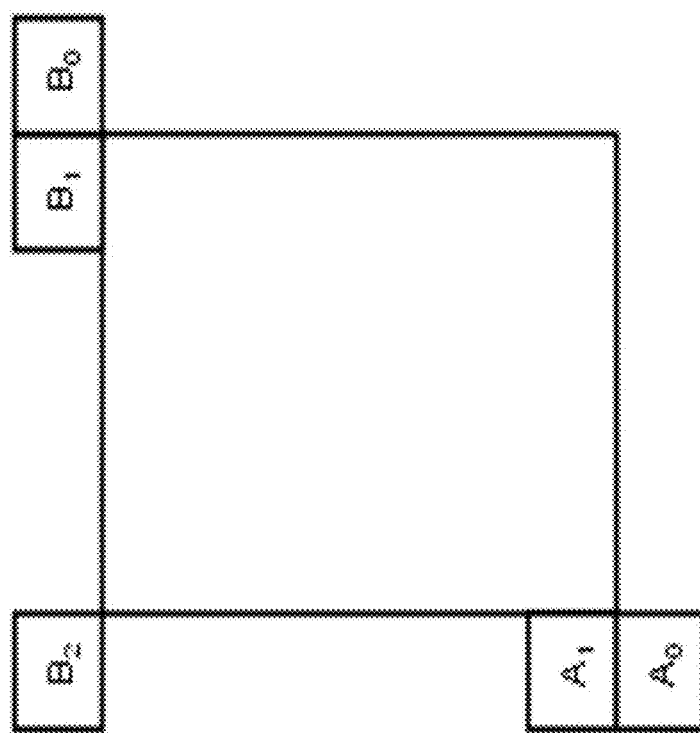
FIG. 2 shows example positions of spatial merge candidates.
Figure 3:
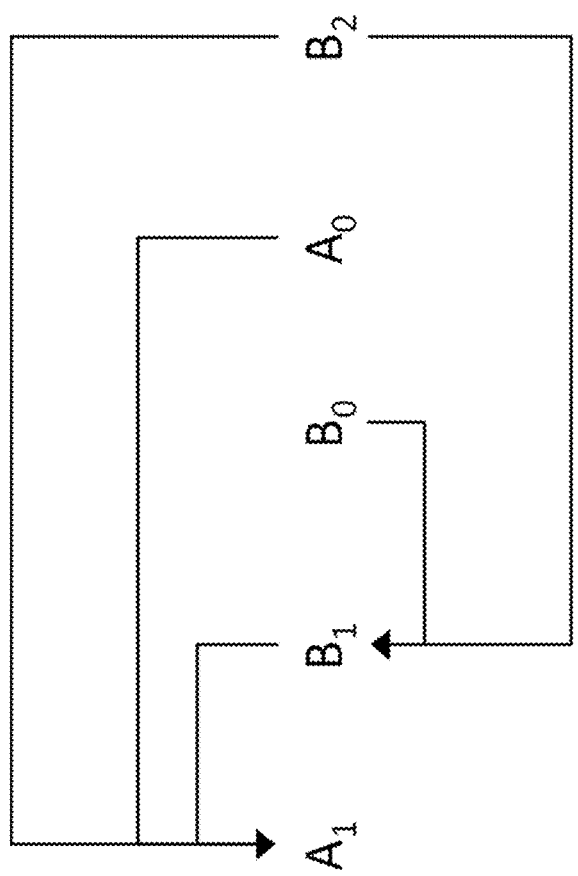
FIG. 3 shows examples of Candidate pairs considered for redundancy check of spatial merge candidates.
Figure 4:
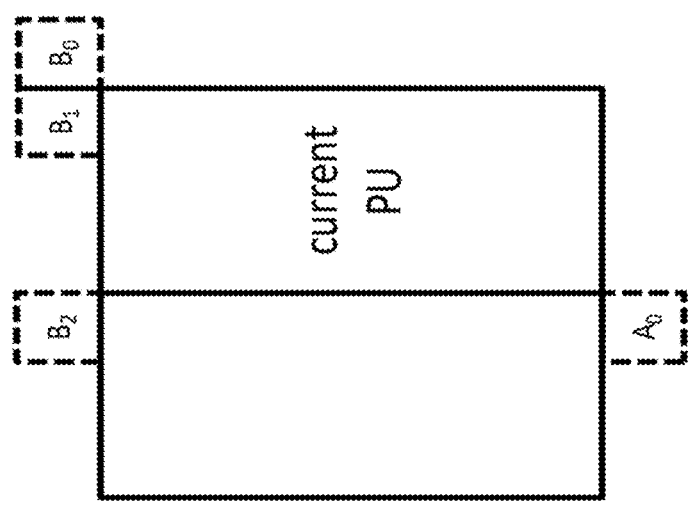
FIG. 4 shows example Positions for the second PU of N×2N and 2N×N partitions.
Figure 4:
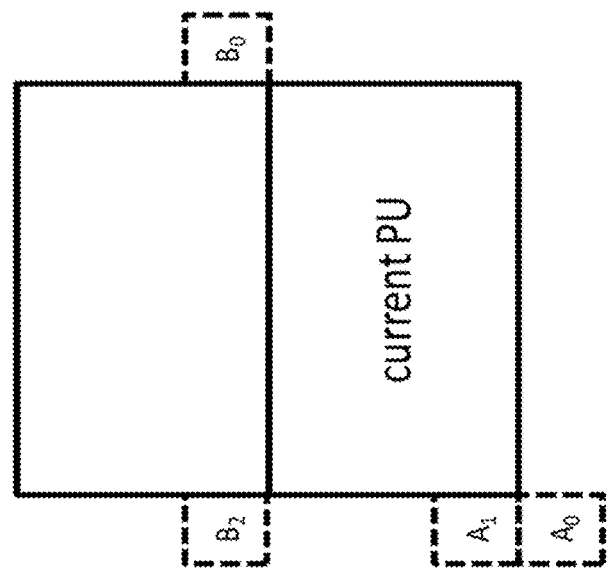

In the derivation of spatial merge candidates, a maximum of four merge candidates are selected among candidates located in the positions depicted in FIG. 2. The order of derivation is $A_1$, $B_1$, $B_0$, $A_0$ and $B_2$. Position $B_2$ is considered only when any PU of position $A_1$, $B_1$, $B_0$, $A_0$ is not available (e.g. because it belongs to another slice or tile) or is intra coded. After candidate at position $A_1$ is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. Instead only the pairs linked with an arrow in FIG. 3 are considered and a candidate is only added to the list if the corresponding candidate used for redundancy check has not the same motion information. Another source of duplicate motion information is the "second PU" associated with partitions different from 2N×2N. As an example, FIG. 4 depicts the second PU for the case of N×2N and 2N×N, respectively. When the current PU is partitioned as N×2N, candidate at position $A_1$ is not considered for list construction. In fact, by adding this candidate will lead to two prediction units having the same motion information, which is redundant to just have one PU in a coding unit. Similarly, position $B_1$ is not considered when the current PU is partitioned as 2N×N.

2.1.1.3 Temporal Candidates Derivation

Figure 5:
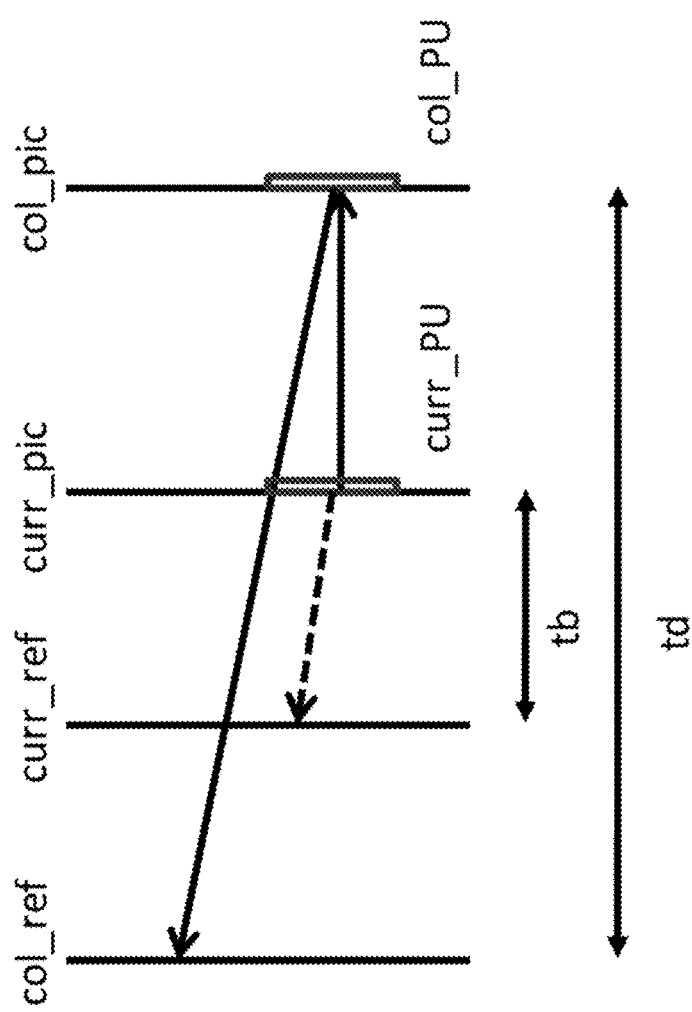
FIG. 5 is an Illustration of motion vector scaling for temporal merge candidate.

In this step, only one candidate is added to the list. Particularly, in the derivation of this temporal merge candidate, a scaled motion vector is derived based on co-located PU belonging to the picture which has the smallest POC difference with current picture within the given reference picture list. The reference picture list to be used for derivation of the co-located PU is explicitly signalled in the slice header. The scaled motion vector for temporal merge candidate is obtained as illustrated by the dotted line in FIG. 5 which is scaled from the motion vector of the co-located PU using the POC distances, tb and td, where tb is defined to be the POC difference between the reference picture of the current picture and the current picture and td is defined to be the POC difference between the reference picture of the co-located picture and the co-located picture. The reference picture index of temporal merge candidate is set equal to zero. A practical realization of the scaling process is described in the HEVC specification. For a B-slice, two motion vectors, one is for reference picture list 0 and the other is for reference picture list 1, are obtained and combined to make the bi-predictive merge candidate.

Figure 6:
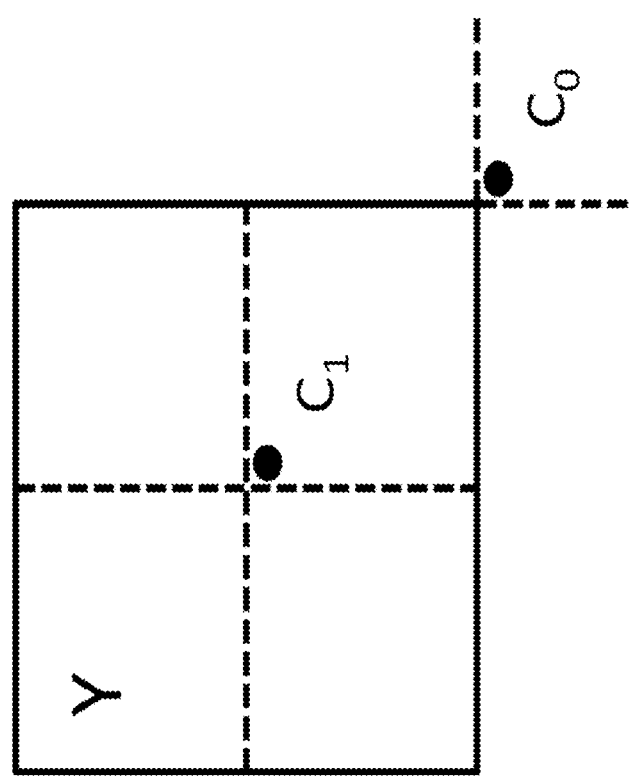
FIG. 6 shows examples of Candidate positions for temporal merge candidate, C0 and C1.

In the co-located PU (Y) belonging to the reference frame, the position for the temporal candidate is selected between candidates $C_0$ and $C_1$, as depicted in FIG. 6. If PU at position $C_0$ is not available, is intra coded, or is outside of the current CTU row, position $C_1$ is used. Otherwise, position $C_0$ is used in the derivation of the temporal merge candidate.

2.1.1.4 Additional Candidates Insertion

Besides spatial and temporal merge candidates, there are two additional types of merge candidates: combined bi-predictive merge candidate and zero merge candidate. Combined bi-predictive merge candidates are generated by utilizing spatial and temporal merge candidates. Combined bi-predictive merge candidate is used for B-Slice only. The combined bi-predictive candidates are generated by combining the first reference picture list motion parameters of an initial candidate with the second reference picture list motion parameters of another. If these two tuples provide different motion hypotheses, they will form a new bi-predictive candidate. As an example, FIG. 7 depicts the case when two candidates in the original list (on the left), which have mvL0 and refIdxL0 or mvL1 and refIdxL1, are used to create a combined bi-predictive merge candidate added to the final list (on the right). There are numerous rules regarding the combinations which are considered to generate these additional merge candidates.

Zero motion candidates are inserted to fill the remaining entries in the merge candidates list and therefore hit the MaxNumMergeCand capacity. These candidates have zero spatial displacement and a reference picture index which starts from zero and increases every time a new zero motion candidate is added to the list. The number of reference frames used by these candidates is one and two for uni and bi-directional prediction, respectively. Finally, no redundancy check is performed on these candidates.

2.1.1.5 Motion Estimation Regions for Parallel Processing

To speed up the encoding process, motion estimation can be performed in parallel whereby the motion vectors for all prediction units inside a given region are derived simultaneously. The derivation of merge candidates from spatial neighbourhood may interfere with parallel processing as one prediction unit cannot derive the motion parameters from an adjacent PU until its associated motion estimation is completed. To mitigate the trade-off between coding efficiency and processing latency, HEVC defines the motion estimation region (MER) whose size is signalled in the picture parameter set using the "log 2_parallel_merge_level_minus2" syntax element. When a MER is defined, merge candidates falling in the same region are marked as unavailable and therefore not considered in the list construction.

2.1.2 AMVP

AMVP exploits spatio-temporal correlation of motion vector with neighbouring PUs, which is used for explicit transmission of motion parameters. For each reference picture list, a motion vector candidate list is constructed by firstly checking availability of left, above temporally neighbouring PU positions, removing redundant candidates and adding zero vector to make the candidate list to be constant length. Then, the encoder can select the best predictor from the candidate list and transmit the corresponding index indicating the chosen candidate. Similarly with merge index signalling, the index of the best motion vector candidate is encoded using truncated unary. The maximum value to be encoded in this case is 2 (see FIG. 8). In the following sections, details about derivation process of motion vector prediction candidate are provided.

Figure 8:
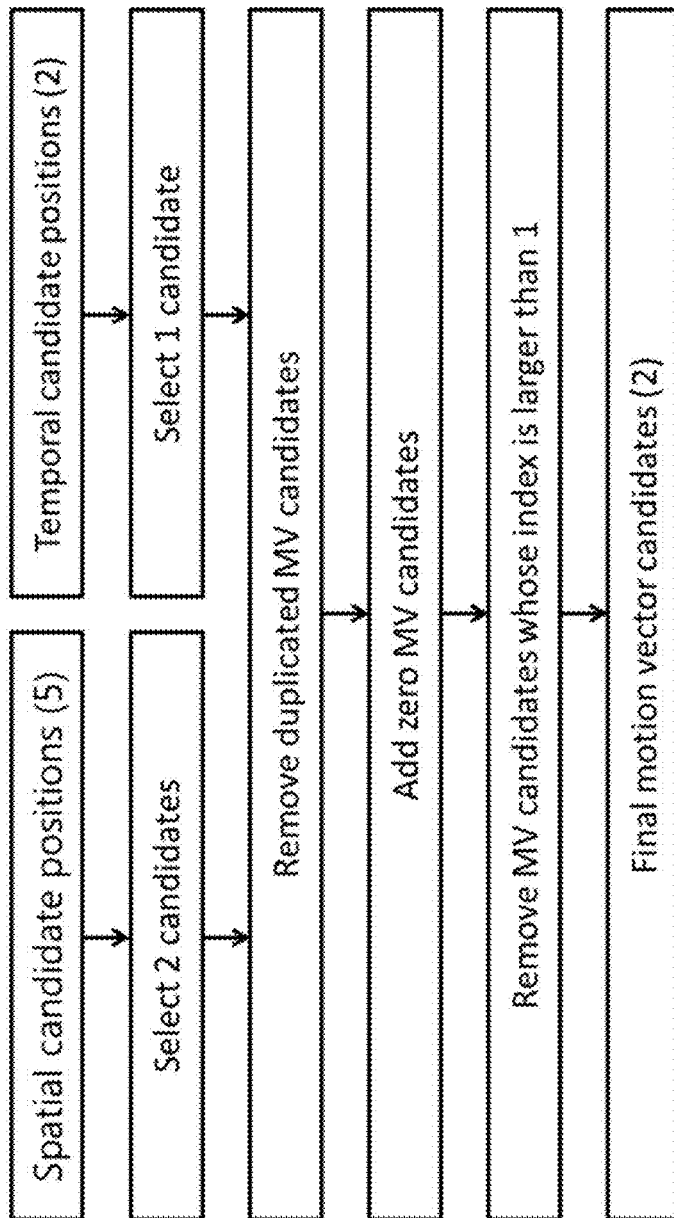
FIG. 8 shows an example of a derivation process for motion vector prediction candidates.

FIG. 8 summarizes derivation process for motion vector prediction candidate.

2.1.2.1 Derivation of AMVP Candidates

In motion vector prediction, two types of motion vector candidates are considered: spatial motion vector candidate and temporal motion vector candidate. For spatial motion vector candidate derivation, two motion vector candidates are eventually derived based on motion vectors of each PU located in five different positions as depicted in FIG. 2.

For temporal motion vector candidate derivation, one motion vector candidate is selected from two candidates, which are derived based on two different co-located positions. After the first list of spatio-temporal candidates is made, duplicated motion vector candidates in the list are removed. If the number of potential candidates is larger than two, motion vector candidates whose reference picture index within the associated reference picture list is larger than 1 are removed from the list. If the number of spatio-temporal motion vector candidates is smaller than two, additional zero motion vector candidates is added to the list.

2.1.2.2 Spatial Motion Vector Candidates

In the derivation of spatial motion vector candidates, a maximum of two candidates are considered among five potential candidates, which are derived from PUs located in positions as depicted in FIG. 2, those positions being the same as those of motion merge. The order of derivation for the left side of the current PU is defined as $A_0$, $A_1$, and scaled $A_0$, scaled $A_1$. The order of derivation for the above side of the current PU is defined as $B_0$, $B_1$, $B_2$, scaled $B_0$, scaled $B_1$, scaled $B_2$. For each side there are therefore four cases that can be used as motion vector candidate, with two cases not required to use spatial scaling, and two cases where spatial scaling is used. The four different cases are summarized as follows.

No spatial scaling
  (1) Same reference picture list, and same reference picture index (same POC)
  (2) Different reference picture list, but same reference picture (same POC)
Spatial scaling
  (3) Same reference picture list, but different reference picture (different POC)
  (4) Different reference picture list, and different reference picture (different POC)

The no-spatial-scaling cases are checked first followed by the spatial scaling. Spatial scaling is considered when the POC is different between the reference picture of the neighbouring PU and that of the current PU regardless of reference picture list. If all PUs of left candidates are not available or are intra coded, scaling for the above motion vector is allowed to help parallel derivation of left and above MV candidates. Otherwise, spatial scaling is not allowed for the above motion vector.

Figure 9:
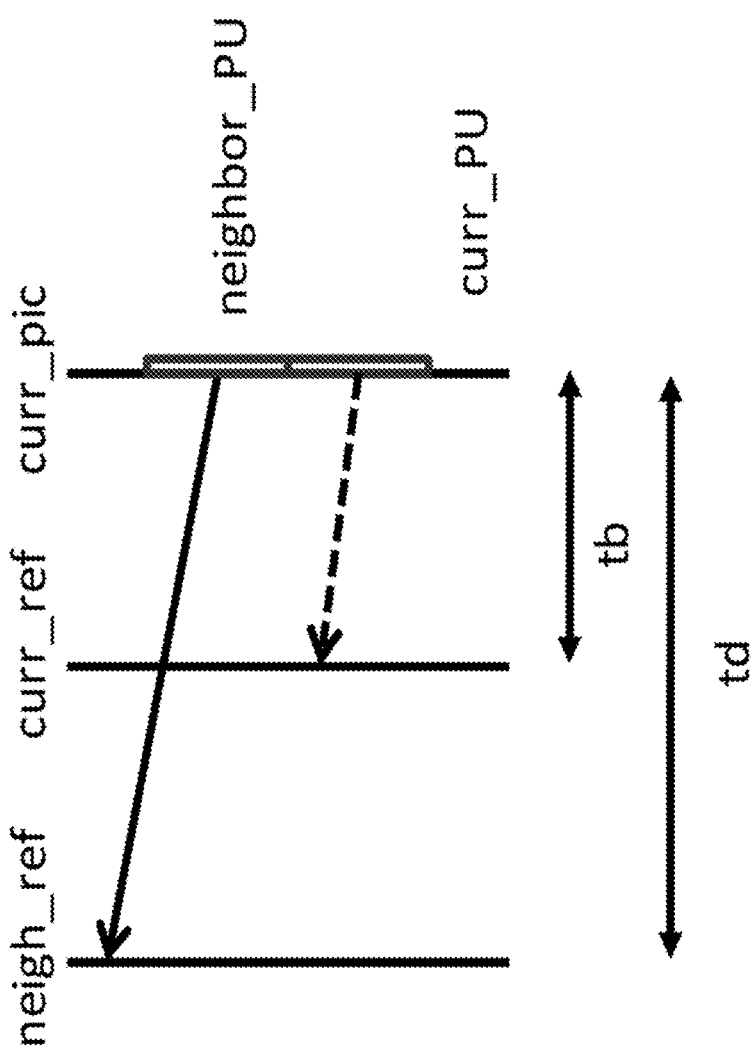
FIG. 9 is an example illustration of motion vector scaling for spatial motion vector candidate.
Figure 10:
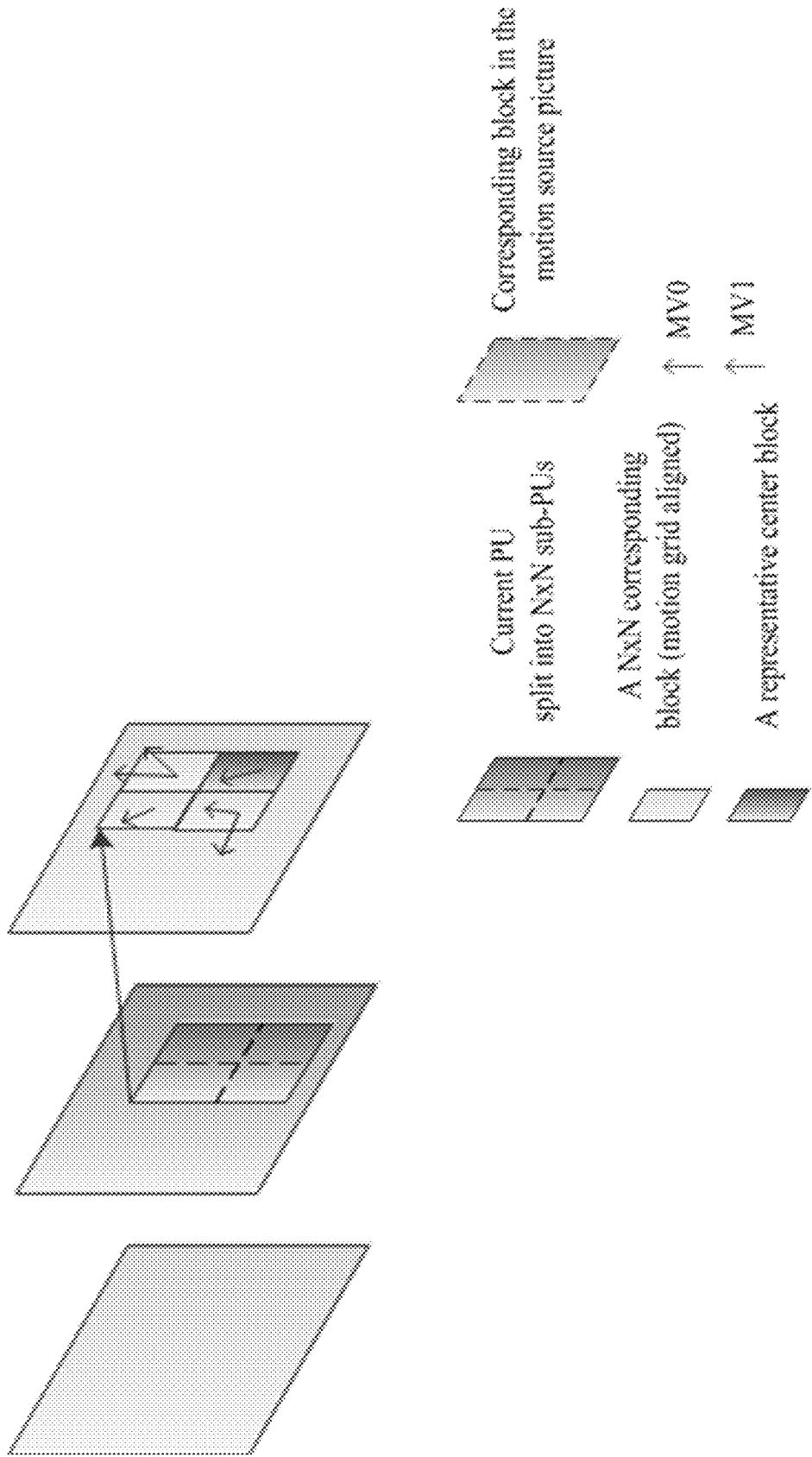
FIG. 10 illustrates an example of alternative temporal motion vector predictor (ATMVP) for a Coding Unit (CU).

In a spatial scaling process, the motion vector of the neighbouring PU is scaled in a similar manner as for temporal scaling, as depicted as FIG. 9. The main difference is that the reference picture list and index of current PU is given as input; the actual scaling process is the same as that of temporal scaling.

2.1.2.3 Temporal Motion Vector Candidates

Apart for the reference picture index derivation, all processes for the derivation of temporal merge candidates are the same as for the derivation of spatial motion vector candidates (see FIG. 6). The reference picture index is signalled to the decoder.

2.2 New Inter Prediction Methods in JEM 2.2.1 Sub-CU Based Motion Vector Prediction In the JEM with QTBT, each CU can have at most one set of motion parameters for each prediction direction. Two sub-CU level motion vector prediction methods are considered in the encoder by splitting a large CU into sub-CUs and deriving motion information for all the sub-CUs of the large CU. Alternative temporal motion vector prediction (ATMVP) method allows each CU to fetch multiple sets of motion information from multiple blocks smaller than the current CU in the collocated reference picture. In spatial-temporal motion vector prediction (STMVP) method motion vectors of the sub-CUs are derived recursively by using the temporal motion vector predictor and spatial neighbouring motion vector.

To preserve more accurate motion field for sub-CU motion prediction, the motion compression for the reference frames is currently disabled.

2.2.1.1 Alternative Temporal Motion Vector Prediction

In the alternative temporal motion vector prediction (ATMVP) method, the motion vectors temporal motion vector prediction (TMVP) is modified by fetching multiple sets of motion information (including motion vectors and reference indices) from blocks smaller than the current CU. As shown in the figure, the sub-CUs are square N×N blocks (N is set to 4 by default).

ATMVP predicts the motion vectors of the sub-CUs within a CU in two steps. The first step is to identify the corresponding block in a reference picture with a so-called temporal vector. The reference picture is called the motion source picture. The second step is to split the current CU into sub-CUs and obtain the motion vectors as well as the reference indices of each sub-CU from the block corresponding to each sub-CU.

In the first step, a reference picture and the corresponding block is determined by the motion information of the spatial neighbouring blocks of the current CU. To avoid the repetitive scanning process of neighbouring blocks, the first merge candidate in the merge candidate list of the current CU is used. The first available motion vector as well as its associated reference index are set to be the temporal vector and the index to the motion source picture. This way, in ATMVP, the corresponding block may be more accurately identified, compared with TMVP, wherein the corresponding block (sometimes called collocated block) is always in a bottom-right or center position relative to the current CU.

In the second step, a corresponding block of the sub-CU is identified by the temporal vector in the motion source picture, by adding to the coordinate of the current CU the temporal vector. For each sub-CU, the motion information of its corresponding block (the smallest motion grid that covers the center sample) is used to derive the motion information for the sub-CU. After the motion information of a corresponding N×N block is identified, it is converted to the motion vectors and reference indices of the current sub-CU, in the same way as TMVP of HEVC, wherein motion scaling and other procedures apply. For example, the decoder checks whether the low-delay condition (i.e. the POCs of all reference pictures of the current picture are smaller than the POC of the current picture) is fulfilled and possibly uses motion vector $MV_x$ (the motion vector corresponding to reference picture list X) to predict motion vector $MV_y$ (with X being equal to 0 or 1 and Y being equal to 1-X) for each sub-CU.

2.2.1.2 Spatial-Temporal Motion Vector Prediction

Figure 11:
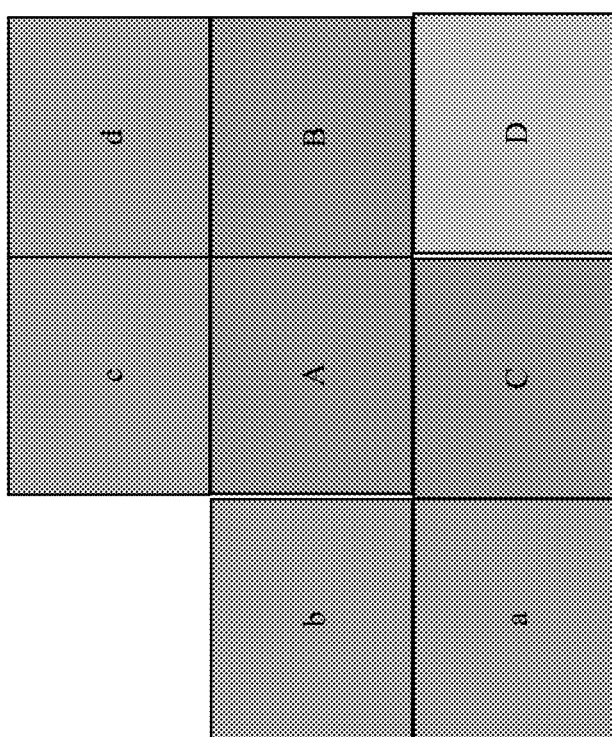
FIG. 11 shows an Example of one CU with four sub-blocks (A-D) and its neighbouring blocks (a-d).

In this method, the motion vectors of the sub-CUs are derived recursively, following raster scan order. FIG. 11 illustrates this concept. Let us consider an 8×8 CU which contains four 4×4 sub-CUs A, B, C, and D. The neighbouring 4×4 blocks in the current frame are labelled as a, b, c, and d.

The motion derivation for sub-CU A starts by identifying its two spatial neighbours. The first neighbour is the N×N block above sub-CU A (block c). If this block c is not available or is intra coded the other N×N blocks above sub-CU A are checked (from left to right, starting at block c). The second neighbour is a block to the left of the sub-CU A (block b). If block b is not available or is intra coded other blocks to the left of sub-CU A are checked (from top to bottom, staring at block b). The motion information obtained from the neighbouring blocks for each list is scaled to the first reference frame for a given list. Next, temporal motion vector predictor (TMVP) of sub-block A is derived by following the same procedure of TMVP derivation as specified in HEVC. The motion information of the collocated block at location D is fetched and scaled accordingly. Finally, after retrieving and scaling the motion information, all available motion vectors (up to 3) are averaged separately for each reference list. The averaged motion vector is assigned as the motion vector of the current sub-CU.

FIG. 11 shows an example of one CU with four sub-blocks (A-D) and its neighbouring blocks (a-d).

2.2.1.3 Sub-CU Motion Prediction Mode Signalling

The sub-CU modes are enabled as additional merge candidates and there is no additional syntax element required to signal the modes. Two additional merge candidates are added to merge candidates list of each CU to represent the ATMVP mode and STMVP mode. Up to seven merge candidates are used, if the sequence parameter set indicates that ATMVP and STMVP are enabled. The encoding logic of the additional merge candidates is the same as for the merge candidates in the HM, which means, for each CU in P or B slice, two more RD checks is needed for the two additional merge candidates.

In the JEM, all bins of merge index is context coded by CABAC. While in HEVC, only the first bin is context coded and the remaining bins are context by-pass coded.

2.2.2 Adaptive Motion Vector Difference Resolution

In HEVC, motion vector differences (MVDs) (between the motion vector and predicted motion vector of a PU) are signalled in units of quarter luma samples when use_integer_mv_flag is equal to 0 in the slice header. In the JEM, alocally adaptive motion vector resolution (LAMVR) is introduced. In the JEM, MVD can be coded in units of quarter luma samples, integer luma samples or four luma samples. The MVD resolution is controlled at the coding unit (CU) level, and MVD resolution flags are conditionally signalled for each CU that has at least one non-zero MVD components.

For a CU that has at least one non-zero MVD components, a first flag is signalled to indicate whether quarter luma sample MV precision is used in the CU. When the first flag (equal to 1) indicates that quarter luma sample MV precision is not used, another flag is signalled to indicate whether integer luma sample MV precision or four luma sample MV precision is used.

When the first MVD resolution flag of a CU is zero, or not coded for a CU (meaning all MVDs in the CU are zero), the quarter luma sample MV resolution is used for the CU. When a CU uses integer-luma sample MV precision or four-luma-sample MV precision, the MVPs in the AMVP candidate list for the CU are rounded to the corresponding precision.

In the encoder, CU-level RD checks are used to determine which MVD resolution is to be used for a CU. That is, the CU-level RD check is performed three times for each MVD resolution. To accelerate encoder speed, the following encoding schemes are applied in the JEM.

During RD check of a CU with normal quarter luma sample MVD resolution, the motion information of the current CU (integer luma sample accuracy) is stored. The stored motion information (after rounding) is used as the starting point for further small range motion vector refinement during the RD check for the same CU with integer luma sample and 4 luma sample MVD resolution so that the time-consuming motion estimation process is not duplicated three times.

RD check of a CU with 4 luma sample MVD resolution is conditionally invoked. For a CU, when RD cost integer luma sample MVD resolution is much larger than that of quarter luma sample MVD resolution, the RD check of 4 luma sample MVD resolution for the CU is skipped.

2.2.3 Higher Motion Vector Storage Accuracy

In HEVC, motion vector accuracy is one-quarter pel (one-quarter luma sample and one-eighth chroma sample for 4:2:0 video). In the JEM, the accuracy for the internal motion vector storage and the merge candidate increases to 1/16 pel. The higher motion vector accuracy (1/16 pel) is used in motion compensation inter prediction for the CU coded with skip/merge mode. For the CU coded with normal AMVP mode, either the integer-pel or quarter-pel motion is used, as described in previous section.

SHVC upsampling interpolation filters, which have same filter length and normalization factor as HEVC motion compensation interpolation filters, are used as motion compensation interpolation filters for the additional fractional pel positions. The chroma component motion vector accuracy is 1/32 sample in the JEM, the additional interpolation filters of 1/32 pel fractional positions are derived by using the average of the filters of the two neighbouring 1/16 pel fractional positions.

2.2.4 Overlapped Block Motion Compensation

Figure 12:
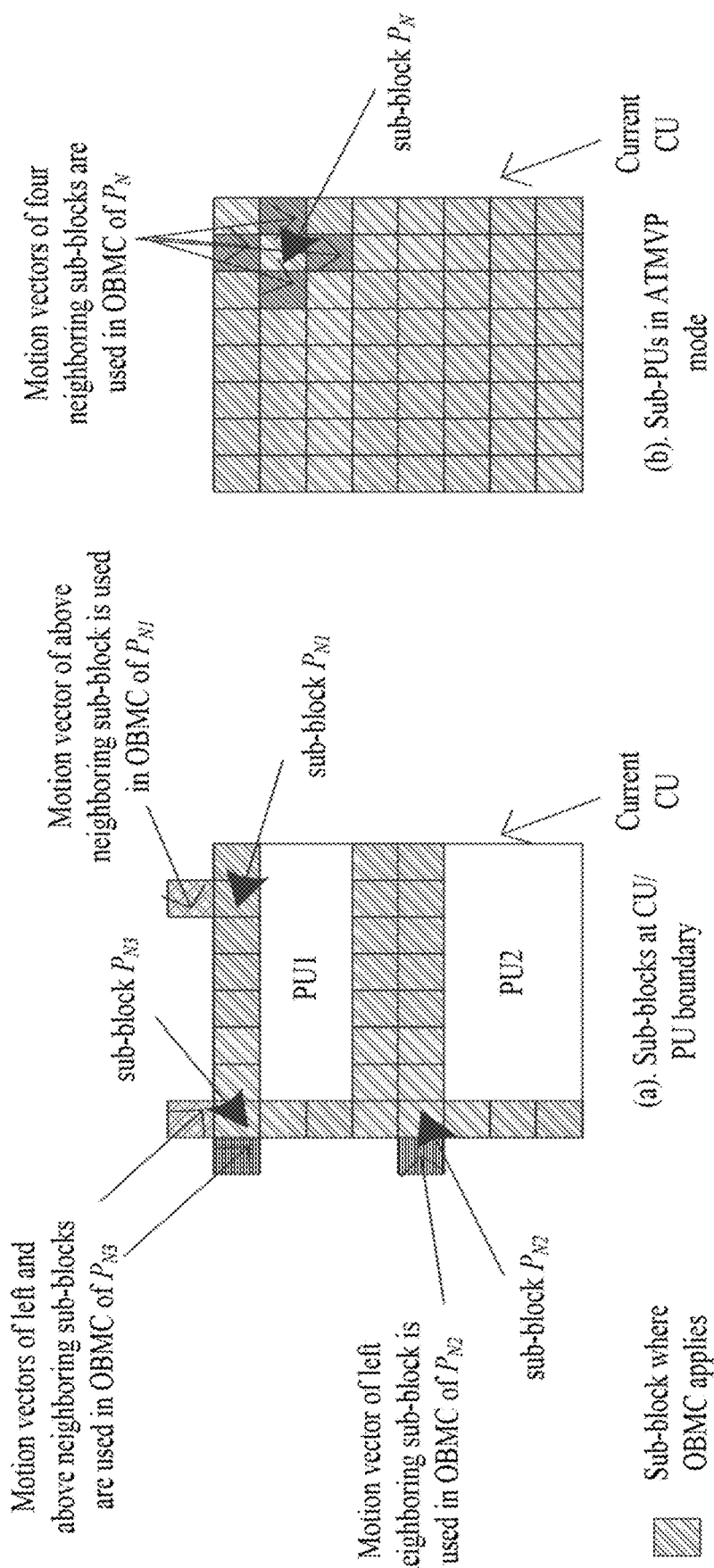
FIG. 12 is an example Illustration of sub-blocks where OBMC applies.

Overlapped Block Motion Compensation (OBMC) has previously been used in H.263. In the JEM, unlike in H.263, OBMC can be switched on and off using syntax at the CU level. When OBMC is used in the JEM, the OBMC is performed for all motion compensation (MC) block boundaries except the right and bottom boundaries of a CU. Moreover, it is applied for both the luma and chroma components. In the JEM, a MC block is corresponding to a coding block. When a CU is coded with sub-CU mode (includes sub-CU merge, affine and FRUC mode), each sub-block of the CU is a MC block. To process CU boundaries in a uniform fashion, OBMC is performed at sub-block level for all MC block boundaries, where sub-block size is set equal to 4×4, as illustrated in FIG. 12.

When OBMC applies to the current sub-block, besides current motion vectors, motion vectors of four connected neighbouring sub-blocks, if available and are not identical to the current motion vector, are also used to derive prediction block for the current sub-block. These multiple prediction blocks based on multiple motion vectors are combined to generate the final prediction signal of the current sub-block.

Prediction block based on motion vectors of a neighbouring sub-block is denoted as $P_N$, with N indicating an index for the neighbouring above, below, left and right sub-blocks and prediction block based on motion vectors of the current sub-block is denoted as $P_C$. When $P_N$ is based on the motion information of a neighbouring sub-block that contains the same motion information to the current sub-block, the OBMC is not performed from $P_N$. Otherwise, every sample of $P_N$ is added to the same sample in $P_C$, i.e., four rows/columns of $P_N$ are added to $P_C$. The weighting factors {¼, ⅛, 1/16, 1/32} are used for $P_N$ and the weighting factors {¾, ⅞, 15/16, 31/32} are used for $P_C$. The exception are small MC blocks, (i.e., when height or width of the coding block is equal to 4 or a CU is coded with sub-CU mode), for which only two rows/columns of $P_N$ are added to $P_C$. In this case weighting factors {¼, ⅛} are used for $P_N$ and weighting factors {¾, ⅞} are used for $P_C$. For $P_N$ generated based on motion vectors of vertically (horizontally) neighbouring sub-block, samples in the same row (column) of $P_N$ are added to $P_C$ with a same weighting factor.

In the JEM, for a CU with size less than or equal to 256 luma samples, a CU level flag is signalled to indicate whether OBMC is applied or not for the current CU. For the CUs with size larger than 256 luma samples or not coded with AMVP mode, OBMC is applied by default. At the encoder, when OBMC is applied for a CU, its impact is taken into account during the motion estimation stage. The prediction signal formed by OBMC using motion information of the top neighbouring block and the left neighbouring block is used to compensate the top and left boundaries of the original signal of the current CU, and then the normal motion estimation process is applied.

2.2.5 Local Illumination Compensation

Local Illumination Compensation (LIC) is based on a linear model for illumination changes, using a scaling factor a and an offset b. And it is enabled or disabled adaptively for each inter-mode coded coding unit (CU).

Figure 13:
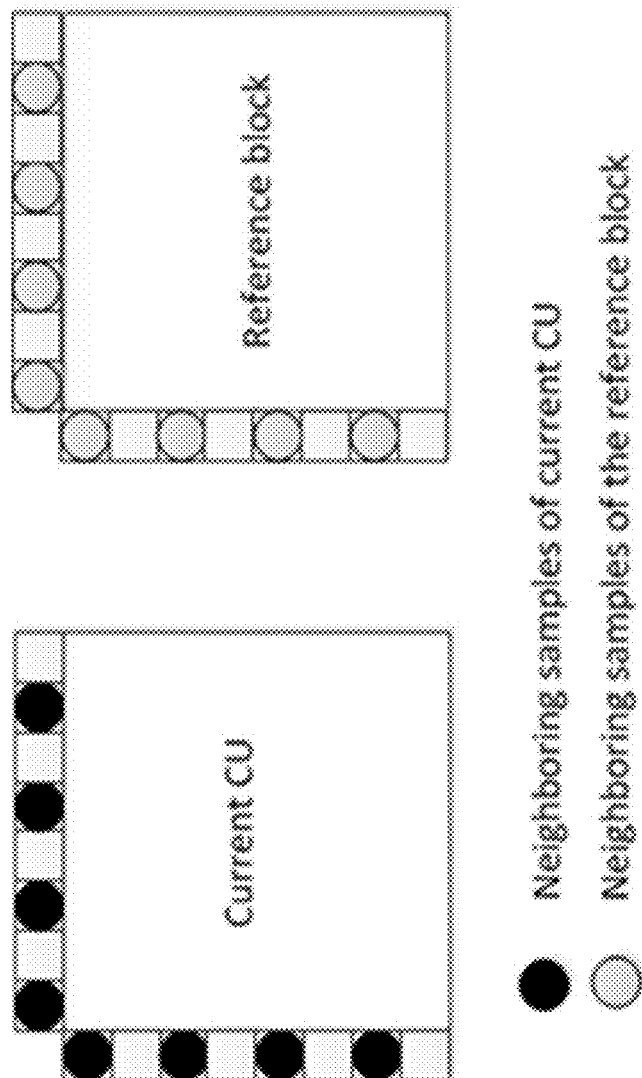
FIG. 13 shows an example of Neighbouring samples used for deriving IC parameters.

When LIC applies for a CU, a least square error method is employed to derive the parameters a and b by using the neighbouring samples of the current CU and their corresponding reference samples. More specifically, as illustrated in FIG. 13, the subsampled (2:1 subsampling) neighbouring samples of the CU and the corresponding samples (identified by motion information of the current CU or sub-CU) in the reference picture are used. The IC parameters are derived and applied for each prediction direction separately.

When a CU is coded with merge mode, the LIC flag is copied from neighbouring blocks, in a way similar to motion information copy in merge mode; otherwise, an LIC flag is signalled for the CU to indicate whether LIC applies or not.

When LIC is enabled for a picture, additional CU level RD check is needed to determine whether LIC is applied or not for a CU. When LIC is enabled for a CU, mean-removed sum of absolute difference (MR-SAD) and mean-removed sum of absolute Hadamard-transformed difference (MR- SATD) are used, instead of SAD and SATD, for integer pel motion search and fractional pel motion search, respectively.

To reduce the encoding complexity, the following encoding scheme is applied in the JEM.

LIC is disabled for the entire picture when there is no obvious illumination change between a current picture and its reference pictures. To identify this situation, histograms of a current picture and every reference picture of the current picture are calculated at the encoder. If the histogram difference between the current picture and every reference picture of the current picture is smaller than a given threshold, LIC is disabled for the current picture; otherwise, LIC is enabled for the current picture.

2.2.6 Affine Motion Compensation Prediction

Figure 14:
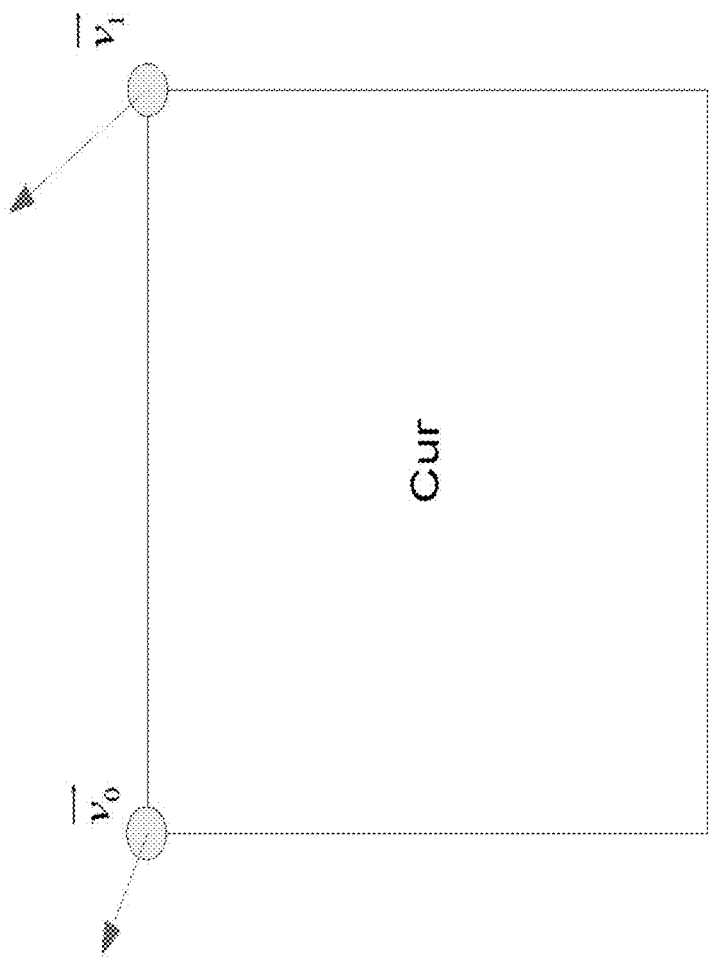
FIG. 14 shows an example of a simplified affine motion model.

In HEVC, only translation motion model is applied for motion compensation prediction (MCP). While in the real world, there are many kinds of motion, e.g. zoom in/out, rotation, perspective motions and the other irregular motions. In the JEM, a simplified affine transform motion compensation prediction is applied. As shown FIG. 14, the affine motion field of the block is described by two control point motion vectors.

The motion vector field (MVF) of a block is described by the following equation:

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (1)$$

Where $(v_{0x}, v_{0y})$ is motion vector of the top-left corner control point, and $(v_{1x}, v_{1y})$ is motion vector of the top-right corner control point.

In order to further simplify the motion compensation prediction, sub-block based affine transform prediction is applied. The sub-block size M×N is derived as in Equation 2, where MvPre is the motion vector fraction accuracy (1/16 in JEM), $(v_{2x}, v_{2y})$ is motion vector of the bottom-left control point, calculated according to Equation 1.

$$\begin{cases} M = clip3\left(4, w, \frac{w \times MvPre}{\max(abs(v_{1x} - v_{0x}), abs(v_{1y} - v_{0y}))}\right) \\ N = clip3\left(4, h, \frac{h \times MvPre}{\max(abs(v_{2x} - v_{0x}), abs(v_{2y} - v_{0y}))}\right) \end{cases} \quad (2)$$

After derived by Equation 2, M and N should be adjusted downward if necessary to make it a divisor of w and h, respectively.

Figure 15:
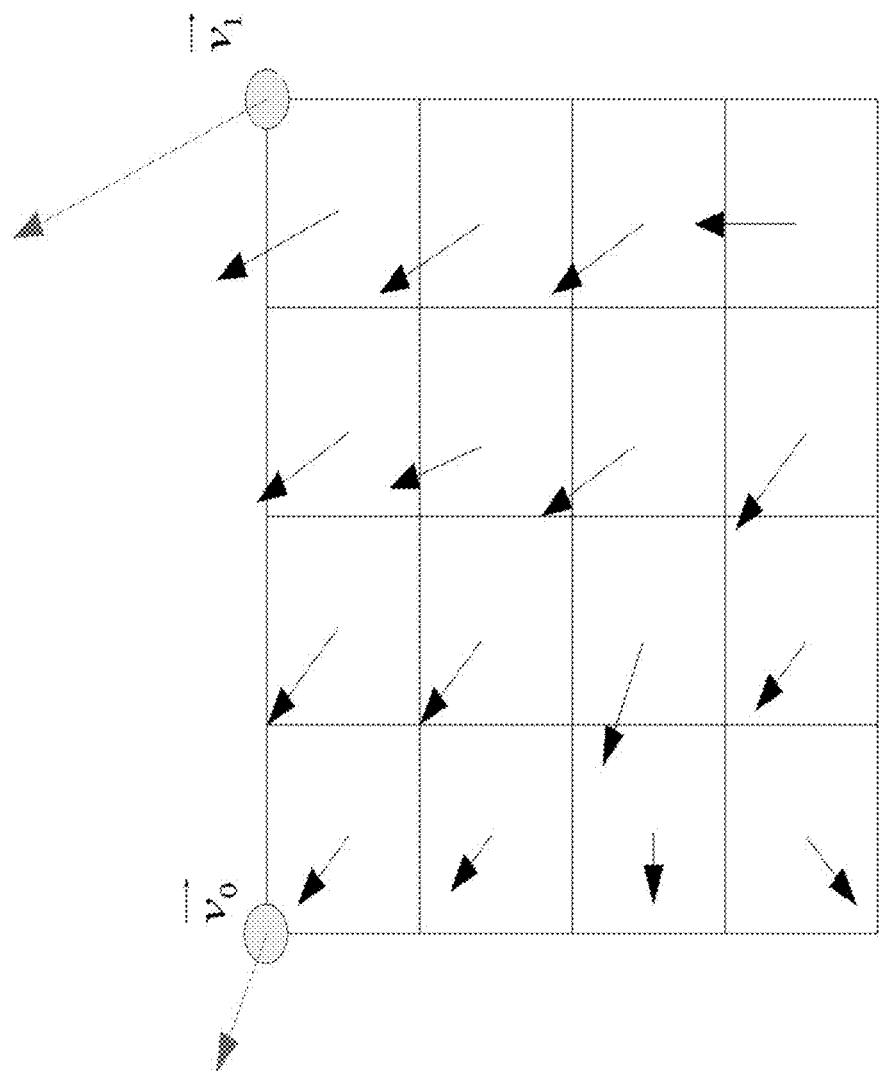
FIG. 15 shows an example of affine MVF per sub-block.

To derive motion vector of each M×N sub-block, the motion vector of the center sample of each sub-block, as shown in FIG. 15, is calculated according to Equation 1, and rounded to 1/16 fraction accuracy. Then the motion compensation interpolation filters mentioned in previous section are applied to generate the prediction of each sub-block with derived motion vector.

After MCP, the high accuracy motion vector of each sub-block is rounded and saved as the same accuracy as the normal motion vector.

Figure 16:
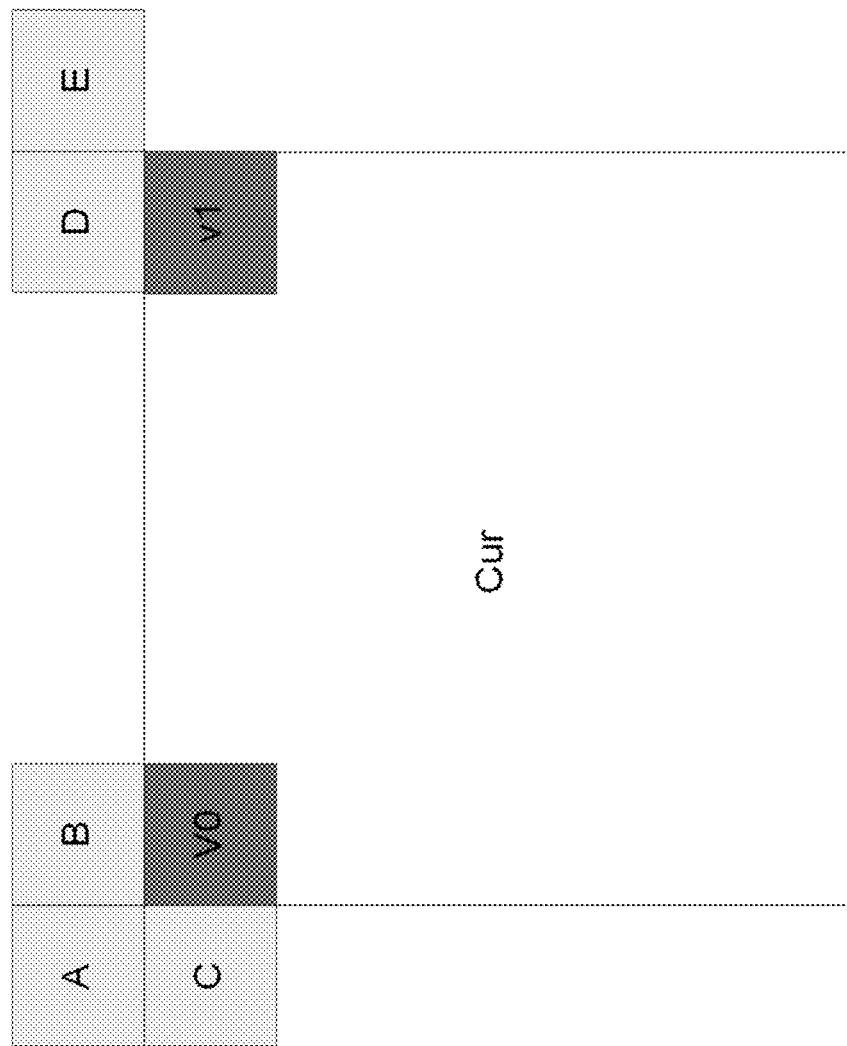
FIG. 16 shows an example of a Motion Vector Predictor (MV) for AF_INTER mode.

In the JEM, there are two affine motion modes: AF_INTER mode and AF_MERGE mode. For CUs with both width and height larger than 8, AF_INTER mode can be applied. An affine flag in CU level is signalled in the bitstream to indicate whether AF_INTER mode is used. In this mode, a candidate list with motion vector pair $\{(v_0,v_1) | v_0=\{v_A,v_B,v_C\}, v_1 \{v_D,v_E\}\}$ is constructed using the neighbour blocks. As shown in FIG. 16, $v_0$ is selected from the motion vectors of the block A, B or C. The motion vector from the neighbour block is scaled according to the reference list and the relationship among the POC of the reference for the neighbour block, the POC of the reference for the current CU and the POC of the current CU. And the approach to select $v_1$ from the neighbour block D and E is similar. If the number of candidate list is smaller than 2, the list is padded by the motion vector pair composed by duplicating each of the AMVP candidates. When the candidate list is larger than 2, the candidates are firstly sorted according to the consistency of the neighbouring motion vectors (similarity of the two motion vectors in a pair candidate) and only the first two candidates are kept. An RD cost check is used to determine which motion vector pair candidate is selected as the control point motion vector prediction (CPMVP) of the current CU. And an index indicating the position of the CPMVP in the candidate list is signalled in the bitstream. After the CPMVP of the current affine CU is determined, affine motion estimation is applied and the control point motion vector (CPMV) is found. Then the difference of the CPMV and the CPMVP is signalled in the bitstream.

Figure 17B:
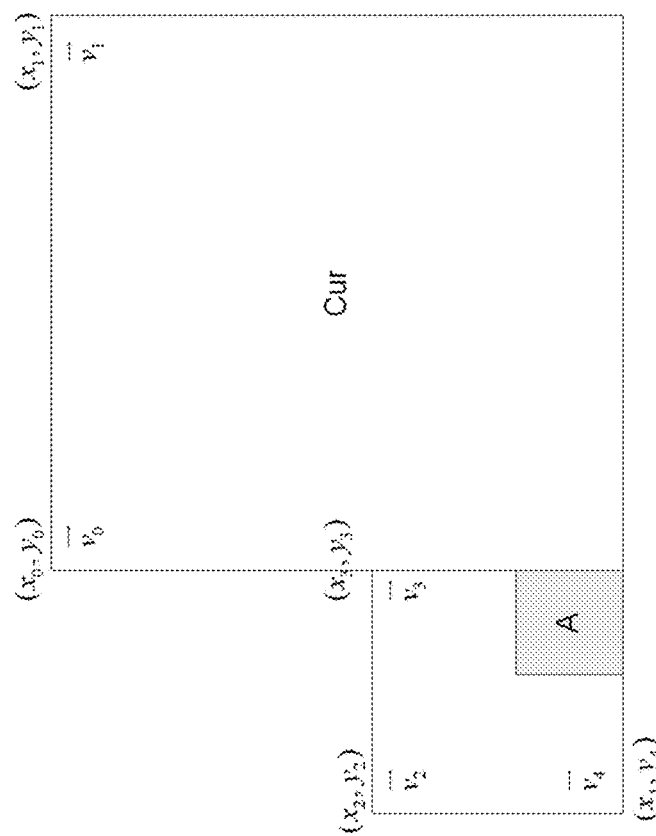
FIG. 17A-17B shows examples of candidates for AF_MERGE mode.
Figure 17A:
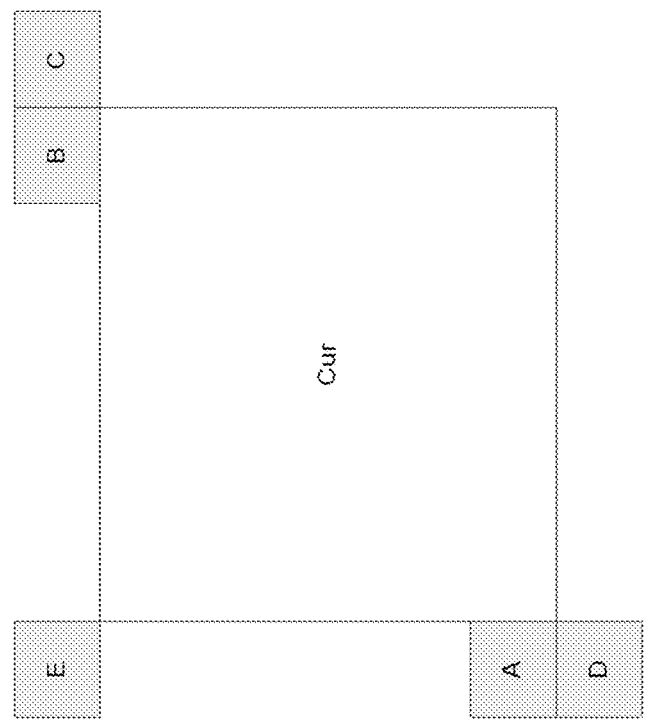

When a CU is applied in AF_MERGE mode, it gets the first block coded with affine mode from the valid neighbour reconstructed blocks. And the selection order for the candidate block is from left, above, above right, left bottom to above left as shown in FIG. 17A. If the neighbour left bottom block A is coded in affine mode as shown in FIG. 17B, the motion vectors $v_2$, $v_3$ and $v_4$ of the top left corner, above right corner and left bottom corner of the CU which contains the block A are derived. And the motion vector $v_0$ of the top left corner on the current CU is calculated according to $v_2$, $v_3$ and $v_4$. Secondly, the motion vector $v_1$ of the above right of the current CU is calculated.

After the CPMV of the current CU $v_0$ and $v_1$ are derived, according to the simplified affine motion model Equation 1, the MVF of the current CU is generated. In order to identify whether the current CU is coded with AF_MERGE mode, an affine flag is signalled in the bitstream when there is at least one neighbour block is coded in affine mode.

2.2.7 Pattern Matched Motion Vector Derivation

Pattern matched motion vector derivation (PMMVD) mode is a special merge mode based on Frame-Rate Up Conversion (FRUC) techniques. With this mode, motion information of a block is not signalled but derived at decoder side.

A FRUC flag is signalled for a CU when its merge flag is true. When the FRUC flag is false, a merge index is signalled and the regular merge mode is used. When the FRUC flag is true, an additional FRUC mode flag is signalled to indicate which method (bilateral matching or template matching) is to be used to derive motion information for the block.

At encoder side, the decision on whether using FRUC merge mode for a CU is based on RD cost selection as done for normal merge candidate. That is the two matching modes (bilateral matching and template matching) are both checked for a CU by using RD cost selection. The one leading to the minimal cost is further compared to other CU modes. If a FRUC matching mode is the most efficient one, FRUC flag is set to true for the CU and the related matching mode is used.

Motion derivation process in FRUC merge mode has two steps. A CU-level motion search is first performed, then followed by a Sub-CU level motion refinement. At CU level, an initial motion vector is derived for the whole CU based on bilateral matching or template matching. First, a list of MV candidates is generated and the candidate which leads to the minimum matching cost is selected as the starting point for further CU level refinement. Then a local search based on bilateral matching or template matching around the starting point is performed and the MV results in the minimum matching cost is taken as the MV for the whole CU. Subsequently, the motion information is further refined at sub-CU level with the derived CU motion vectors as the starting points.

For example, the following derivation process is performed for a W×H CU motion information derivation. At the first stage, MV for the whole W×H CU is derived. At the second stage, the CU is further split into M×M sub-CUs. The value of M is calculated as in (3), D is a predefined splitting depth which is set to 3 by default in the JEM. Then the MV for each sub-CU is derived.

$$M = \max\left\{4, \min\left\{\frac{M}{2^D}, \frac{N}{2^D}\right\}\right\} \quad (3)$$

Figure 18:
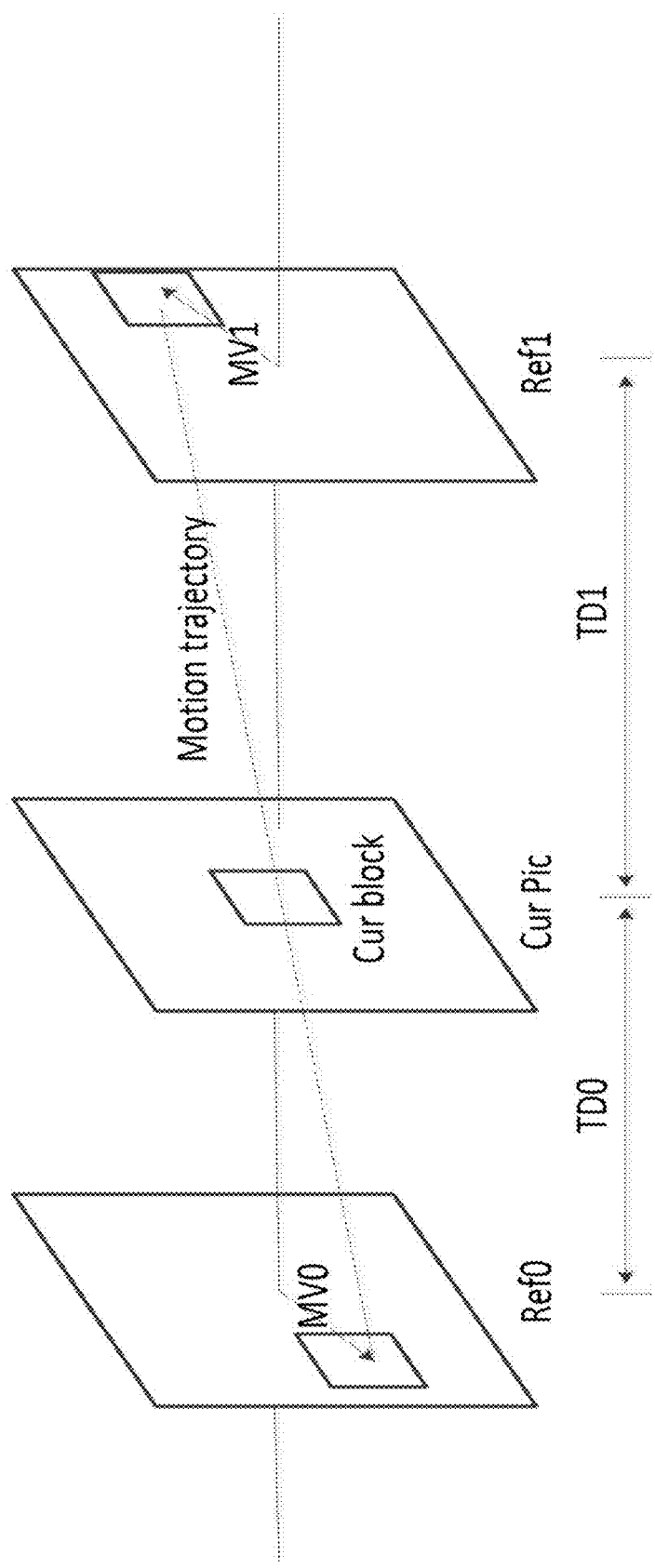
FIG. 18 shows example process for bilateral matching.

As shown in the FIG. 18, the bilateral matching is used to derive motion information of the current CU by finding the closest match between two blocks along the motion trajectory of the current CU in two different reference pictures. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the bilateral matching becomes mirror based bi-directional MV.

Figure 19:
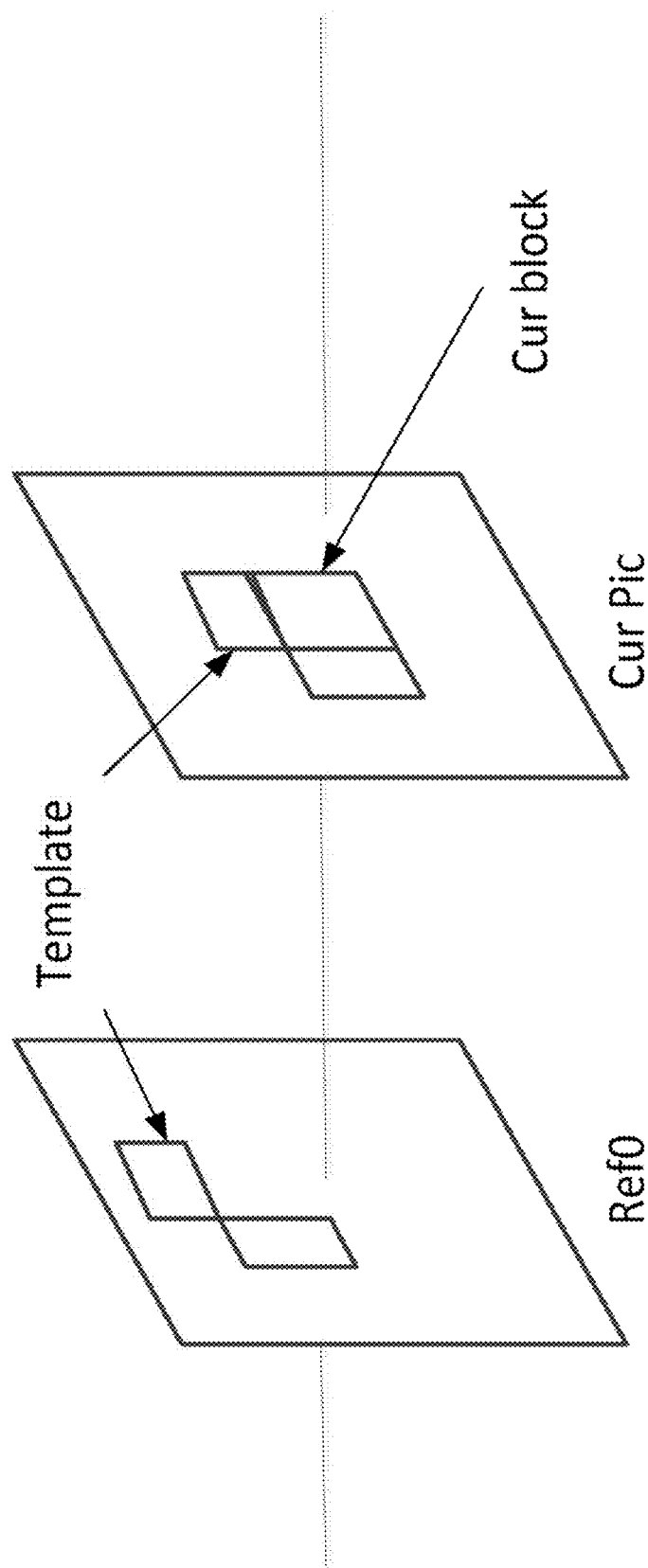
FIG. 19 shows example process of template matching.

As shown in FIG. 19, template matching is used to derive motion information of the current CU by finding the closest match between a template (top and/or left neighbouring blocks of the current CU) in the current picture and a block (same size to the template) in a reference picture. Except the aforementioned FRUC merge mode, the template matching is also applied to AMVP mode. In the JEM, as done in HEVC, AMVP has two candidates. With template matching method, a new candidate is derived. If the newly derived candidate by template matching is different to the first existing AMVP candidate, it is inserted at the very beginning of the AMVP candidate list and then the list size is set to two (meaning remove the second existing AMVP candidate). When applied to AMVP mode, only CU level search is applied.

2.2.7.1 CU Level MV Candidate Set

The MV candidate set at CU level consists of:
(i) Original AMVP candidates if the current CU is in AMVP mode
(ii) all merge candidates,
(iii) several MVs in the interpolated MV field, which is introduced in previous section.
(iv) top and left neighbouring motion vectors When using bilateral matching, each valid MV of a merge candidate is used as an input to generate a MV pair with the assumption of bilateral matching. For example, one valid MV of a merge candidate is (MVa, refa) at reference list A. Then the reference picture refb of its paired bilateral MV is found in the other reference list B so that refa and refb are temporally at different sides of the current picture. If such a refb is not available in reference list B, refb is determined as a reference which is different from refa and its temporal distance to the current picture is the minimal one in list B. After refb is determined, MVb is derived by scaling MVa based on the temporal distance between the current picture and refa, refb.

Four MVs from the interpolated MV field are also added to the CU level candidate list. More specifically, the interpolated MVs at the position (0, 0), (W/2, 0), (0, H/2) and (W/2, H/2) of the current CU are added.

When FRUC is applied in AMVP mode, the original AMVP candidates are also added to CU level MV candidate set.

At the CU level, up to 15 MVs for AMVP CUs and up to 13 MVs for merge CUs are added to the candidate list.

2.2.7.2 Sub-CU Level MV Candidate Set

The MV candidate set at sub-CU level consists of:
(i) an MV determined from a CU-level search,
(ii) top, left, top-left and top-right neighbouring MVs,
(iii) scaled versions of collocated MVs from reference pictures,
(iv) up to 4 ATMVP candidates,
(v) up to 4 STMVP candidates The scaled MVs from reference pictures are derived as follows. All the reference pictures in both lists are traversed. The MVs at a collocated position of the sub-CU in a reference picture are scaled to the reference of the starting CU-level MV.

ATMVP and STMVP candidates are limited to the four first ones.

At the sub-CU level, up to 17 MVs are added to the candidate list.

2.2.7.3 Generation of Interpolated MV Field

Before coding a frame, interpolated motion field is generated for the whole picture based on unilateral ME. Then the motion field may be used later as CU level or sub-CU level MV candidates.

Figure 20:
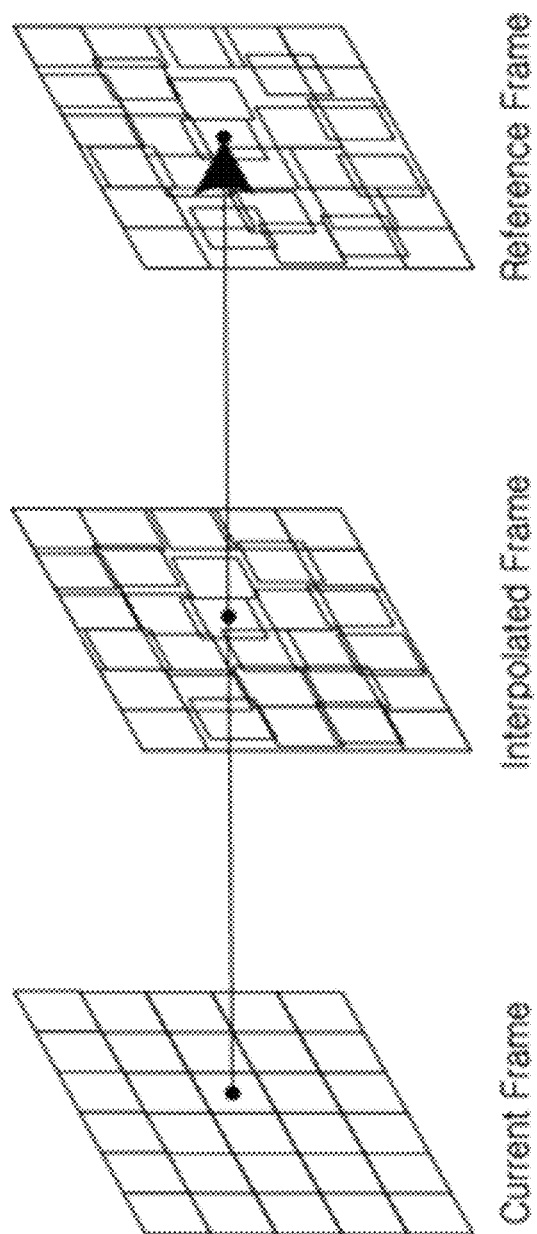
FIG. 20 illustrates an implementation of unilateral motion estimation (ME) in frame rate upconversion (FRUC).

First, the motion field of each reference pictures in both reference lists is traversed at 4×4 block level. For each 4×4 block, if the motion associated to the block passing through a 4×4 block in the current picture (As shown in FIG. 20) and the block has not been assigned any interpolated motion, the motion of the reference block is scaled to the current picture according to the temporal distance TD0 and TD1 (the same way as that of MV scaling of TMVP in HEVC) and the scaled motion is assigned to the block in the current frame. If no scaled MV is assigned to a 4×4 block, the block's motion is marked as unavailable in the interpolated motion field.

2.2.7.4 Interpolation and Matching Cost

When a motion vector points to a fractional sample position, motion compensated interpolation is needed. To reduce complexity, bi-linear interpolation instead of regular 8-tap HEVC interpolation is used for both bilateral matching and template matching.

The calculation of matching cost is a bit different at different steps. When selecting the candidate from the candidate set at the CU level, the matching cost is the absolute sum difference (SAD) of bilateral matching or template matching. After the starting MV is determined, the matching cost C of bilateral matching at sub-CU level search is calculated as follows:

$$C = SAD + w \cdot (|MV_x - MV_x^s| + |MV_y - MV_y^s|)$$

where w is a weighting factor which is empirically set to 4, MV and $MV^s$ indicate the current MV and the starting MV, respectively. SAD is still used as the matching cost of template matching at sub-CU level search.

In FRUC mode, MV is derived by using luma samples only. The derived motion will be used for both luma and chroma for MC inter prediction. After MV is decided, final MC is performed using 8-taps interpolation filter for luma and 4-taps interpolation filter for chroma.

2.2.7.5 MV Refinement

MV refinement is a pattern based MV search with the criterion of bilateral matching cost or template matching cost. In the JEM, two search patterns are supported—an unrestricted center-biased diamond search (UCBDS) and an adaptive cross search for MV refinement at the CU level and sub-CU level, respectively. For both CU and sub-CU level MV refinement, the MV is directly searched at quarter luma sample MV accuracy, and this is followed by one-eighth luma sample MV refinement. The search range of MV refinement for the CU and sub-CU step are set equal to 8 luma samples.

2.2.7.6 Selection of Prediction Direction in Template Matching FRUC Merge Mode In the bilateral matching merge mode, bi-prediction is always applied since the motion information of a CU is derived based on the closest match between two blocks along the motion trajectory of the current CU in two different reference pictures. There is no such limitation for the template matching merge mode. In the template matching merge mode, the encoder can choose among uni-prediction from list0, uni-prediction from list1 or bi-prediction for a CU. The selection is based on a template matching cost as follows:

If costBi<=factor*min (cost0, cost1)
  bi-prediction is used;
Otherwise, if cost0<=cost1
  uni-prediction from list0 is used;
Otherwise,
  uni-prediction from list1 is used;

where cost0 is the SAD of list0 template matching, cost1 is the SAD of list1 template matching and costBi is the SAD of bi-prediction template matching. The value of factor is equal to 1.25, which means that the selection process is biased toward bi-prediction.

The inter prediction direction selection is only applied to the CU-level template matching process.

2.2.8 Generalized Bi-Prediction

In conventional bi-prediction, the predictors from L0 and L1 are averaged to generate the final predictor using the equal weight 0.5. The predictor generation formula is shown as in Equ. (4)

$$P_{TraditionalBiPred} = (P_{L0} + P_{L1} + \text{RoundingOffset}) >> \text{shiftNum}, \quad (4)$$

In Equ. (4), $P_{TraditionalBiPred}$ is the final predictor for the conventional bi-prediction, $P_{L0}$ and $P_{L1}$ are predictors from L0 and L1, respectively, and RoundingOffset and shiftNum are used to normalize the final predictor.

Generalized Bi-prediction (GBI) is proposed to allow applying different weights to predictors from L0 and L1. The predictor generation is shown in Equ. (5).

$$P_{GBi} = ((1-w_1)*P_{L0} + w_1*P_{L1} + \text{RoundingOffset}_{GBi}) >> \text{shiftNum}_{GBi}, \quad (5)$$

In Equ. (5), $P_{GBi}$ is the final predictor of GBi. $(1-w_1)$ and $w_1$ are the selected GBI weights applied to the predictors of L0 and L1, respectively. $\text{RoundingOffset}_{GBi}$ and $\text{shiftNum}_{GBi}$ are used to normalize the final predictor in GBi.

The supported weights of $w_1$ is $\{-1/4, 3/8, 1/2, 5/8, 5/4\}$. One equal-weight set and four unequal-weight sets are supported. For the equal-weight case, the process to generate the final predictor is exactly the same as that in the conventional bi-prediction mode. For the true bi-prediction cases in random access (RA) condition, the number of candidate weight sets is reduced to three.

For advanced motion vector prediction (AMVP) mode, the weight selection in GBI is explicitly signaled at CU-level if this CU is coded by bi-prediction. For merge mode, the weight selection is inherited from the merge candidate. In this proposal, GBI supports DMVR to generate the weighted average of template as well as the final predictor for BMS-1.0.

2.2.9 Multi-Hypothesis Inter Prediction

In the multi-hypothesis inter prediction mode, one or more additional prediction signals are signaled, in addition to the conventional uni/bi prediction signal. The resulting overall prediction signal is obtained by sample-wise weighted superposition. With the uni/bi prediction signal $p_{uni/bi}$ and the first additional inter prediction signal/hypothesis $h_3$, the resulting prediction signal $p_3$ is obtained as follows:

$$p_3 = (1-\alpha)p_{uni/bi} + \alpha h_3$$

The changes to the prediction unit syntax structure are shown below:

| | Descriptor |
|---|---|
| prediction_unit( x0, y0, nPbW, nPbH ) { | |
| ... | |
|   if( ! cu_skip_flag[ x0 ][ y0 ] ) { | |
|     i = 0 | |
|     readMore = 1 | |
|     while( i < MaxNumAdditionalHypotheses && readMore ) { | |
|       additional_hypothesis_flag[ x0 ][ y0 ][ i ] | ae(v) |
|       if( additional_hypothesis_flag[ x0 ][ y0 ][ i ] ) { | |
|         ref_idx_add_hyp[ x0 ][ y0 ][ i ] | ae(v) |
|         mvd_coding( x0, y0, 2+i ) | |
|         mvp_add_hyp_flag[ x0 ][ y0 ][ i ] | ae(v) |
|         add_hyp_weight_idx[ x0 ][ y0 ][ i ] | ae(v) |
|       } | |
|       readMore = additional_hypothesis_flag[ x0 ][ y0 ][ i ] | |
|       i++ | |
|     } | |
|   } | |
| } | |

The weighting factor α is specified by the syntax element add_hyp_weight_idx, according to the following mapping:

| add_hyp_weight_idx | α |
|---|---|
| 0 | 1/4 |
| 1 | −1/8 |

Note that for the additional prediction signals, the concept of prediction list0/list1 is abolished, and instead one combined list is used. This combined list is generated by alternatingly inserting reference frames from list0 and list1 with increasing reference index, omitting reference frames which have already been inserted, such that double entries are avoided.

Analogously to above, more than one additional prediction signals can be used. The resulting overall prediction signal is accumulated iteratively with each additional prediction signal.

$$p_{n+1}=(1-\alpha_{n+1})p_n+\alpha_{n+1}h_{n+1}$$

The resulting overall prediction signal is obtained as the last $p_n$ (i.e., the $p_n$ having the largest index n).

Note that also for inter prediction blocks using MERGE mode (but not SKIP mode), additional inter prediction signals can be specified. Further note, that in case of MERGE, not only the uni/bi prediction parameters, but also the additional prediction parameters of the selected merging candidate can be used for the current block.

2.2.10 Multi-Hypothesis Prediction for Uni-Prediction of AMVP Mode

In some example, when the multi-hypothesis prediction is applied to improve uni-prediction of AMVP mode, one flag is signaled to enable or disable multi-hypothesis prediction for inter_dir equal to 1 or 2, where 1, 2, and 3 represent list 0, list 1, and bi-prediction, respectively. Moreover, one more merge index is signaled when the flag is true. In this way, multi-hypothesis prediction turns uni-prediction into bi-prediction, where one motion is acquired using the original syntax elements in AMVP mode while the other is acquired using the merge scheme. The final prediction uses 1:1 weights to combine these two predictions as in bi-prediction. The merge candidate list is first derived from merge mode with sub-CU candidates (e.g., affine, alternative temporal motion vector prediction (ATMVP)) excluded. Next, it is separated into two individual lists, one for list 0 (L0) containing all L0 motions from the candidates, and the other for list 1 (L1) containing all L1 motions. After removing redundancy and filling vacancy, two merge lists are generated for L0 and L1 respectively. There are two constraints when applying multi-hypothesis prediction for improving AMVP mode. First, it is enabled for those CUs with the luma coding block (CB) area larger than or equal to 64. Second, it is only applied to L1 when in low delay B pictures.

2.2.11 Multi-Hypothesis Prediction for Skip/Merge Mode

In examples, when the multi-hypothesis prediction is applied to skip or merge mode, whether to enable multi-hypothesis prediction is explicitly signaled. An extra merge indexed prediction is selected in addition to the original one. Therefore, each candidate of multi-hypothesis prediction implies a pair of merge candidates, containing one for the $1^{st}$ merge indexed prediction and the other for the $2^{nd}$ merge indexed prediction. However, in each pair, the merge candidate for the $2^{nd}$ merge indexed prediction is implicitly derived as the succeeding merge candidate (i.e., the already signaled merge index plus one) without signaling any additional merge index. After removing redundancy by excluding those pairs, containing similar merge candidates and filling vacancy, the candidate list for multi-hypothesis prediction is formed. Then, motions from a pair of two merge candidates are acquired to generate the final prediction, where 5:3 weights are applied to the $1^{st}$ and $2^{nd}$ merge indexed predictions, respectively. Moreover, a merge or skip CU with multi-hypothesis prediction enabled can save the motion information of the additional hypotheses for reference of the following neighboring CUs in addition to the motion information of the existing hypotheses. Note that sub-CU candidates (e.g., affine, ATMVP) are excluded from the candidate list, and for low delay B pictures, multi-hypothesis prediction is not applied to skip mode. Moreover, when multi-hypothesis prediction is applied to merge or skip mode, for those CUs with CU width or CU height less than 16, or those CUs with both CU width and CU height equal to 16, bi-linear interpolation filter is used in motion compensation for multiple hypotheses. Therefore, the worst-case bandwidth (required access samples per sample) for each merge or skip CU with multi-hypothesis prediction enabled is calculated in Table 1 and each number is less than half of the worst-case bandwidth for each 4×4 CU with multi-hypothesis prediction disabled.

2.2.12 Ultimate Motion Vector Expression ultimate motion vector expression (UMVE) is presented. UMVE is used for either skip or merge modes with a proposed motion vector expression method.

UMVE re-uses merge candidate as same as using in VVC. Among the merge candidates, a candidate can be selected, and is further expanded by the proposed motion vector expression method.

UMVE provides a new motion vector expression with simplified signaling. The expression method includes starting point, motion magnitude, and motion direction.

Figure 21:
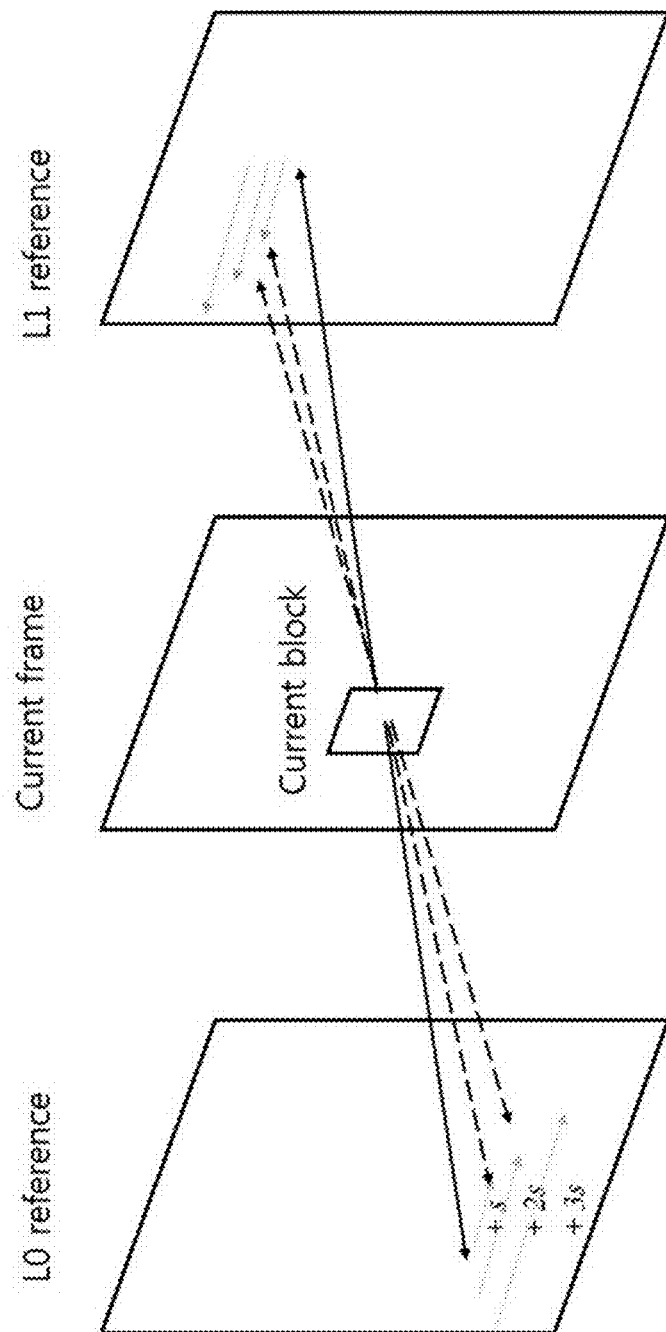
FIG. 21 illustrates an embodiment of an Ultimate Motion Vector Expression (UMVE) search process.

FIG. 21 shows an example of a UMVE Search Process

Figure 22:
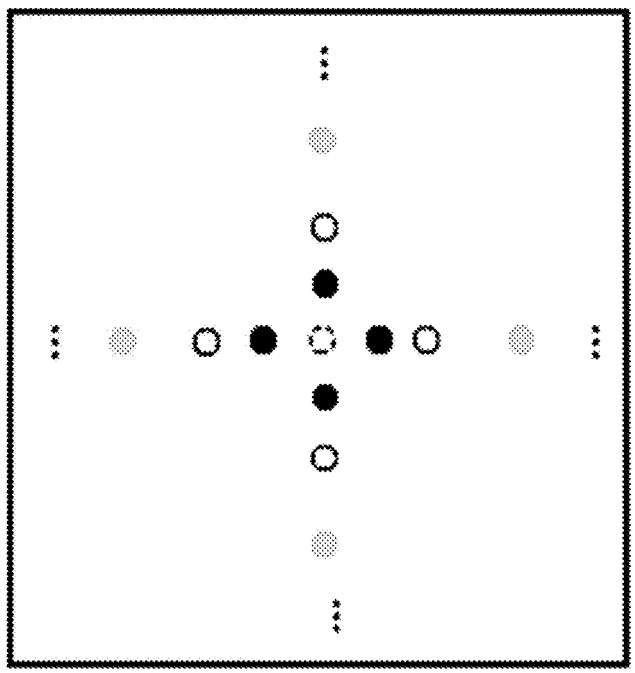
FIG. 22 shows examples of UMVE search points.
Figure 22:
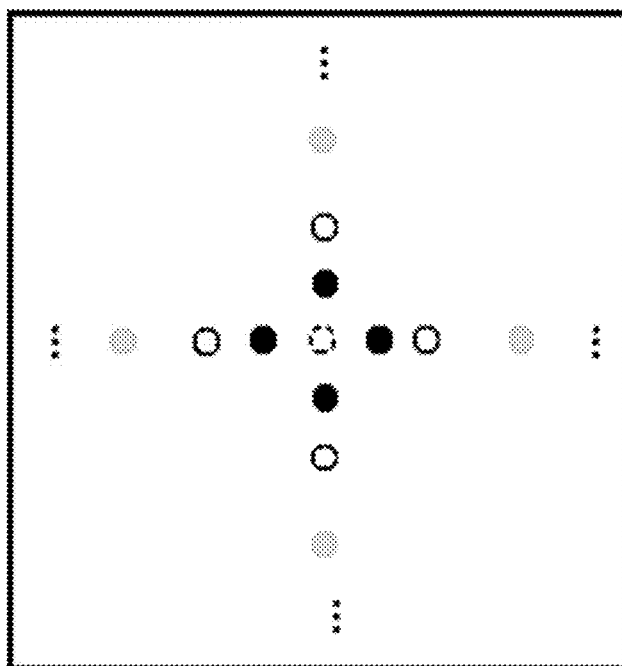

FIG. 22 shows an example of UMVE Search Points.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidate is equal to 1, Base candidate IDX is not signaled.

Distance index is motion magnitude information. Distance index indicates the pre-defined distance from the starting point information. Pre-defined distance is as follows:

TABLE 2

Distance IDX

| Distance IDX | 0 | 1 | 2 | 3 | 4 | 5 | 6 | 7 |
|---|---|---|---|---|---|---|---|---|
| Pixel distance | 1/4-pel | 1/2-pel | 1-pel | 2-pel | 4-pel | 8-pel | 16-pel | 32-pel |

Direction index represents the direction of the MVD relative to the starting point. The direction index can represent of the four directions as shown below.

TABLE 3

Direction IDX

| Direction IDX | 00 | 01 | 10 | 11 |
|---|---|---|---|---|
| x-axis | + | − | N/A | N/A |
| y-axis | N/A | N/A | + | − |

UMVE flag is signaled right after sending a skip flag and merge flag. If skip and merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

2.2.13 Affine Merge Mode with Prediction Offsets

In some example, UMVE is extended to affine merge mode, we will call this UMVE affine mode thereafter. The proposed method selects the first available affine merge candidate as a base predictor. Then it applies a motion vector offset to each control point's motion vector value from the base predictor. If there's no affine merge candidate available, this proposed method will not be used.

The selected base predictor's inter prediction direction, and the reference index of each direction is used without change.

In the current implementation, the current block's affine model is assumed to be a 4-parameter model, only 2 control points need to be derived. Thus, only the first 2 control points of the base predictor will be used as control point predictors.

For each control point, a zero_MVD flag is used to indicate whether the control point of current block has the same MV value as the corresponding control point predictor. If zero_MVD flag is true, there's no other signaling needed for the control point. Otherwise, a distance index and an offset direction index is signaled for the control point.

Figure 23:
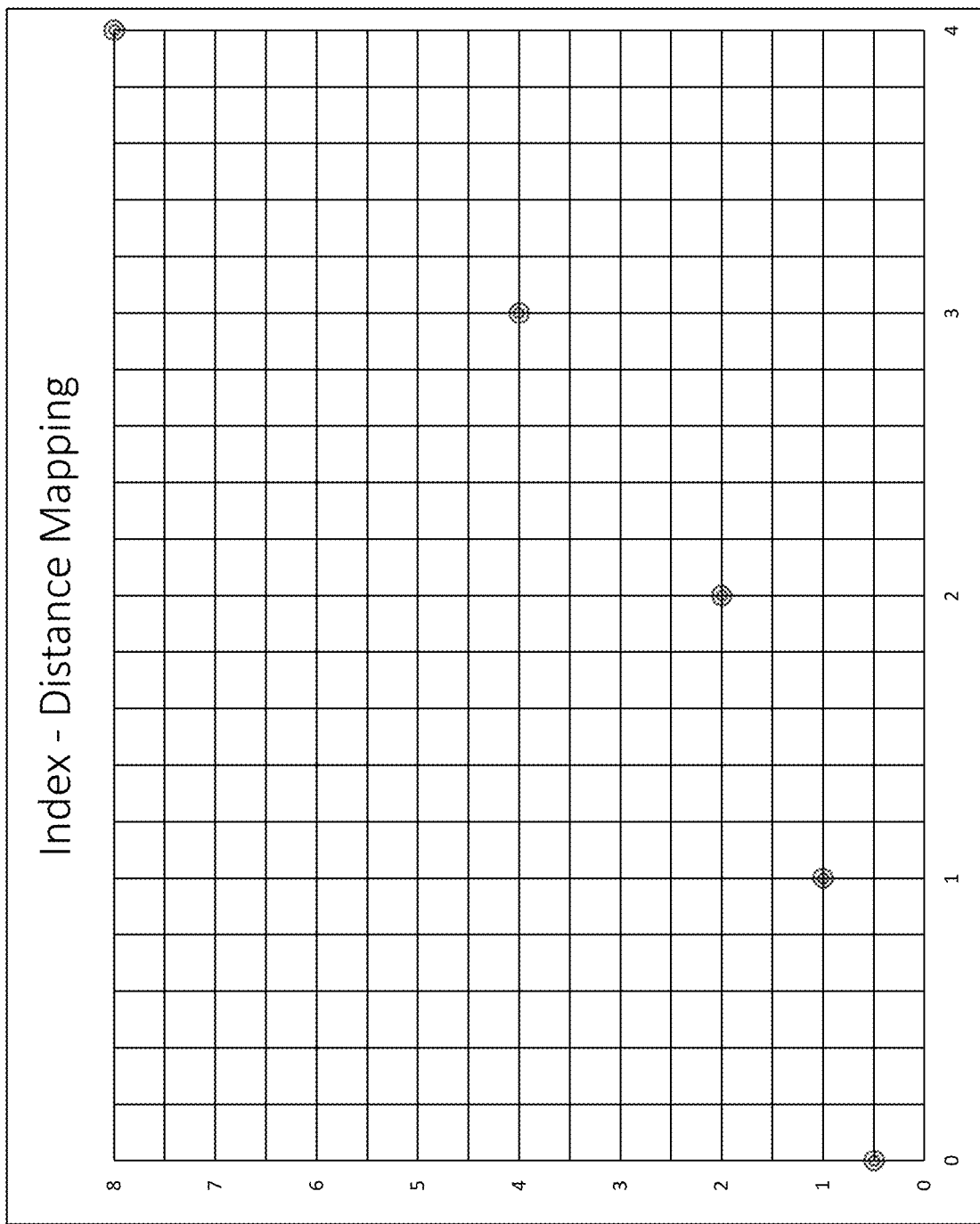
FIG. 23 shows an example of distance index and distance offset mapping.

A distance offset table with size of 5 is used as shown in the table below. Distance index is signaled to indicate which distance offset to use. The mapping of distance index and distance offset values is shown in FIG. 23.

TABLE 1

Distance offset table

| Distance IDX | 0 | 1 | 2 | 3 | 4 |
|---|---|---|---|---|---|
| Distance-offset | 1/2-pel | 1-pel | 2-pel | 4-pel | 8-pel |

The direction index can represent four directions as shown below, where only x or y direction may have an MV difference, but not in both directions.

| Offset Direction IDX | 00 | 01 | 10 | 11 |
|---|---|---|---|---|
| x-dir-factor | +1 | −1 | 0 | 0 |
| y-dir-factor | 0 | 0 | +1 | −1 |

If the inter prediction is uni-directional, the signaled distance offset is applied on the offset direction for each control point predictor. Results will be the MV value of each control point.

For example, when base predictor is uni-directional, and the motion vector values of a control point is MVP ($v_{px}$, $v_{py}$). When distance offset and direction index are signaled, the motion vectors of current block's corresponding control points will be calculated as below.

$$MV(v_x, v_y) = MVP(v_{px}, v_{py}) + MV(x\text{-dir-factor}*\text{distance-offset}, y\text{-dir-factor}*\text{distance-offset});$$

If the inter prediction is bi-directional, the signaled distance offset is applied on the signaled offset direction for control point predictor's L0 motion vector; and the same distance offset with opposite direction is applied for control point predictor's L1 motion vector. Results will be the MV values of each control point, on each inter prediction direction.

For example, when base predictor is uni-directional, and the motion vector values of a control point on L0 is $MVP_{L0}$ ($v_{0px}, v_{0py}$), and the motion vector of that control point on L1 is $MVP_{L1}$ ($v_{1px}, v_{1py}$). When distance offset and direction index are signaled, the motion vectors of current block's corresponding control points will be calculated as below.

$$MV_{L0}(v_{0x}, v_{0y}) = MVP_{L0}(v_{0px}, v_{0py}) + MV(x\text{-dir-factor}*\text{distance-offset}, y\text{-dir-factor}*\text{distance-offset});$$

$$MV_{L1}(v_{0x}, v_{0y}) = MVP_{L1}(v_{1px}, v_{1py}) + MV(-x\text{-dir-factor}*\text{distance-offset}, -y\text{-dir-factor}*\text{distance-offset});$$

2.2.14 Bi-Directional Optical Flow

In BIO, motion compensation is first performed to generate the first predictions (in each prediction direction) of the current block. The first predictions are used to derive the spatial gradient, the temporal gradient and the optical flow of each subblock/pixel within the block, which are then used to generate the second prediction, i.e., the final prediction of the subblock/pixel. The details are described as follows.

Bi-directional Optical flow (BIO) is sample-wise motion refinement which is performed on top of block-wise motion compensation for bi-prediction. The sample-level motion refinement doesn't use signalling.

Figure 24:
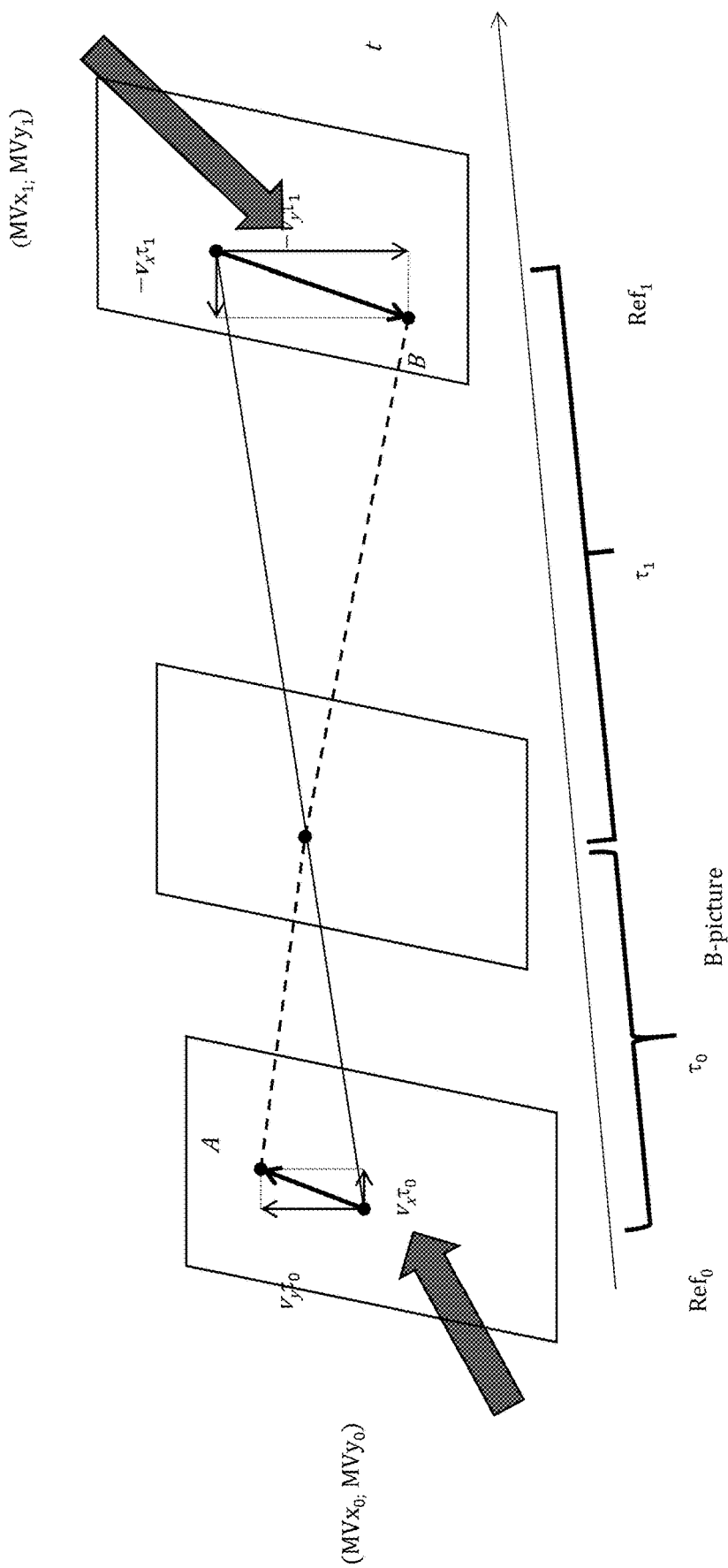
FIG. 24 shows an example of an optical flow trajectory.

FIG. 24 shows an example of an optical flow trajectory

Let $I^{(k)}$ be the luma value from reference k (k=0, 1) after block motion compensation, and $\partial I^{(k)}/\partial x$, $\partial I^{(k)}/\partial y$, are horizontal and vertical components of the $I^{(k)}$ gradient, respectively. Assuming the optical flow is valid, the motion vector field ($v_x, v_y$) is given by an equation as follows:

$$\partial I^{(k)}/\partial t + v_x \partial I^{(k)}/\partial x + v_y \partial I^{(k)}/\partial y = 0.$$

Combining this optical flow equation with Hermite interpolation for the motion trajectory of each sample results in a unique third-order polynomial that matches both the function values $I^{(k)}$ and derivatives $\partial I^{(k)}/\partial x$, $\partial I^{(k)}/\partial y$ at the ends. The value of this polynomial at t=0 is the BIO prediction:

$$\text{pred}_{BIO}=1/2(I^{(0)}+I^{(1)}+v_x/2\cdot(\tau_1\partial I^{(1)}/\partial x-\tau_0\partial I^{(0)}/\partial x)+v_y/2\cdot(\tau_1\partial I^{(1)}/\partial y-\tau_0\partial I^{(0)}/\partial y)). \quad (4)$$

Here, $\tau_0$ and $\tau_1$ denote the distances to the reference frames as shown on a FIG. 24. Distances $\tau_0$ and $\tau_1$ are calculated based on POC for Ref0 and Ref1: $\tau_0$=POC(current)−POC(Ref0), $\tau_1$=POC(Ref1)−POC(current). If both predictions come from the same time direction (either both from the past or both from the future) then the signs are different (i.e., $\tau_0\cdot\tau_1<0$). In this case, BIO is applied only if the prediction is not from the same time moment (i.e., $\tau_0\neq\tau_1$), both referenced regions have non-zero motion ($MVx_0$, $MVy_0$, $MVx_1$, $MVy_1\neq 0$) and the block motion vectors are proportional to the time distance ($MVx_0/MVx_1=MVy_0/MVy_1=-\tau_0/\tau_1$).

The motion vector field $(v_x, v_y)$ is determined by minimizing the difference $\Delta$ between values in points A and B (intersection of motion trajectory and reference frame planes on FIG. 24). Model uses only first linear term of a local Taylor expansion for $\Delta$:

$$\Delta=(I^{(0)}-I^{(1)}_0+v_x(\tau_1\partial I^{(1)}/\partial x+\tau_0\partial I^{(0)}/\partial x)+v_y(\tau_1\partial I^{(1)}/\partial y+\tau_0\partial I^{(0)}/\partial y)) \quad (7)$$

All values in Equation 7 depend on the sample location $(i',j')$, which was omitted from the notation so far. Assuming the motion is consistent in the local surrounding area, we minimize $\Delta$ inside the $(2M+1)\times(2M+1)$ square window $\Omega$ centered on the currently predicted point $(i,j)$, where M is equal to 2:

$$(v_x, v_y) = \arg\min_{v_x,v_y} \sum_{[i',j']\in\Omega} \Delta^2[i', j'] \quad (8)$$

For this optimization problem, the JEM uses a simplified approach making first a minimization in the vertical direction and then in the horizontal direction. This results in $$v_x = (s_1 + r) > m? \text{clip3}\left(-thBIO, thBIO, -\frac{s_3}{(s_1+r)}\right):0 \quad (9)$$

$$v_y = (s_5 + r) > m? \text{clip3}\left(-thBIO, thBIO, -\frac{s_6-v_xs_2/2}{(s_5+r)}\right):0 \quad (10)$$

where, $$s_1 = \sum_{[i',j']\in\Omega} (\tau_1\partial I^{(1)}/\partial x+\tau_0\partial I^{(0)}/\partial x)^2;$$

$$s_3 = \sum_{[i',j']\in\Omega} (I^{(1)}-I^{(0)})(\tau_1\partial I^{(1)}/\partial x+\tau_0\partial I^{(0)}/\partial x);$$

$$s_2 = \sum_{[i',j']\in\Omega} (\tau_1\partial I^{(1)}/\partial x+\tau_0\partial I^{(0)}/\partial x)(\tau_1\partial I^{(1)}/\partial y+\tau_0\partial I^{(0)}/\partial y);$$

$$s_5 = \sum_{[i',j']\in\Omega} (\tau_1\partial I^{(1)}/\partial y+\tau_0\partial I^{(0)}/\partial y)^2;$$

$$s_6 = \sum_{[i',j']\in\Omega} (I^{(1)}-I^{(0)})(\tau_1\partial I^{(1)}/\partial y+\tau_0\partial I^{(0)}/\partial y) \quad (11)$$

In order to avoid division by zero or a very small value, regularization parameters r and m are introduced in Equations 12 and 13.

$$r=500\cdot 4^{d-8} \quad (12)$$

$$m=700\cdot 4^{d-8} \quad (13)$$

Here d is bit depth of the video samples.

Figure 25B:
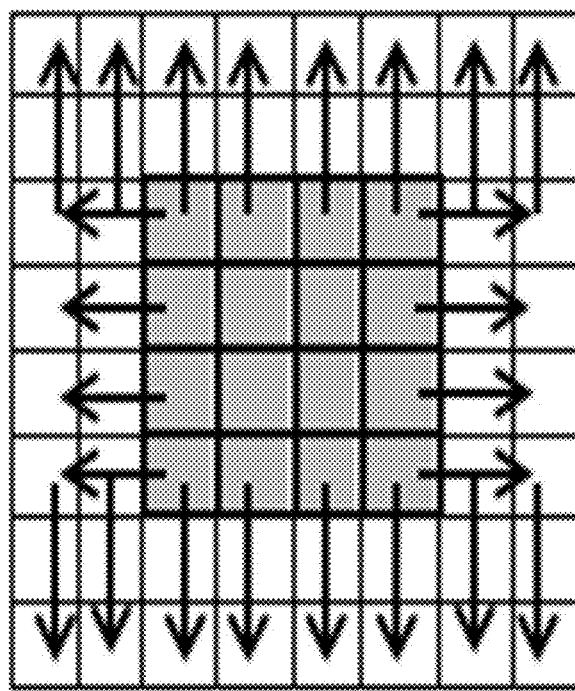
FIG. 25A-25B show examples of Bi-directional Optical flow (BIO) w/o block extension: a) access positions outside of the block; b) padding used in order to avoid extra memory access and calculation.
Figure 25A:
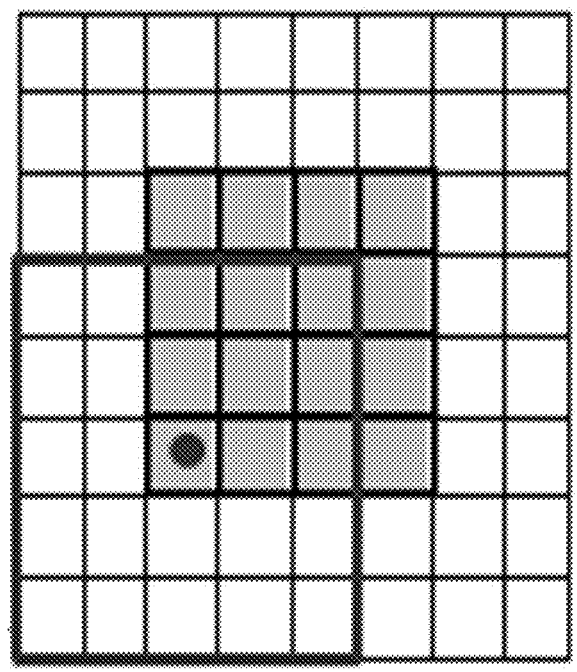

In order to keep the memory access for BIO the same as for regular bi-predictive motion compensation, all prediction and gradients values, $I^{(k)}$, $\partial I^{(k)}/\partial x$, $\partial I^{(k)}/\partial y$, are calculated only for positions inside the current block. In Equation 11, $(2M+1)\times(2M+1)$ square window $\Omega$ centered in currently predicted point on a boundary of predicted block needs to accesses positions outside of the block (as shown in FIG. 25A). In the JEM, values of $I^{(k)}$, $\partial I^{(k)}/\partial x$, $\partial I^{(k)}/\partial y$ outside of the block are set to be equal to the nearest available value inside the block. For example, this can be implemented as padding, as shown in FIG. 25B.

Figure 26:
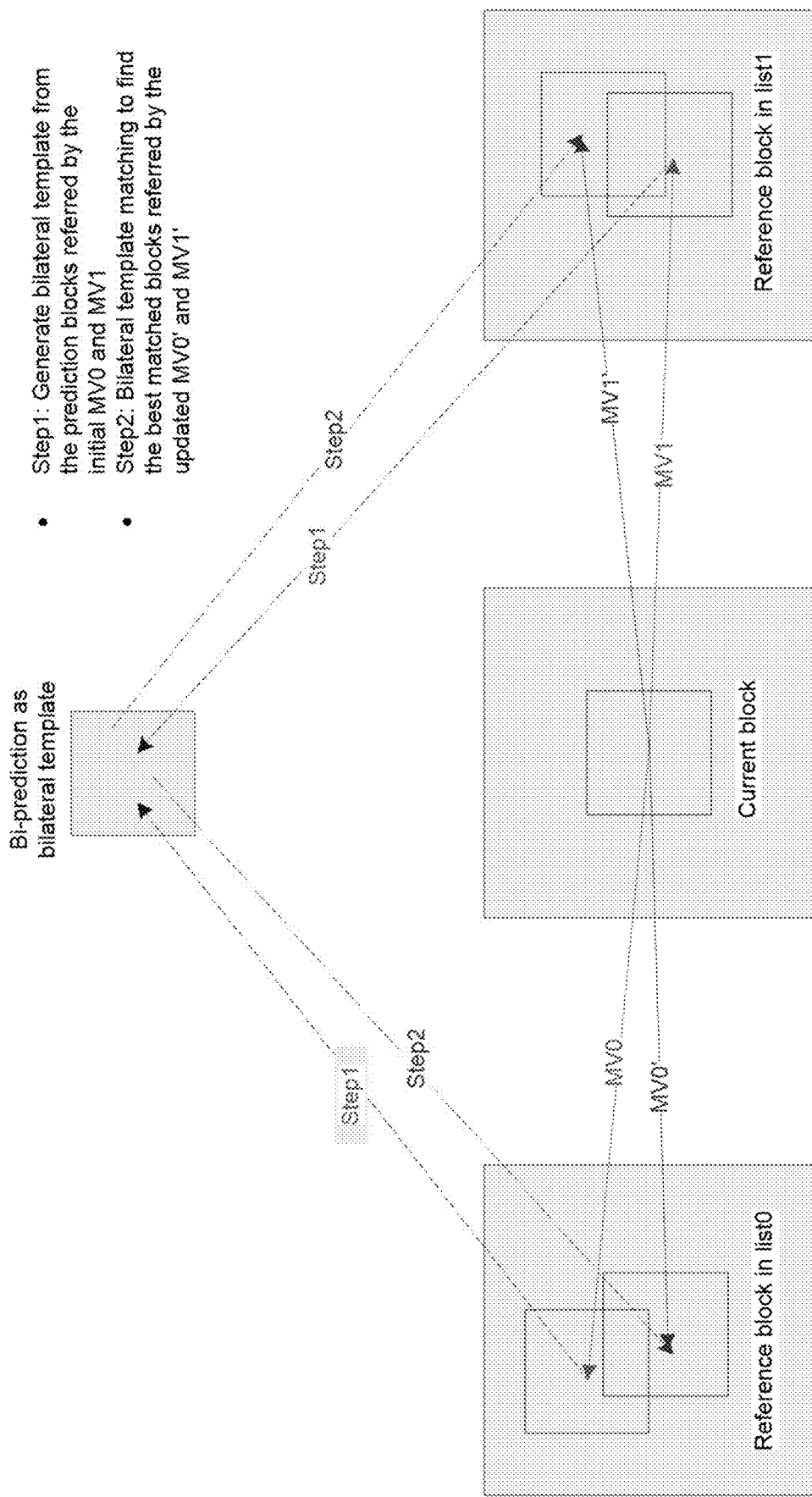
FIG. 26 illustrates an example of using Decoder-side motion vector refinement (DMVR) based on bilateral template matching.

FIG. 26 shows BIO w/o block extension: a) access positions outside of the block; b) padding is used in order to avoid extra memory access and calculation.

With BIO, it's possible that the motion field can be refined for each sample. To reduce the computational complexity, a block-based design of BIO is used in the JEM. The motion refinement is calculated based on 4×4 block. In the block-based BIO, the values of so in Equation 11 of all samples in a 4×4 block are aggregated, and then the aggregated values of so in are used to derived BIO motion vectors offset for the 4×4 block. More specifically, the following formula is used for block-based BIO derivation:

$$s_{1,b_k} = \sum_{(x,y)\in b_k} \sum_{[i',j']\in\Omega(x,y)} (\tau_1\partial I^{(1)}/\partial x + \tau_0\partial I^{(0)}/\partial x)^2; \quad (14)$$

$$s_{3,b_k} = \sum_{(x,y)\in b_k} \sum_{[i',j']\in\Omega} (I^{(1)}-I^{(0)})(\tau_1\partial I^{(1)}/\partial x + \tau_0\partial I^{(0)}/\partial x);$$

$$s_{2,b_k} = \sum_{(x,y)\in b_k} \sum_{[i',j']\in\Omega} (\tau_1\partial I^{(1)}/\partial x + \tau_0\partial I^{(0)}/\partial x)(\tau_1\partial I^{(1)}/\partial y + \tau_0\partial I^{(0)}/\partial y);$$

$$s_{5,b_k} = \sum_{(x,y)\in b_k} \sum_{[i',j']\in\Omega} (\tau_1\partial I^{(1)}/\partial y + \tau_0\partial I^{(0)}/\partial y)^2;$$

$$s_{6,b_k} = \sum_{(x,y)\in b_k} \sum_{[i',j']\in\Omega} (I^{(1)}-I^{(0)})(\tau_1\partial I^{(1)}/\partial y + \tau_0\partial I^{(0)}/\partial y)$$

where $b_k$ denotes the set of samples belonging to the k-th 4×4 block of the predicted block. $s_n$ in Equations 9-11 are replaced by $((s_{n,bk})>>4)$ to derive the associated motion vector offsets.

In some cases, MV regiment of BIO might be unreliable due to noise or irregular motion. Therefore, in BIO, the magnitude of MV regiment is clipped to a threshold value thBIO. The threshold value is determined based on whether the reference pictures of the current picture are all from one direction. If all the reference pictures of the current picture are from one direction, the value of the threshold is set to $12\times 2^{14-d}$; otherwise, it is set to $12\times 2^{13-d}$.

Gradients for BIO are calculated at the same time with motion compensation interpolation using operations consistent with HEVC motion compensation process (2D separable FIR). The input for this 2D separable FIR is the same reference frame sample as for motion compensation process and fractional position (fracX, fracY) according to the fractional part of block motion vector. In case of horizontal gradient $\partial I/\partial x$ signal first interpolated vertically using BIOfilterS corresponding to the fractional position fracY with de-scaling shift d-8, then gradient filter BIOfilterG is applied in horizontal direction corresponding to the fractional position fracX with de-scaling shift by 18-d. In case of vertical gradient ∂I/∂y first gradient filter is applied vertically using BIOfilterG corresponding to the fractional position fracY with de-scaling shift d-8, then signal displacement is performed using BIOfilterS in horizontal direction corresponding to the fractional position fracX with de-scaling shift by 18-d. The length of interpolation filter for gradients calculation BIOfilterG and signal displacement BIOfilterF is shorter (6-tap) in order to maintain reasonable complexity. Table 2 shows the filters used for gradients calculation for different fractional positions of block motion vector in BIO. Table 3 shows the interpolation filters used for prediction signal generation in BIO.

TABLE 2

Filters for gradients calculation in BIO

| Fractional pel position | Interpolation filter for gradient(BIOfilterG) |
|---|---|
| 0 | {8, −39, −3, 46, −17, 5} |
| 1/16 | {8, −32, −13, 50, −18, 5} |
| 1/8 | {7, −27, −20, 54, −19, 5} |
| 3/16 | {6, −21, −29, 57, −18, 5} |
| 1/4 | {4, −17, −36, 60, −15, 4} |
| 5/16 | {3, −9, −44, 61, −15, 4} |
| 3/8 | {1, −4, −48, 61, −13, 3} |
| 7/16 | {0, 1, −54, 60, −9, 2} |
| 1/2 | {−1, 4, −57, 57, −4, 1} |

TABLE 3

Interpolation filters for prediction signal generation in BIO

| Fractional pel position | Interpolation filter for prediction signal(BIOfilterS) |
|---|---|
| 0 | {0, 0, 64, 0, 0, 0} |
| 1/16 | {1, −3, 64, 4, −2, 0} |
| 1/8 | {1, −6, 62, 9, −3, 1} |
| 3/16 | {2, −8, 60, 14, −5, 1} |
| 1/4 | {2, −9, 57, 19, −7, 2} |
| 5/16 | {3, −10, 53, 24, −8, 2} |
| 3/8 | {3, −11, 50, 29, −9, 2} |
| 7/16 | {3, −11, 44, 35, −10, 3} |
| 1/2 | {3, −10, 35, 44, −11, 3} |

In the JEM, BIO is applied to all bi-predicted blocks when the two predictions are from different reference pictures. When LIC is enabled for a CU, BIO is disabled.

In the JEM, OBMC is applied for a block after normal MC process. To reduce the computational complexity, BIO is not applied during the OBMC process. This means that BIO is only applied in the MC process for a block when using its own MV and is not applied in the MC process when the MV of a neighboring block is used during the OBMC process.

It is proposed that before calculating the temporal gradient in BIO, a reference block (or a prediction block) may be modified firstly, and the calculation of temporal gradient is based on the modified reference block. In one example, mean is removed for all reference blocks. In one example, mean is defined as the average of selected samples in the reference block. In one example, all pixels in a reference block X or a sub-block of the reference block X are used to calculate MeanX. In one example, only partial pixels in a reference block X or a sub-block of the reference block are used to calculate MeanX. For example, only pixels in every second row/column are used.

2.2.15 Decoder-Side Motion Vector Refinement

In bi-prediction operation, for the prediction of one block region, two prediction blocks, formed using a motion vector (MV) of list0 and a MV of list1, respectively, are combined to form a single prediction signal. In the decoder-side motion vector refinement (DMVR) method, the two motion vectors of the bi-prediction are further refined by a bilateral template matching process. The bilateral template matching applied in the decoder to perform a distortion-based search between a bilateral template and the reconstruction samples in the reference pictures in order to obtain a refined MV without transmission of additional motion information.

In DMVR, a bilateral template is generated as the weighted combination (i.e. average) of the two prediction blocks, from the initial MV0 of list0 and MV1 of list1, respectively, as shown in FIG. 26. The template matching operation consists of calculating cost measures between the generated template and the sample region (around the initial prediction block) in the reference picture. For each of the two reference pictures, the MV that yields the minimum template cost is considered as the updated MV of that list to replace the original one. In the JEM, nine MV candidates are searched for each list. The nine MV candidates include the original MV and 8 surrounding MVs with one luma sample offset to the original MV in either the horizontal or vertical direction, or both. Finally, the two new MVs, i.e., MV0' and MV1' as shown in FIG. 26, are used for generating the final bi-prediction results. A sum of absolute differences (SAD) is used as the cost measure. Please note that when calculating the cost of a prediction block generated by one surrounding MV, the rounded MV (to integer pel) is actually used to obtain the prediction block instead of the real MV.

DMVR is applied for the merge mode of bi-prediction with one MV from a reference picture in the past and another from a reference picture in the future, without the transmission of additional syntax elements. In the JEM, when LIC, affine motion, FRUC, or sub-CU merge candidate is enabled for a CU, DMVR is not applied.

FIG. 26 shows an example of a DMVR based on bilateral template matching 2.3 Related Method For motion refinement and coding in video coding, a MV update method and a two-step inter prediction method are proposed. the derived MV between reference block 0 and reference block 1 in BIO are scaled and added to the original motion vector of list 0 and list 1. Meanwhile, the updated MV is used to perform motion compensation and a second inter prediction is generated as the final prediction.

Meanwhile, the temporal gradient is modified by removing the mean difference between reference block 0 and reference block 1.

In methods for sub-block based prediction in video coding, for several sub-blocks with different, only one set of MVs is generate for chroma component.

3. Relationship to Other Technologies

Sub-block based prediction method is proposed. First, we propose to divide the current block into sub-blocks in different ways depending on the color component and the color format (such as 4:2:0 or 4:2:2). Second, we propose that the MV of a sub-block of one color component can be derived from the MV(s) of one or more sub-blocks of another color component, which has (have) already been derived. Third, we propose to unify the constrain for merge affine mode and non-merge affine mode.

For example, if an 8×8 CU is split into four 4×4 sub-blocks and each of the sub-block has its own motion vectors, then, we calculate average of the four motion vectors and use it (scaled by 2) as the motion vectors of the chroma component in YCbCr 4:2:0 case. In this way, motion compensation of the Cb/Cr component is performed for a 4×4 block instead of four 2×2 blocks and the memory bandwidth can be saved.

Interweaved prediction is proposed for sub-block motion compensation. With interweaved prediction, a block is divided into sub-blocks with more than one dividing patterns. A dividing pattern is defined as the way to divide a block into sub-blocks, including the size of sub-blocks and the position of sub-blocks. For each dividing pattern, a corresponding prediction block may be generated by deriving motion information of each sub-block based on the dividing pattern. Therefore, even for one prediction direction, multiple prediction blocks may be generated by multiple dividing patterns. Alternatively, for each prediction direction, only a dividing pattern may be applied.

Figure 27:
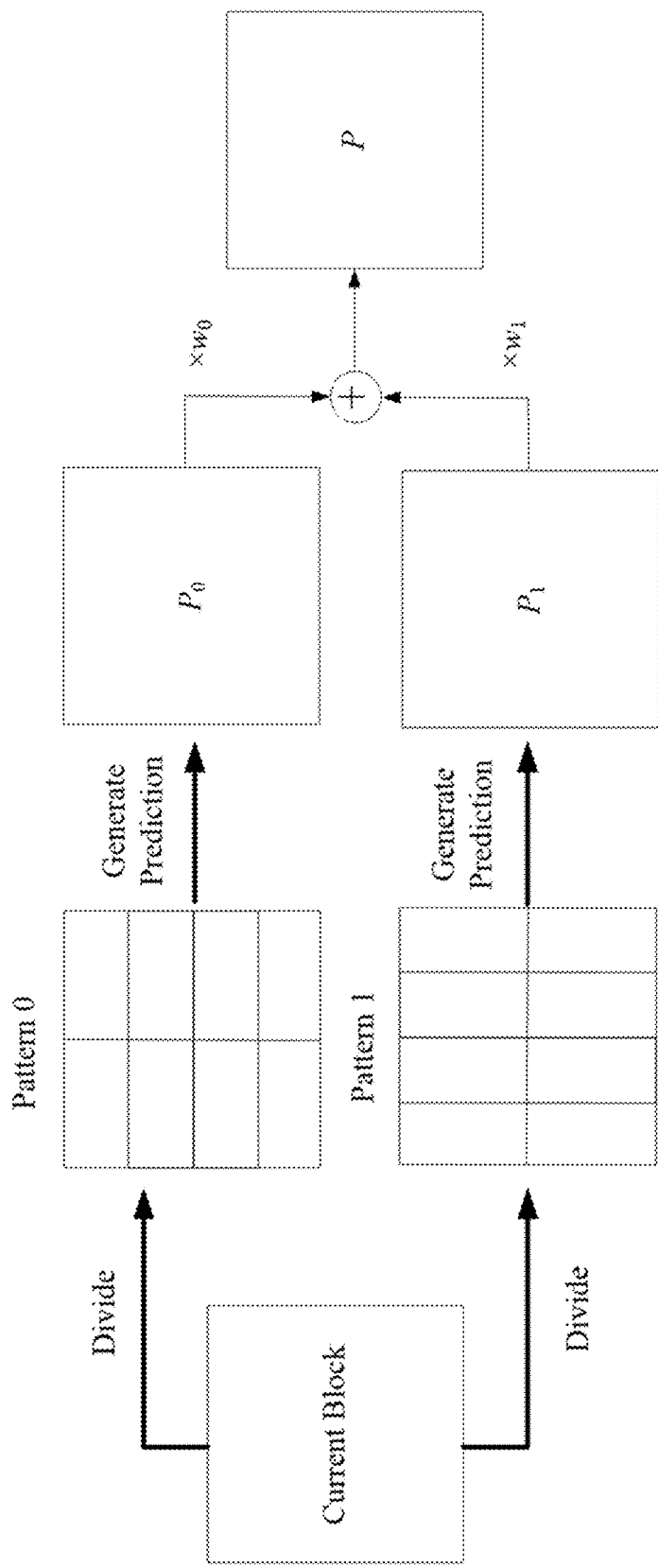
FIG. 27 shows an example of interweaved prediction.

Suppose there are X dividing patterns, and X prediction blocks of the current block, denoted as $P_0, P_1, \ldots, P_{X-1}$ are generated by sub-block based prediction with the X dividing patterns. The final prediction of the current block, denoted as P, can be generated as:

$$P(x, y) = \frac{\sum_{i=0}^{X-1} w_i(x, y) \times P_i(x, y)}{\sum_{i=0}^{X-1} w_i(x, y)} \quad (15)$$

where (x,y) is the coordinate of a pixel in the block and $w_i(x,y)$ is the weighting value of $P_i$. Without losing generalization, it is supposed that $\sum_{i=0}^{X-1} w_i(x,y)=(1<<N)$ wherein N is a non-negative value. FIG. 27 shows an example of interweaved prediction with two dividing patterns.

4. Examples of Problems Solved My Embodiments that Use the Present Techniques A two-step inter prediction method is proposed, however, such method can be performed multiple times to get more accurate motion information such that higher coding gains may be expected.

In DMVR, there is no two-step inter prediction method.

5. Example Embodiments Presented in an Itemized Format

To solve the problems mentioned above, it is proposed to refine motion information (e.g., motion vectors) more than once for those coding tools which need to perform decoder-side motion refinement process (e.g., DMVR), and/or for those coding tools which relies on some intermediate motion information different from the final motion information used for motion compensation (e.g., BIO).

It is also proposed that even for coding tools which don't apply motion information refinement at the decoder side, motion information of a block/a sub-block within a coded block may be refined once or multiple times and the refined motion information may be used for motion vector prediction of blocks to be coded afterwards, and/or filtering process.

Hereinafter, DMVD is used to represent DMVR or BIO or other decoder-sider motion vector refinement method or pixel refinement method.

Denote SATD as sum of absolute transformed differences, MRSATD as mean removed sum of absolute transformed differences, and SSE as sum of squares error, and MRSSE as mean removed sum of squares error.

The detailed items below should be considered as examples to explain general concepts. These inventions should not be interpreted in a narrow way. Furthermore, these items described coding/decoding techniques that can be combined in any manner.

Figure 28:
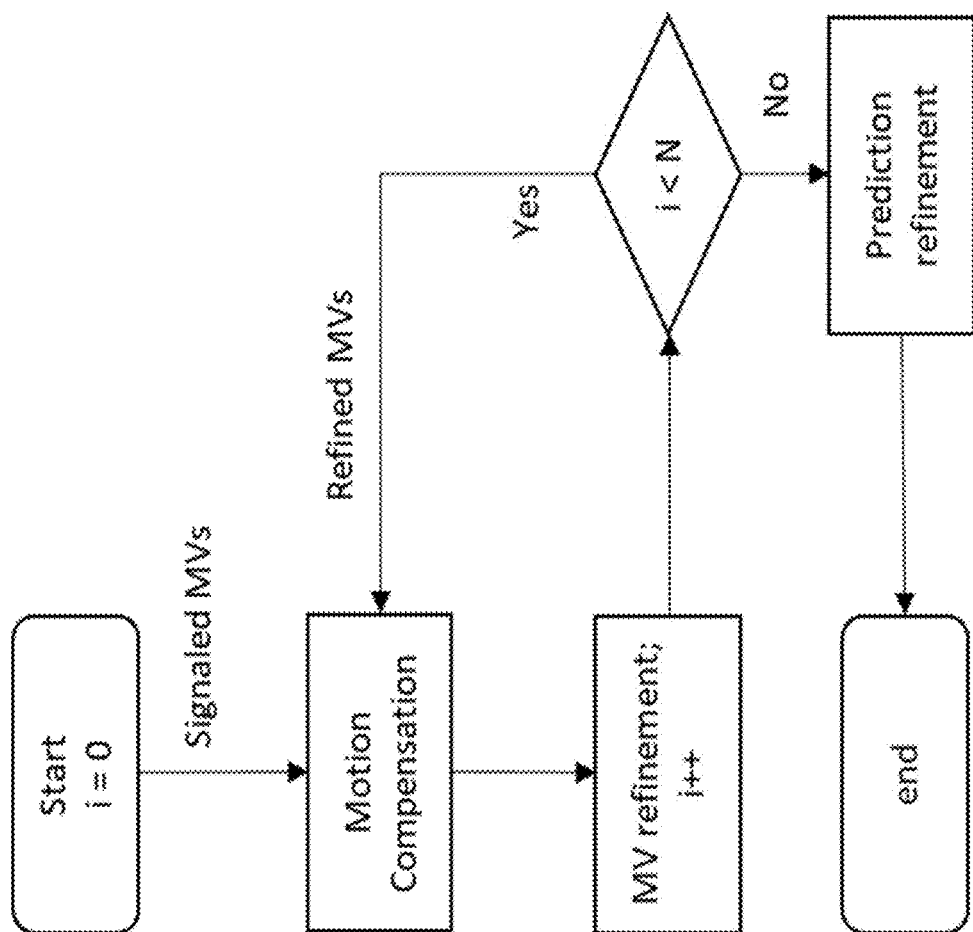
FIG. 28 shows an example of iterative motion vector refinement for BIO.

1. It is proposed that the motion vector refinement process may be performed multiple times, e.g., performed N times wherein N is a non-negative integer number. Suppose the signaled MVs are (MVLX0_x, MVLX0_y) and the i-th refined MVs are (MVLXi_x, MVLXi_y), wherein LX=L0 or L1 and i=1, . . . , N.

a) In one example, the (i−1)th refined motion vectors (i.e., motion vectors after the (i−1)th iteration, and when (i−1) equals to 0, the signaled motion vectors are used) may be used to generate the i-th motion compensated reference blocks of the PU/CU/block/sub-block. Alternatively, furthermore, the i-th motion compensated reference blocks may be further used to derive the i-th temporal gradients, spatial gradients and refined motion vectors. An example is shown in FIG. 28.

b) Different interpolation filters from those used for inter-coded blocks which are not coded with proposed method may be used for motion compensation in different motion vector refinement steps to reduce the memory bandwidth. For example, short-tap filters are used in 1st~(N−1)th steps.

c) Intermediate refined MVs from the i-th iteration may be firstly modified before being used to generate reference blocks. In one example, fractional MVs are rounded to integer MVs and then are used to generate reference blocks in some steps, for example, in 1st~(N−1)th steps.

d) In some or all iterations, one block may be first split into several sub-blocks and each sub-block is treated in the same way as a normal coding block with size equal to the sub-block size.

i. In one example, a block is firstly split into multiple sub-blocks, and each block's motion information may be refined multiple times.

ii. Alternatively, a block is firstly split into multiple sub-blocks, and only for partial of the sub-blocks, their motion information may be refined multiple times.

iii. Alternatively, a block is firstly split into multiple sub-blocks, different sub-block's motion information may be refined with different numbers of iterations (e.g., for some sub-block, no refinement is applied, and for some, motion information may be refined with multiple times.)

iv. Alternatively, the motion information of the whole block is refined N−1 times and afterwards, based on the (N−1)th refined motion information, the block is split to multiple sub-blocks, and for each sub-block, its motion information may be further refined.

e) In different steps, the refined MVs may be derived at different sub-block size.

f) In one example, the refined motion vectors in the Nth step is used to perform the motion compensation and then the method described in the previous section is used to generate the final prediction of the CU/sub-block.

g) In one example, predictions are generated for a block/sub-block in each step (or some steps) and they are weighted averaged to generate the final predictions of the block/sub-block.

h) In one example, MVs derived in each step may be further constrained.
  i. For example, |MVLXi_x−MVLX0_x|<=Tx and |MVLXi_y−MVLX0_y|<=Ty, for all 1<=i<=N.
  ii. For example, Max{MVLXi_x−MVLXj_x}<=Tx and Max{MVLXi_y−MVLXj_y}<=Ty, for all 1<=i, j<=N.
  iii. The thresholds Tx and Ty can be equal or not. They can be predefined numbers or signaled from the encoder to the decoder in VPS/SPS/PPS/slice header/tile group header/tile/CTU/CU.

i) The motion vector refinement process may be terminated after the Kth step for a block/sub-block, if the refined MVs after the Kth step and the input MVs in the Kth step are similar.
  i. For example, if the absolute difference between the vertical or/and horizontal component of the refined MV and the input MV (in any prediction direction) is not larger than T quarter-pel distance, wherein T=¼, ⅓, ½, 1, 2, 3, 4, . . . etc., the motion vector refinement process is terminated.
  ii. For example, if sum of the absolute difference between the vertical and horizontal component of the refined MV and the input MV (in any prediction direction) is not larger than T quarter-pel distance, the motion vector refinement process is terminated.

j) The iterative number N may be adaptive
  i. For example, N depends on the current block size.
    1. For example, N is larger for a larger block and vice versa.
  ii. For example, N depends on the coding mode of the current block.
  iii. For example, N depends on MVD (Motion Vector Difference) of the current block.
    1. For example, N is larger when |MVD| is larger.
  iv. For example, N depends on QP
    1. For example, N is larger when QP is larger.
  v. N may be signaled from the encoder to the decoder in VPS/SPS/PPS/picture header/slice header/tile group header/tile/CTU/CU.

2. With the refined motion vectors in bullet 1, the two-step inter-prediction process may be extended to multiple-step inter-prediction, wherein the finally refined motion vectors after N iterations is used to perform the final motion compensation and generate the final prediction of a block/sub-block.
  a) Alternatively, predictions are generated for a block/sub-block in each step (or some steps) and the final predictions of the block/sub-block may be generated by those predictions. In one example, they are weighted averaged to generate the final predictions of the block/sub-block.

3. It is proposed that the temporal gradient modification process can be performed for each M1×N1 sub-block though the BIO process may be performed for each M2×N2 sub-block.
  a) In one example, refined motion vectors are derived for each 4×4 block while the temporal gradient modification process is performed for each 8×8 block. That is, M1=N1=8, M2=N2=4.
  b) In one example, refined motion vectors are derived for each 8×8 block while the temporal gradient modification process is performed for each 4×4 block.
  c) In one example, refined motion vectors are derived for each 4×4 block while the temporal gradient modification process is performed for each 4×4 block.
  d) In one example, refined motion vectors are derived for each 8×8 block while the temporal gradient modification process is performed for each 8×8 block.
  e) M1, N1, M2, N2 may be pre-defined or depend on the block size/coded modes/signaled in VPS/SPS/PPS/picture header/tile groups/etc. al.

4. It is proposed to only use partial pixels of a block/sub-block for calculating the temporal/spatial gradients, which may be used for deriving the motion vector of the block/sub-block.
  a) In one example, temporal and spatial gradients are calculated for every N rows or/and columns. For example, N=2.
  b) In one example, temporal and spatial gradients are calculated for the top-left/top-right/bottom-left/bottom-right quarter of the CU/sub-block.
  c) In one example, temporal and spatial gradients are calculated for every N rows or/and columns the top-left/top-right/bottom-left/bottom-right quarter of the CU/sub-block.
  d) Such methods may be enabled for the two-step inter-prediction or multiple-step inter-prediction in bullet 2, wherein temporal/spatial gradients may only be used to derive refined motion vectors of a block/sub-block, and is not directly used to refine prediction of the block/sub-block.

5. It is proposed that the motion vector refinement process in DMVR may be performed multiple times.
  a) In one example, the (i−1)th refined motion vectors (i.e., motion vectors after the (i−1)th iteration, and when (i−1) equals to 0, the signaled motion vectors are used) can be used as the start searching point in the i-th motion vector refinement process, i=1, . . . , N, wherein N is a non-negative integer number.
  b) Different interpolation filters from those used for inter-coded blocks which are not coded with proposed method may be used in different motion vector refinement steps to reduce the memory bandwidth. For example, short-tap filters are used in 1st~(N−1)th steps.
  c) In one example, fractional MVs are rounded to integer MVs and are then used as the start searching point in some steps, for example, in 1st~(N−1)th step.

6. It is proposed that the refined motion vectors derived in BIO or DMVR or other decoder side motion refinement technologies may be only used for the final motion compensation of some components.
  a) In one example, the refined motion vectors are only used for the final motion compensation of Cb or/and Cr component.
  b) In one example, the refined motion vectors are only used for the final motion compensation of luma component.
  c) In one example, in BIO, the refined motion vectors are used to perform motion compensation and generate the final prediction of chroma components, and the method described in previous section is used to generate the final prediction of luma component.
    i. For example, the motion vector is refined only once and is used for motion compensation of the chroma component, and the method described in previous section (section 2.2.14) is used to generate the final prediction of luma component.
  d) In one example, in BIO, the method described in previous section (section 2.2.14) is used to generate the final prediction of both luma and chroma components.
  e) In one example, in BIO and DMVR, the refined motion vectors are used to perform motion compensation and generate the final prediction of both luma and chroma components.
7. Methods for sub-block based prediction in Video Coding can be used for motion compensation of chroma component to reduce memory bandwidth. For example, four neighboring 4×4 blocks are grouped together, and only one set of motion vector is derived for the chroma component (in YCbCr 4:2:0 case) and is used to perform motion compensation of a 4×4 chroma block.
8. It is proposed that BIO or/and DMVR and/or or other decoder side motion refinement technologies may be performed at sub-block level.
  a) Alternatively, furthermore, Interweaved Prediction in Video Coding can be used to derive different motion vectors for different dividing patterns, and the final prediction is generated based on the prediction value of all dividing patterns.
9. The proposed methods may be applied under certain conditions, such as based on block sizes, encoded mode information, motion information, slice/picture/tile types, etc. al.
  a) In one example, when a block size contains less than M*H samples, e.g., 16 or 32 or 64 luma samples, the above methods are not allowed.
  b) In one example, when a block size contains more than M*H samples, e.g., 16 or 32 or 64 luma samples, the above methods are not allowed.
  c) Alternatively, when minimum size of a block's width or/and height is smaller than or no larger than X, the above methods are not allowed. In one example, X is set to 8.
  d) Alternatively, when a block's width>th1 or >=th1 and/or a block's height>th2 or >=th2, the above methods are not allowed. In one example, X is set to 64.
    i. For example, the above methods are disabled for M×M (e.g., 128×128) block.
    ii. For example, the above methods are disabled for N×M/M×N block, e.g., wherein N>=64, M=128.
    iii. For example, the above methods are disabled for N×M/M×N block, e.g., wherein N>=4, M=128.
  e) Alternatively, when a block's width<th1 or <=th1 and/or a block's height<th2 or <=th2, the above methods are not allowed. In one example, th1 and/or th2 is set to 8.
  f) In one example, in BIO, the above methods are disabled for blocks coded in AMVP mode.
  g) In one example, in BIO or DMVR, the above methods are disabled for blocks coded in skip mode.
10. For sub-block based methods (e.g., Affine, ATMVP, BIO, DMVR, etc.), maximum number of sub-blocks may be fixed for all kinds of CU/PU sizes. Suppose there are will be K×L sub-blocks and one block size is denoted by M×N.
  a) In one example, the width of a sub-block is set to max($TH_w$, M/K).
  b) In one example, the height of a sub-block is set to max($TH_h$, N/L).
  c) $TH_w$ and/or $TH_h$ may be pre-defined (e.g., 4) or signaled in SPS/PPS/picture/slice/tile group/tile level/group of CTUs/CTU row/CTU/CU/PU.
  d) $TH_w$ and/or $TH_h$ may be dependent on whether current block is bi-prediction or uni-prediction. In one example, $TH_w$ and/or $TH_h$ may be set to 4 for uni-prediction or 8 for bi-prediction.
11. For sub-block based methods (e.g., Affine, ATMVP, BIO, DMVR, etc. al), whether and how to split the block into sub-blocks may be different for different color components.
  a) In one example, whether and how to split a chroma block depend on the width and height of the chroma block, independently of the whether and how to split its corresponding luma block.
  b) In one example, whether and how to split a chroma block depend on the width and height of the chroma block, independently of the whether and how to split its corresponding luma block.
  c) In one example, whether and how to split a chroma block depend on the whether and how to split its corresponding luma block.
12. The above methods including proposed methods and BIO, DMVR or other decoder side motion refinement technologies, or sub-block based methods (e.g., affine, ATMVP etc.) may be applied in a sub-block level.
  a) In one example, the iterative motion vector refinement for BIO and DMVR in bullet 1 and bullet 2 may be invoked for each sub-block.
  b) In one example, when a block with either width or height or both width and height are both larger than (or equal to) a threshold L, the block may be split into multiple sub-blocks. Each sub-block is treated in the same way as a normal coding block with size equal to the sub-block size.
    i. In one example, L is 64, a 64×128/128×64 block is split into two 64×64 sub-blocks, and a 128×128 block is split into four 64×64 sub-blocks. However, N×128/128×N block, wherein N<64, is not split into sub-blocks.
    ii. In one example, L is 64, a 64×128/128×64 block is split into two 64×64 sub-blocks, and a 128×128 block is split into four 64×64 sub-blocks. Meanwhile, N×128/128×N block, wherein N<64, is split into two N×64/64×N sub-blocks.
    iii. In one example, when width (or height) is larger than L, it is split vertically (or horizontally), and the width or/and height of the sub-block is no larger than L.
    iv. In one example, L may be different for vertical direction and horizontal direction. For example, if width of block is larger than LW, the block may be split vertically; if height of a block is larger than LH, the block may be split horizontally.
    v. In one example, LW may be width of the VPDU (virtual pipeline data unit) and LH may be height of the VPDU.
  c) In one example, when size (i.e., width*height) of block is larger than a threshold L1, it may be split into multiple sub-blocks. Each sub-block is treated in the same way as a normal coding block with size equal to the sub-block size.
    i. In one example, the block is split into sub-blocks with same size that is no larger than L.
    ii. In one example, if width (or height) of the block is no larger than a threshold L2, it is not split vertically (or horizontally).

iii. In one example, L1 is size of the VPDU.
iv. In one example, L1 is 1024, and L2 is 32. For example, a 16×128 block is split into two 16×64 sub-blocks.
v. In one example, L2=sqrt(L1).
vi. In one example, if block size (width and height denoted by W and H, respectively) is larger than L1, width (denoted by subW) and height (denoted by subH) of a sub-block is derived as follows:
If W>=L2 and H>=L2
 subW=W/L2;
 subH=H/L2;
Else if W>L2 and H<L2
 subH=H;
 subW=W*H/L1;
Else if W<L2 and H>L2
 subW=W;
 subH=W*H/L1;
d) In one example, two-level splitting of one block may be applied wherein different rules may be applied to decide how to do splitting.
 i. In one example, a block may be first split into sub-blocks using method in bullet 12.b, and these sub-blocks may be further split using method in bullet 12.c.
 ii. In one example, a block may be first split into sub-blocks using method in bullet 12.c, and these sub-blocks may be further split using method in bullet 12.b.
e) The threshold L may be pre-defined or signaled in SPS/PPS/picture/slice/tile group/tile level.
f) Alternatively, the thresholds may depend on certain coded information, such as block size, picture type, temporal layer index, etc. al.
g) In one example, deblocking may be performed at boundary of these sub-blocks.
13. It is proposed that DMVD and may be disabled in multi-hypothesis intra and inter prediction.
 a) Alternatively, DMVD may be enabled in multi-hypothesis intra and inter prediction.
14. It is proposed that DMVD may be disabled in MMVD (merge mode with MVD) or UMVE mode.
 a) Alternatively, DMVR may be enabled in MMVD (merge mode with MVD) or UMVE mode.
15. It is proposed that DMVD and may be disabled in triangle prediction.
 a) Alternatively, DMVR may be enabled in triangle prediction.
16. In one example, whether to and how to apply motion refinement methods such as DMVR or/and BIO and/or other decoder side motion refinement technologies depends on the reference picture.
 a) In one example, motion refinement methods are not applied if the reference picture is the current coding picture;
 b) In one example, multi-time motion refinement methods claimed in previous bullets are not applied if the reference picture is the current coding picture;
 c) whether to and how to apply motion refinement methods such as DMVR or/and BIO and/or other decoder side motion refinement technologies depends on the positions of sub-blocks relative to the block covering the sub-block, and/or relative to the coding tree unit (CTU), and/or relative to the top-left position of the tile/picture.
17. It is proposed that in the early termination stage of BIO or/and DMVR or other coding tools rely on difference calculation, the difference (e.g., SAD/SATD/SSE/MRSAD/MRSATD/MRSSE etc.) between the two reference blocks or/and sub-blocks may be calculated only for some representative positions.
 a) In one example, only difference of even rows is calculated for the block or/and sub-block.
 b) In one example, only difference of four corner samples of one block/sub-block is calculated for the block or/and sub-block.
 c) In one example, method improvements of decoder side motion vector derivation in video coding may be used to select the representative positions.
 d) In one example, the difference (e.g., SAD/SATD/SSE/MRSAD/MRSATD/MRSSE etc.) between the two reference blocks may be calculated only for some representative sub-blocks.
 e) In one example, the difference (e.g., SAD/SATD/SSE/MRSAD/MRSATD/MRSSE etc.) calculated for representative positions or sub-blocks are summed up to get the difference for the whole block/sub-block.
18. In one example, the difference between the two reference blocks is calculated directly (instead of being calculated as sum of differences between the reference sub-blocks) and is used to decide whether BIO or/and DMVR or other coding tools rely on difference calculation is enabled or disabled for the entire block.
 a) In one example, methods described in bullet 14 may be used to calculate the difference between the two reference blocks.
19. Embodiment
 This section presents an embodiment for how to split a block into sub-blocks in sub-block level DMVD.

Embodiment #1 a) Step 1: if a block is of size 128×128, it is split into 4 64×64 sub-blocks. If a block is of size N×128 or 128×N (N<128), it is split into 2 N×64 or 64×N sub-blocks. For other blocks, they are not split.
b) Step 2: for block that is not of size 128×128, or N×128 or 128×N (N<128), and for sub-block generated in step 1, if its size (i.e., width*height) is larger than 256, it is further split into sub-blocks of size 256 using method described in 12.c, with L1=256 and L2=16.

Embodiment #2 a) Step 1: if a block is of size 128×128, it is split into 4 64×64 sub-blocks. If a block is of size N×128 or 128×N, it is split into 2 N×64 or 64×N sub-blocks (N<128). For other blocks, they are not split.
b) Step 2: for block that is not of size 128×128, or N×128 or 128×N (N<128), and for sub-block generated in step 1, if its size (i.e., width*height) is larger than 1024, it is further split into sub-blocks of size 1024 using method described in 12.c, with L1=1024 and L2=32.

Embodiment #3 a) Step 1: if a block is of size 128×128, it is split into 4 64×64 sub-blocks. If a block is of size N×128 or 128×N, it is split into 2 N×64 or 64×N sub-blocks (N<128). For other blocks, they are not split.

Embodiment #4 a) Step 1: if a block is of size 256×256, it is split into 4 128×128 sub-blocks. If a block is of size N×256 or 256×N, it is split into 2 N×128 or 128×N sub-blocks (N<256). For other blocks, they are not split.

b) Step 2: for block that is not of size 256×256, or N×256 or 256×N (N<256), and for sub-block generated in step 1, if its size (i.e., width*height) is larger than 1024, it is further split into sub-blocks of size 1024 using method described in 12.c, with L1=1024 and L2=32.

Embodiment #5 a) Step 1: if width or height of a block is larger than 64, it is split into sub-blocks using method described in 12.b, with LW=LH=64.

b) Step 2: for block whose width and height are no larger than 64, and for sub-block generated in step 1, if its size (i.e., width*height) is larger than 1024, it is further split into sub-blocks of size 1024 using method described in 12.c, with L1=1024 and L2=32.

Figure 29:
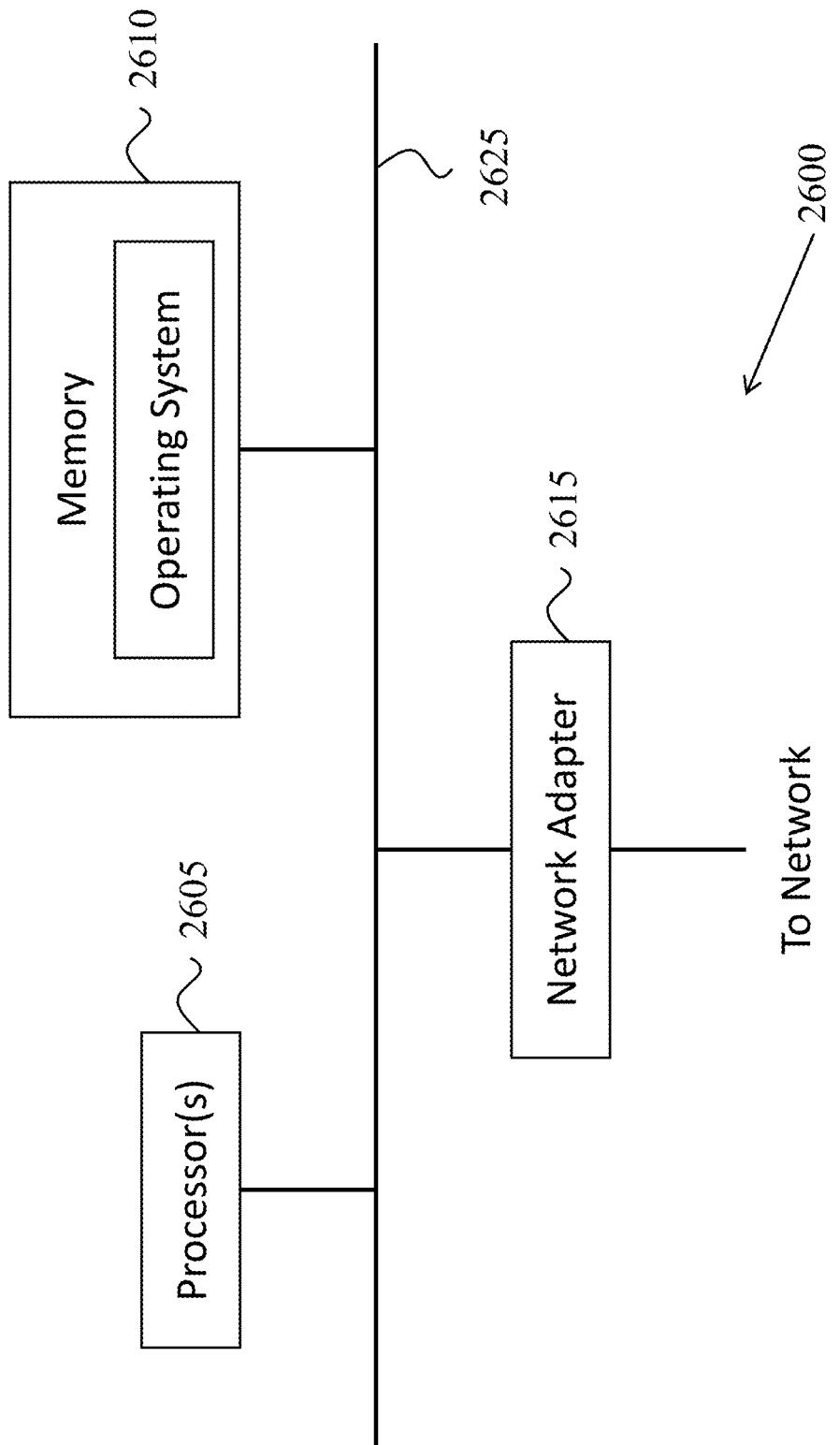
FIG. 29 is a block diagram of a hardware platform for implementing the video coding or decoding techniques described in the present document.

FIG. 29 is a block diagram illustrating an example of the architecture for a computer system or other control device 2600 that can be utilized to implement various portions of the presently disclosed technology. In FIG. 29, the computer system 2600 includes one or more processors 2605 and memory 2610 connected via an interconnect 2625. The interconnect 2625 may represent any one or more separate physical buses, point to point connections, or both, connected by appropriate bridges, adapters, or controllers. The interconnect 2625, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 674 bus, sometimes referred to as "Firewire."

The processor(s) 2605 may include central processing units (CPUs) to control the overall operation of, for example, the host computer. In certain embodiments, the processor(s) 2605 accomplish this by executing software or firmware stored in memory 2610. The processor(s) 2605 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 2610 can be or include the main memory of the computer system. The memory 2610 represents any suitable form of random access memory (RAM), read-only memory (ROM), flash memory, or the like, or a combination of such devices. In use, the memory 2610 may contain, among other things, a set of machine instructions which, when executed by processor 2605, causes the processor 2605 to perform operations to implement embodiments of the presently disclosed technology.

Also connected to the processor(s) 2605 through the interconnect 2625 is a (optional) network adapter 2615. The network adapter 2615 provides the computer system 2600 with the ability to communicate with remote devices, such as the storage clients, and/or other storage servers, and may be, for example, an Ethernet adapter or Fiber Channel adapter.

Figure 30:
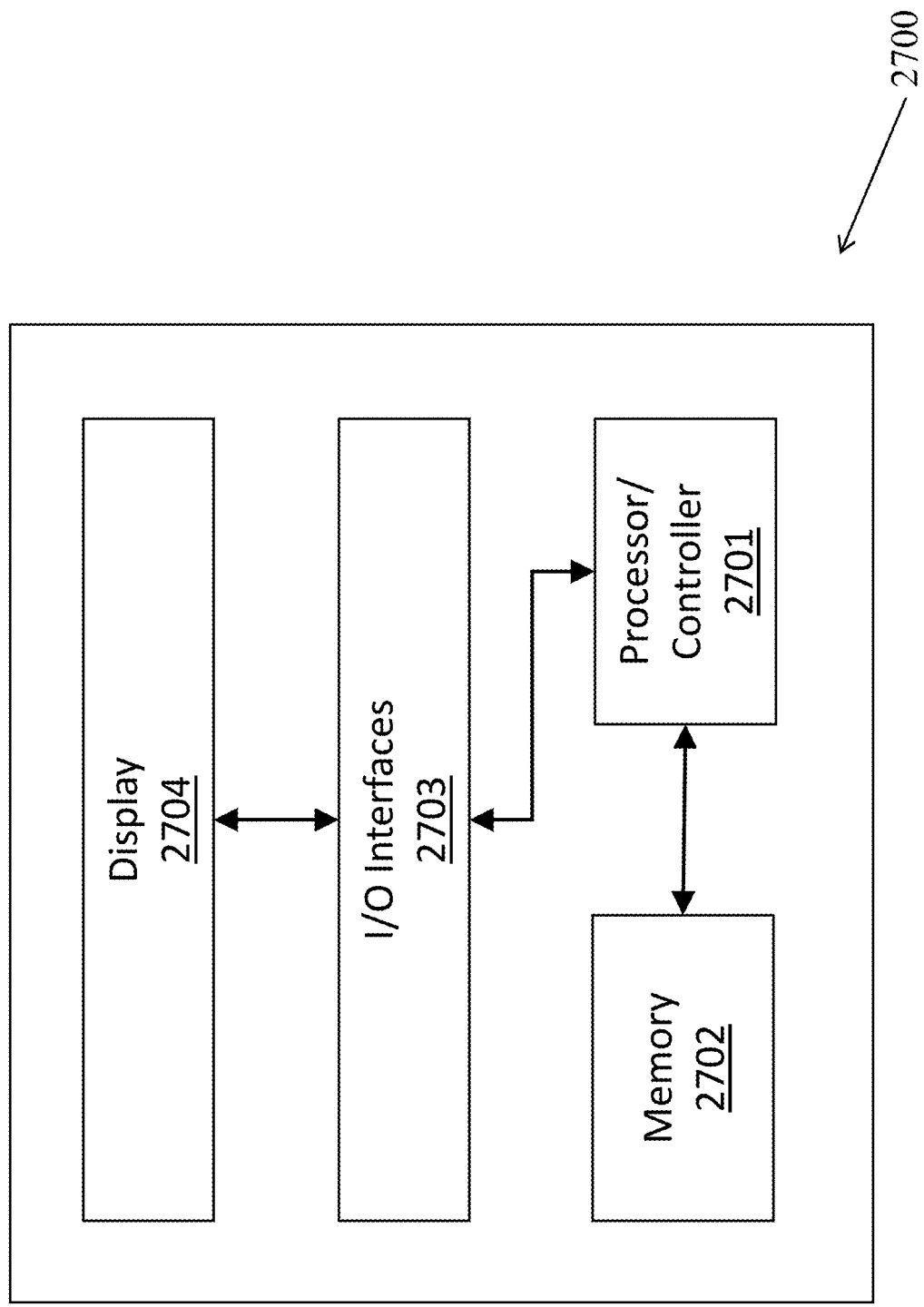
FIG. 30 shows an example of a hardware platform for implementing methods and techniques described in the present document.

FIG. 30 shows a block diagram of an example embodiment of a device 2700 that can be utilized to implement various portions of the presently disclosed technology. The mobile device 2700 can be a laptop, a smartphone, a tablet, a camcorder, or other types of devices that are capable of processing videos. The mobile device 2700 includes a processor or controller 2701 to process data, and memory 2702 in communication with the processor 2701 to store and/or buffer data. For example, the processor 2701 can include a central processing unit (CPU) or a microcontroller unit (MCU). In some implementations, the processor 2701 can include a field-programmable gate-array (FPGA). In some implementations, the mobile device 2700 includes or is in communication with a graphics processing unit (GPU), video processing unit (VPU) and/or wireless communications unit for various visual and/or communications data processing functions of the smartphone device. For example, the memory 2702 can include and store processor-executable code, which when executed by the processor 2701, configures the mobile device 2700 to perform various operations, e.g., such as receiving information, commands, and/or data, processing information and data, and transmitting or providing processed information/data to another device, such as an actuator or external display. To support various functions of the mobile device 2700, the memory 2702 can store information and data, such as instructions, software, values, images, and other data processed or referenced by the processor 2701. For example, various types of Random Access Memory (RAM) devices, Read Only Memory (ROM) devices, Flash Memory devices, and other suitable storage media can be used to implement storage functions of the memory 2702. In some implementations, the mobile device 2700 includes an input/output (I/O) unit 2703 to interface the processor 2701 and/or memory 2702 to other modules, units or devices. For example, the I/O unit 2703 can interface the processor 2701 and memory 2702 with to utilize various types of wireless interfaces compatible with typical data communication standards, e.g., such as between the one or more computers in the cloud and the user device. In some implementations, the mobile device 2700 can interface with other devices using a wired connection via the I/O unit 2703. The mobile device 2700 can also interface with other external interfaces, such as data storage, and/or visual or audio display devices 2704, to retrieve and transfer data and information that can be processed by the processor, stored in the memory, or exhibited on an output unit of a display device 2704 or an external device. For example, the display device 2704 can display a video frame modified based on the MVPs in accordance with the disclosed technology.

Figure 31:
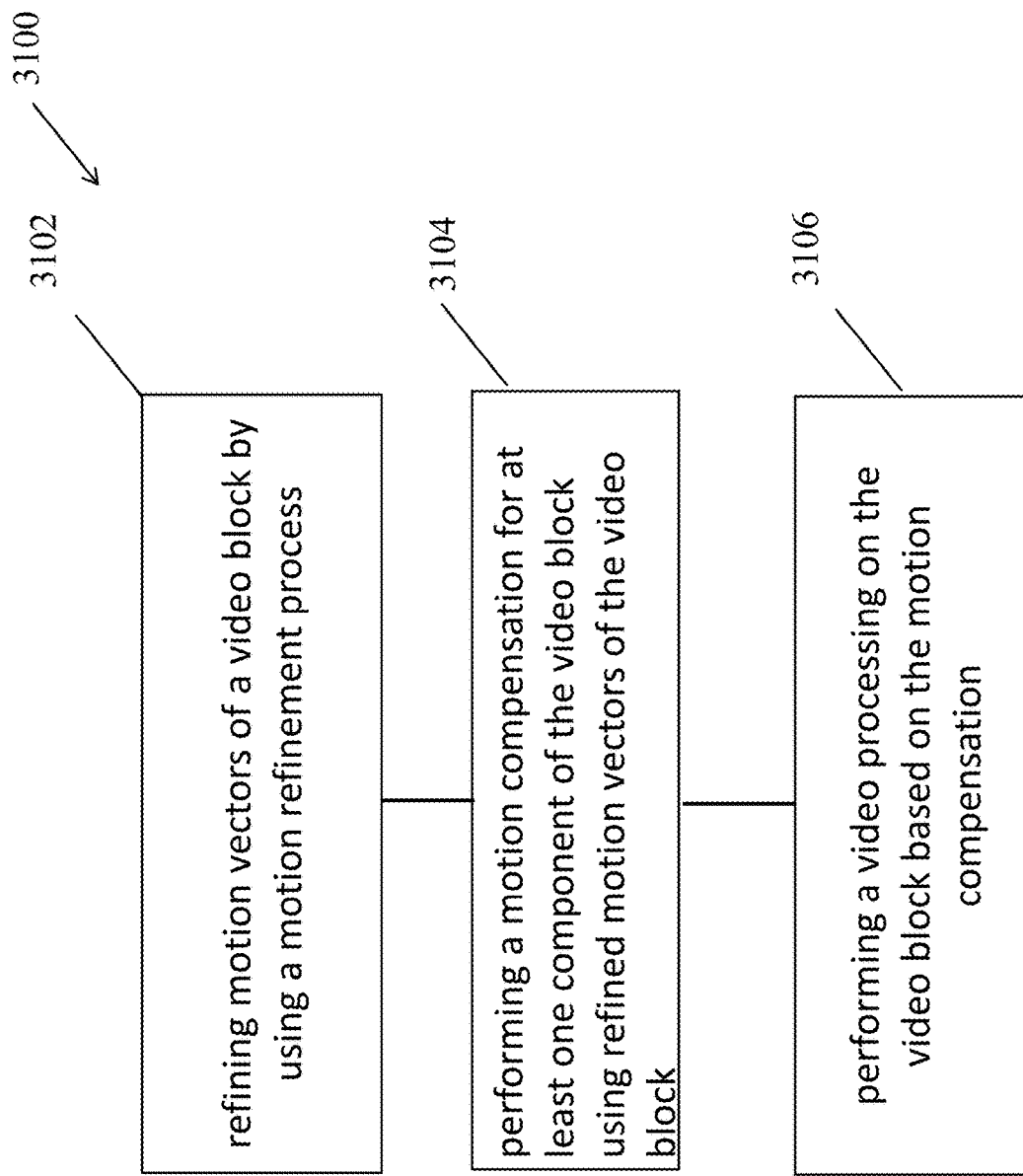
FIG. 31 is a flowchart of an example method of video processing.

FIG. 31 is a flowchart for a method 3100 of video processing. The method 3100 includes refining (3102) motion vectors of a video block by using a motion refinement process; performing a motion compensation (3104) for at least one component of the video block using refined motion vectors of the video block; and performing a video processing (3106) on the video block based on the motion compensation.

Figure 32:
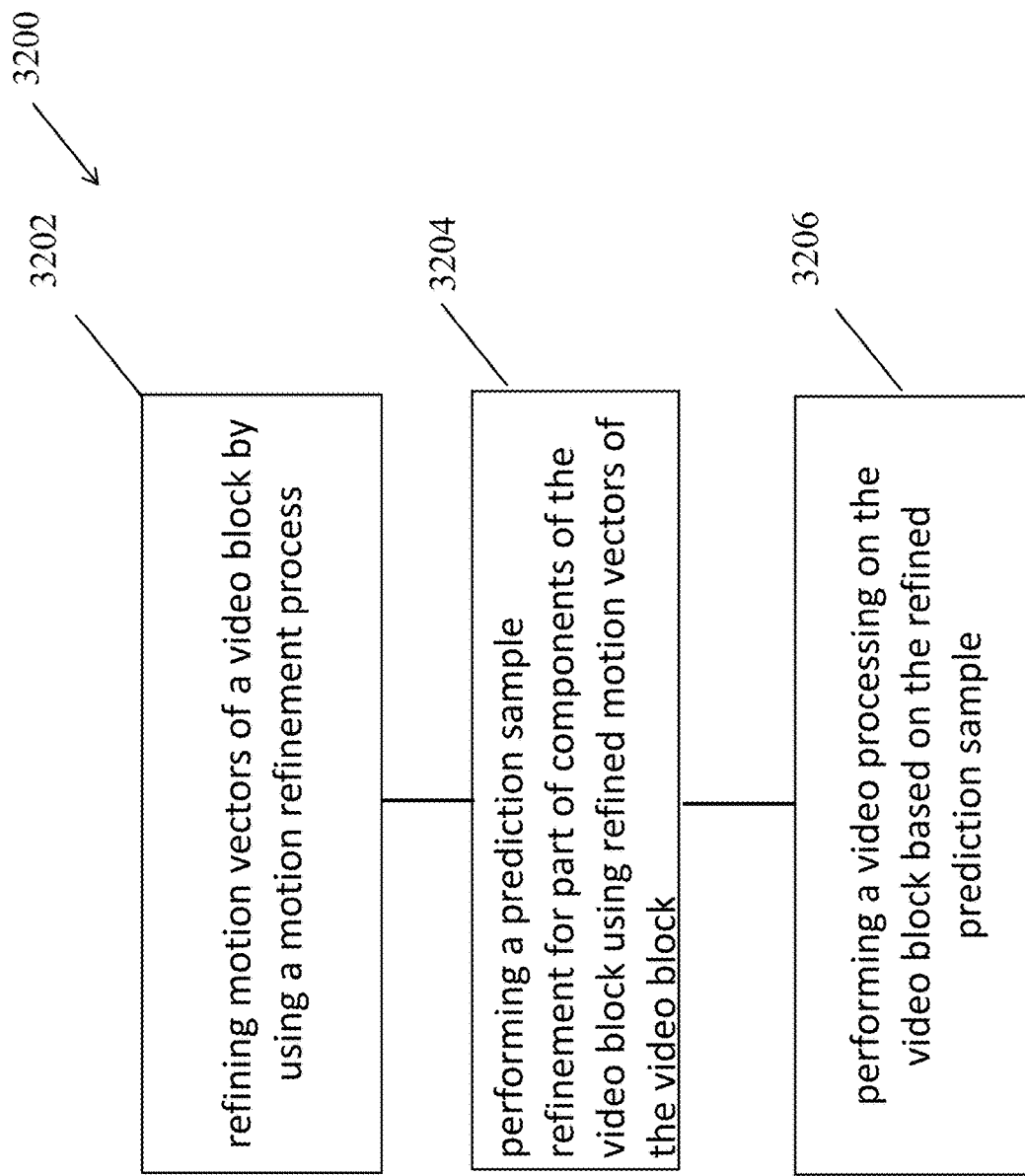
FIG. 32 is a flowchart of an example method of video processing.

FIG. 32 is a flowchart for a method 3200 of video processing. The method 3200 includes refining (3202) motion vectors of a video block by using a motion refinement process; performing (3204) a prediction sample refinement for part of components of the video block using refined motion vectors of the video block; and performing (3206) a video processing on the video block based on the refined prediction sample.

In the disclosed embodiments, the bitstream representation of a current block of video may include bits of a bitstream (compressed representation of a video) that may be non-contiguous and may depend on header information, as is known in the art of video compression. Furthermore, a current block may include samples representative of one or more of luma and chroma components, or rotational variations thereof (e.g, YCrCb or YUV, and so on).

The listing of examples below describes some embodiments and techniques as follows.

1. A method for video processing, comprising:
refining motion vectors of a video block by using a motion refinement process;
performing a motion compensation for at least one component of the video block using refined motion vectors of the video block; and
performing a video processing on the video block based on the motion compensation.

2. The method of example 1, wherein
the refined motion vectors are used for performing a final motion compensation for a chroma component of the video block.

3. The method of example 2, comprising:
deriving a final prediction of the chroma component based on the refined motion vectors.

4. The method of example 2 or 3, wherein, the chroma component includes at least one of component Cr and component Cb.

5. The method of any one of examples 1-4, wherein
the refined motion vectors are used for performing a final motion compensation for a luma component of the video block.

6. The method of example 5, comprising:
deriving a final prediction of the luma component based on the refined motion vectors.

7. The method of any one of examples 1-6, wherein the motion refinement process is a multi-step refinement process or a one-step refinement process.

8. The method of any one of examples 1-7, wherein the motion refinement process is implemented in a bi-directional optical flow(BIO) technique or in a decoder-side motion vector refinement (DMVR) technique.

9. The method of example 3 or 4, wherein the motion refinement process is implemented in a bi-directional optical flow(BIO) technique.

10. The method of example 9, wherein the motion refinement process is a one-step refinement process.

11. The method of example 1, wherein the motion refinement process is implemented in a bi-directional optical flow(BIO) technique.

12. A method for video processing, comprising:
refining motion vectors of a video block by using a motion refinement process;
performing a prediction sample refinement for part of components of the video block using refined motion vectors of the video block; and
performing a video processing on the video block based on the refined prediction sample.

13. The method of example 12, wherein
the refined motion vectors are used for performing a prediction sample refinement for a chroma component of the video block.

14. The method of example 13, wherein, the chroma component includes at least one of component Cr and component Cb.

15. The method of any one of examples 12, wherein
the refined motion vectors are used for performing a prediction sample refinement for a luma component of the video block.

16. The method of any one of examples 12-15, wherein the motion refinement process is a multi-step refinement process or a one-step refinement process.

17. The method of any one of examples 12-16, wherein the motion refinement process is implemented in a bi-directional optical flow(BIO) technique.

18. The method of any one of examples 12-17, wherein the prediction sample refinement is implemented in a bi-directional optical flow(BIO) technique.

19. The method of any one of examples 1-18, wherein the video processing comprises at least one of encoding the video block into a bitstream representation of the video block and decoding the video block from the bitstream representation of the video block.

20. A video processing apparatus comprising a processor configured to implement the method of any one of examples 1 to 19.

21. A computer program product stored on a non-transitory computer readable media, the computer program product including program code for carrying out the method in any one of examples 1 to 19.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method for video processing, comprising:
    applying a two-step sequential refinement process to a video block of a video, wherein the two-step sequential refinement process includes:
        a first step of refining motion vectors of the video block by using a motion refinement process; and
        a second step of performing a prediction sample refinement for a part of components of the video block using refined motion vectors of the video block resulting from the first step; and
    performing a video processing on the video block based on the refined prediction sample resulting from the prediction sample refinement,
    wherein the motion refinement process is implemented with a decoder side motion vector refinement (DMVR) tool, which is independent from the prediction sample refinement and the motion vector refinement process is performed multiple times, and wherein the motion refinement process is applied based on a cost calculation between different prediction samples in different prediction list, and
    wherein the prediction sample refinement is implemented in a bi-directional optical flow (BIO) technique.

2. The method of claim 1, wherein
    the refined motion vectors are used for performing a prediction sample refinement for a chroma component of the video block.

3. The method of claim 2, wherein, the chroma component includes at least one of component Cr and component Cb.

4. The method of claim 1, wherein
    the refined motion vectors are used for performing a prediction sample refinement for a luma component of the video block.

5. The method of claim 1, wherein the video processing comprises at least one of encoding the video block into a bitstream representation of the video block and decoding the video block from the bitstream representation of the video block.

6. The method of claim 1, the motion refinement process is performed multiple times, wherein (i−1)th refined motion vectors are used as a start searching point in an i-th motion refinement process, i=1, . . . , N, wherein N is a non-negative integer number.

7. The method of claim 6, wherein fractional motion vectors are rounded to integer MVs and are then used as the start searching point.

8. The method of claim 1, wherein whether to apply the two-step sequential refinement process to a sub-block of the video block depends on a position of the sub-block relative to the video block, or a coding tree unit (CTU) covering the video block, and/or a top-left position of a tile/picture covering the video block.

9. A video processing apparatus comprising a processor and a non-transitory memory with instructions thereon, wherein the instructions upon execution by the processor, cause the processor to implement:
    applying a two-step sequential refinement process to a video block of a video, wherein the two-step sequential refinement process includes:
        a first step of refining motion vectors of the video block by using a motion refinement process;
        a second step of performing a prediction sample refinement for part of components of the video block using refined motion vectors of the video block; and
    performing a video processing on the video block based on the refined prediction sample resulting from the prediction sample refinement,
    wherein the motion refinement process is implemented with a decoder side motion vector refinement (DMVR) tool, which is independent from the prediction sample refinement and the motion vector refinement process is performed multiple times, and wherein the motion refinement process is applied based on a cost calculation between different prediction samples in different prediction list, and
    wherein the prediction sample refinement is implemented in a bi-directional optical flow (BIO) technique.

10. The video processing apparatus of claim 9, wherein the refined motion vectors are used for performing a prediction sample refinement for a chroma component of the video block.

11. The video processing apparatus of claim 10, wherein, the chroma component includes at least one of component Cr and component Cb.

12. The video processing apparatus of claim 9, wherein the refined motion vectors are used for performing a prediction sample refinement for a luma component of the video block.

13. The video processing apparatus of claim 9, wherein the video processing comprises at least one of encoding the video block into a bitstream representation of the video block and decoding the video block from the bitstream representation of the video block.

14. The apparatus of claim 9, wherein whether to apply the two-step sequential refinement process to a sub-block of the video block depends on a position of the sub-block relative to the video block, or a coding tree unit (CTU) covering the video block, and/or a top-left position of a tile/picture covering the video block.

15. A non-transitory computer-readable recording medium storing a bitstream of a video which is generated by a method performed by a video processing apparatus, wherein the method comprises:
applying a two-step sequential refinement process to a video block of a video, wherein the two-step sequential refinement process includes:
a first step of refining motion vectors of the video block by using a motion refinement process;
a second step of performing a prediction sample refinement for part of components of the video block using refined motion vectors of the video block; and
generating the bitstream based on the refined prediction sample resulting from the prediction sample refinement,
wherein the motion refinement process is implemented with a decoder side motion vector refinement (DMVR) tool, which is independent from the prediction sample refinement and the motion vector refinement process is performed multiple times, and wherein the motion refinement process is applied based on a cost calculation between different prediction samples in different prediction list, and
wherein the prediction sample refinement is implemented in a bi-directional optical flow (BIO) technique.

16. The non-transitory computer-readable recording medium of claim 15, wherein
the refined motion vectors are used for performing a prediction sample refinement for a chroma component of the video block.

17. The non-transitory computer-readable recording medium of claim 16, wherein, the chroma component includes at least one of component Cr and component Cb.

18. The non-transitory computer-readable recording medium of claim 15, wherein
the refined motion vectors are used for performing a prediction sample refinement for a luma component of the video block.

19. The non-transitory computer-readable recording medium of claim 15, wherein whether to apply the two-step sequential refinement process to a sub-block of the video block depends on a position of the sub-block relative to the video block, or a coding tree unit (CTU) covering the video block, and/or a top-left position of a tile/picture covering the video block.

* * * * *